(12) United States Patent
Tamada et al.

(10) Patent No.: US 11,827,367 B2
(45) Date of Patent: Nov. 28, 2023

(54) POWER SUPPLY DEVICE AND FLYING BODY

(71) Applicant: HONDA MOTOR CO., LTD., Tokyo (JP)

(72) Inventors: Shunichiro Tamada, Wako (JP); Tsubasa Tsujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1004 days.

(21) Appl. No.: 16/692,024

(22) Filed: Nov. 22, 2019

(65) Prior Publication Data

US 2020/0164992 A1 May 28, 2020

(30) Foreign Application Priority Data

Nov. 26, 2018 (JP) .................................. 2018-220572
Nov. 26, 2018 (JP) .................................. 2018-220573
(Continued)

(51) Int. Cl.
*B64D 27/02* (2006.01)
*B60L 50/70* (2019.01)
(Continued)

(52) U.S. Cl.
CPC ............... *B64D 27/02* (2013.01); *B60L 50/10* (2019.02); *B60L 50/70* (2019.02); *B64D 27/14* (2013.01);
(Continued)

(58) Field of Classification Search
CPC ........ B64D 27/08; B64D 27/14; B64D 27/20; B64D 2027/026
(Continued)

(56) References Cited

U.S. PATENT DOCUMENTS 3,098,632 A * 7/1963 Christenson ........... B64D 37/12
60/761
3,313,500 A 4/1967 Schmitt
(Continued)

FOREIGN PATENT DOCUMENTS

JP S53-044708 A 4/1978
JP H03-502125 A 5/1991
(Continued)

OTHER PUBLICATIONS

Japanese Office Action issued for Japanese Patent Application No. 2018-220575 dated Dec. 3, 2021.
(Continued)

*Primary Examiner* — Christopher P Ellis
(74) *Attorney, Agent, or Firm* — Thomas| Horstemeyer, LLP

(57) ABSTRACT

A power supply device that supplies power to a power load of a flying body, comprises: a power generation unit; a hollow housing including a reserving portion configured to reserve a fuel of the power generation unit, and a storage portion configured to store the power generation unit; and a connecting portion configured to connect the housing to an airframe of the flying body. The housing has a shape long in a front-and-rear direction of the flying body, and is arranged outside the airframe, and the reserving portion and the storage portion are arranged in a longitudinal direction of the housing.

16 Claims, 37 Drawing Sheets

(30) Foreign Application Priority Data

| Nov. 26, 2018 | (JP) | 2018-220574 |
|---|---|---|
| Nov. 26, 2018 | (JP) | 2018-220575 |
| Nov. 26, 2018 | (JP) | 2018-220576 |
| Nov. 26, 2018 | (JP) | 2018-220577 |
| Nov. 26, 2018 | (JP) | 2018-220578 |

(51) Int. Cl.

| B64D 27/24 | (2006.01) |
|---|---|
| B64D 37/08 | (2006.01) |
| H02K 7/18 | (2006.01) |
| B64D 27/14 | (2006.01) |
| B60L 50/10 | (2019.01) |
| H02K 9/22 | (2006.01) |

(52) U.S. Cl.

CPC ............ B64D 27/24 (2013.01); B64D 37/08 (2013.01); H02K 7/1815 (2013.01); H02K 7/1823 (2013.01); H02K 9/227 (2021.01); *B60L 2200/10* (2013.01); *B64D 2027/026* (2013.01)

(58) Field of Classification Search

USPC .......................................................... 244/54
See application file for complete search history.

(56) References Cited

U.S. PATENT DOCUMENTS

| 4,083,180 | A | | 4/1978 | Thompson et al. | |
|---|---|---|---|---|---|
| 4,166,878 | A | | 9/1979 | Thompson et al. | |
| 4,938,021 | A | | 7/1990 | Jones et al. | |
| 5,106,035 | A | | 4/1992 | Langford, III | |
| 5,505,587 | A | * | 4/1996 | Ghetzler | B64D 41/007 415/49 |
| 6,270,309 | B1 | * | 8/2001 | Ghetzler | F01D 17/14 415/36 |
| 7,108,228 | B1 | * | 9/2006 | Marshall | B64C 39/001 244/158.1 |
| 8,393,580 | B2 | | 3/2013 | Droney | |
| 8,511,613 | B2 | | 8/2013 | Droney | |
| 8,727,271 | B2 | | 5/2014 | Salyer | |
| 8,790,079 | B2 | | 7/2014 | Tersmette et al. | |
| 8,814,081 | B2 | | 8/2014 | Gagne et al. | |
| 9,248,908 | B1 | | 2/2016 | Luyks | |
| 9,534,537 | B2 | | 1/2017 | Gagne et al. | |
| 9,828,110 | B2 | * | 11/2017 | Roques | F03D 9/32 |
| 10,192,368 | B2 | | 1/2019 | Catt | |
| 10,232,950 | B2 | | 3/2019 | Mccullough et al. | |
| 10,870,479 | B2 | | 12/2020 | Courtin | |
| 11,002,146 | B1 | * | 5/2021 | O'Neill | B64D 27/16 |
| 2002/0122717 | A1 | | 9/2002 | Ghetzler et al. | |
| 2006/0115414 | A1 | * | 6/2006 | Nelson | C01B 3/045 423/658.2 |
| 2006/0119224 | A1 | * | 6/2006 | Keolian | H02N 2/18 310/339 |
| 2006/0254255 | A1 | * | 11/2006 | Okai | B64D 27/24 60/269 |
| 2009/0145998 | A1 | | 6/2009 | Salyer | |
| 2010/0021778 | A1 | * | 1/2010 | Steinshnider | H01M 8/04164 429/410 |
| 2010/0065691 | A1 | * | 3/2010 | Droney | B64D 27/24 244/65 |
| 2011/0071706 | A1 | | 3/2011 | Crumm et al. | |
| 2012/0082808 | A1 | | 4/2012 | Lemains et al. | |
| 2012/0160957 | A1 | * | 6/2012 | Gagne | B64D 41/00 244/54 |
| 2012/0171016 | A1 | | 7/2012 | Tersmette et al. | |
| 2012/0247117 | A1 | | 10/2012 | Gagne et al. | |
| 2012/0261522 | A1 | | 10/2012 | Droney | |
| 2012/0308369 | A1 | | 12/2012 | Maheshwari et al. | |
| 2013/0037650 | A1 | * | 2/2013 | Heppe | B64C 37/02 244/2 |
| 2016/0107748 | A1 | | 4/2016 | Luyks | |
| 2016/0185459 | A1 | * | 6/2016 | Kiefer | B64C 39/024 244/54 |
| 2016/0244179 | A1 | | 8/2016 | Catt | |
| 2017/0175564 | A1 | * | 6/2017 | Schlak | F01D 15/10 |
| 2017/0247254 | A1 | * | 8/2017 | Halsey | C01B 3/0026 |
| 2017/0327219 | A1 | | 11/2017 | Alber | |
| 2017/0336029 | A1 | * | 11/2017 | Kernene | B32B 1/08 |
| 2018/0002027 | A1 | | 1/2018 | Mccullough et al. | |
| 2018/0141674 | A1 | * | 5/2018 | Bailey | H01M 8/04201 |
| 2018/0191011 | A1 | * | 7/2018 | Halsey | H01M 8/04753 |
| 2018/0208463 | A1 | * | 7/2018 | Halsey | C01B 3/065 |
| 2018/0273158 | A1 | | 9/2018 | Courtin | |
| 2018/0346330 | A1 | * | 12/2018 | Halsey | C01B 3/065 |
| 2020/0075971 | A1 | * | 3/2020 | Lo | H01M 8/04708 |
| 2020/0130859 | A1 | * | 4/2020 | Woodhouse | H01M 8/0618 |
| 2020/0136163 | A1 | * | 4/2020 | Holland | H01M 8/0631 |
| 2022/0170597 | A1 | * | 6/2022 | Saha | F17C 13/026 |

FOREIGN PATENT DOCUMENTS

| JP | 2003-226296 A | 8/2003 |
|---|---|---|
| JP | 2012-122379 A | 6/2012 |
| JP | 2012-251550 A | 12/2012 |
| JP | 2016-501162 A | 1/2016 |
| JP | 2016-536191 A | 11/2016 |
| WO | 90/04714 A1 | 5/1990 |

OTHER PUBLICATIONS

Japanese Office Action issued for Japanese Patent Application No. 2018-220576 dated Dec. 3, 2021.
European Search Report issued for European Patent Application No. 19210592.2 dated Jun. 3, 2020.
Japanese Office Action issued for Japanese Patent Application No. 2018-220578 dated Nov. 19, 2021.
Japanese Office Action issued for Japanese Patent Application No. 2018-220577 dated Nov. 19, 2021.
Japanese Office Action issued for Japanese Patent Application No. 2018-220572 dated Nov. 29, 2021.
Japanese Office Action issued for Japanese Patent Application No. 2018-220573 dated Nov. 29, 2021.
Japanese Office Action issued for Japanese Patent Application No. 2018-220574 dated Nov. 29, 2021.
Chinese Office Action issued for Chinese Patent Application No. 201911093548.4 dated Aug. 17, 2023.
Peng Changqing, A Fuze Mechanism Dynamics, Ordnance Industry Press, 1st Edition Apr. 30, 1994, pp. 59-60.

* cited by examiner

FIG. 28
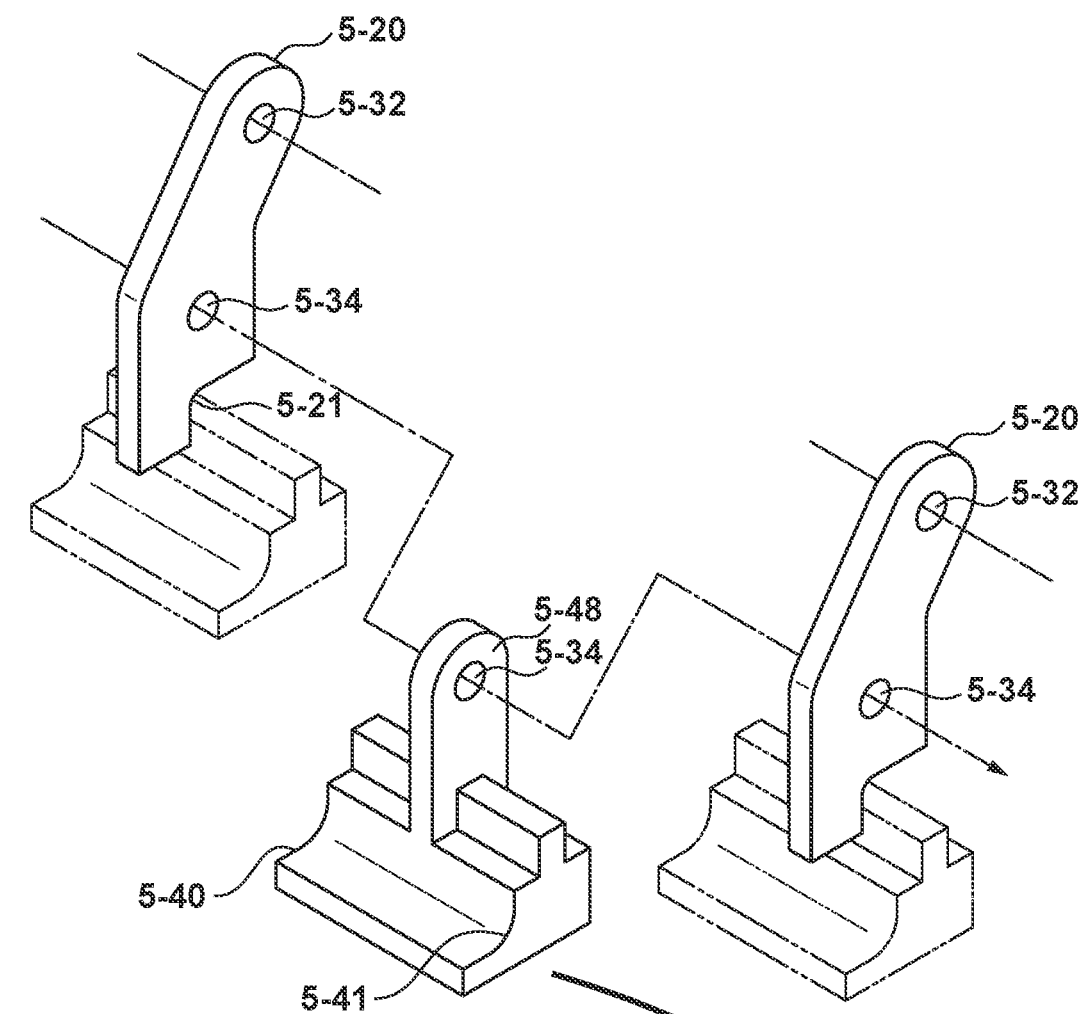
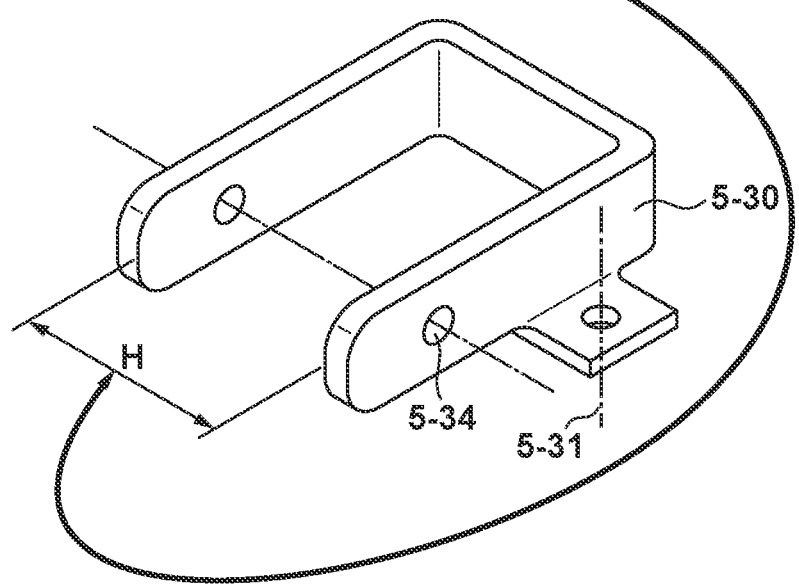

POWER SUPPLY DEVICE AND FLYING BODY

CROSS-REFERENCE TO RELATED APPLICATIONS

This application claims priority to and the benefit of Japanese Patent Application No. 2018-220572 filed on Nov. 26, 2018, Japanese Patent Application No. 2018-220573 filed on Nov. 26, 2018, Japanese Patent Application No. 2018-220574 filed on Nov. 26, 2018, Japanese Patent Application No. 2018-220575 filed on Nov. 26, 2018, Japanese Patent Application No. 2018-220576 filed on Nov. 26, 2018, Japanese Patent Application No. 2018-220577 filed on Nov. 26, 2018, and Japanese Patent Application No. 2018-220578 filed on Nov. 26, 2018, the entire disclosures of which are incorporated herein by reference.

BACKGROUND OF THE INVENTION

Field of the Invention

The present invention relates to a power supply device for a flying body and a flying body.

Description of the Related Art

An electric propulsion type flying body including an electric driving source such as a motor has been proposed. For example, U.S. Pat. No. 9,248,908 discloses an electric propulsion type helicopter including a motor that is driven by power of a battery. U.S. Pat. No. 8,727,271 discloses an electric propulsion type helicopter including a motor that is driven by power of a battery or a gas turbine engine and a power generator.

In an arrangement in which a power supply device such as a battery is disposed in the airframe of a flying body, like U.S. Pat. No. 9,248,908 or 8,727,271, to ensure the disposition space, there is a lower degree of freedom in designing another space in the airframe such as a cabin space.

The present invention provides a power supply device that improves the degree of freedom in designing the airframe of a flying body.

SUMMARY OF THE INVENTION

According to one aspect of the present invention, there is provided a power supply device that supplies power to a power load of a flying body, comprising: a power generation unit; a hollow housing including a reserving portion configured to reserve a fuel of the power generation unit, and a storage portion configured to store the power generation unit; and a connecting portion configured to connect the housing to an airframe of the flying body, wherein the housing has a shape long in a front-and-rear direction of the flying body, and is arranged outside the airframe, and the reserving portion and the storage portion are arranged in a longitudinal direction of the housing.

According to another aspect of the present invention, there is provided a power supply device that supplies power to a power load of a flying body, comprising: a power generation unit; and a housing including a reserving portion configured to reserve a fuel of the power generation unit, and a storage portion configured to store the power generation unit, wherein the housing has a shape in which the reserving portion and the storage portion are arrayed along a front-and-rear direction of the flying body, and is arranged outside an airframe of the flying body, the power generation unit includes a power generator including a rotating shaft, and an engine configured to rotationally drive the rotating shaft, and a first portion of the storage portion surrounding the engine is covered with a heat insulating member.

According to still another aspect of the present invention, there is provided a power supply device in which a hollow cylindrical housing that stores a power generation unit configured to supply power to a power load of a flying body, a reserving portion configured to supply a fuel to the power generation unit, and an air intake portion configured to take outside air and supply the outside air to the power generation unit can be connected to an outside of an airframe of the flying body via a connecting portion, wherein the air intake portion comprises: an inlet portion formed in an outer peripheral surface of the housing and configured to take air outside the housing; a hollow introduction passage communicating with the inlet portion and formed in the housing; and an outlet portion configured to supply the air taken from the inlet portion to the power generation unit via the introduction passage.

According to yet another aspect of the present invention, there is provided a power supply device in which a hollow cylindrical housing that stores a power generator configured to supply power to a power load of a flying body, a driving portion configured to drive the power generator, a fuel tank configured to supply a fuel to the driving portion, and an air intake portion configured to take outside air and supply the outside air to the driving portion can be connected to an outside of an airframe of the flying body via a connecting portion, wherein the air intake portion comprises: an inlet portion formed in an outer peripheral surface of the housing and configured to take air outside the housing; an introduction passage communicating with the inlet portion and formed in the housing; and an outlet portion configured to supply the air taken from the inlet portion to the driving portion via the introduction passage, and a heat sink configured to dissipate heat of the power generator is arranged on the outer peripheral portion of the power generator, and the heat sink is arranged in a passage in which the air flows from the inlet portion to the driving portion.

According to still yet another aspect of the present invention, there is provided a power supply device that supplies power to a power load of a flying body, comprising: a power generation unit; and a housing including a reserving portion configured to reserve a fuel of the power generation unit, and a storage portion configured to store the power generation unit, wherein the housing is arranged outside an airframe of the flying body, and the reserving portion and the storage portion are arrayed along a front-and-rear direction of the flying body and separably connected by a connecting portion.

According to yet still another aspect of the present invention, there is provided a power supply device that supplies power to a power load of a flying body, comprising: a power generation unit; and a housing including a reserving portion configured to reserve a fuel of the power generation unit, and a storage portion configured to store the power generation unit, wherein the housing has a long shape in which the reserving portion and the storage portion are arrayed along a front-and-rear direction of the flying body, and is arranged outside an airframe of the flying body, and the reserving portion includes a partition configured to divide a reserving space of the fuel into a plurality of partial spaces arrayed along a longitudinal direction of the housing.

According to still yet another aspect of the present invention, there is provided a flying body including a power supply device in which a hollow cylindrical housing that stores a power generation unit configured to supply power to a power load of the flying body, a reserving portion configured to supply a fuel to the power generation unit, and an air intake portion configured to take outside air and supply the outside air to the power generation unit is attached to an outside of an airframe via a separation mechanism, wherein the separation mechanism includes: engaging portions attached to a front portion and a rear portion of the airframe; and following engaging portions attached to a front portion and a rear portion of the housing and engaging with the engaging portions to attach the housing to the airframe, and when the engaging portion cancels an engaging state with the following engaging portion, the power supply device is separated from the airframe.

According to the present invention, it is possible to provide a power supply device that improves the degree of freedom in designing the airframe of a flying body.

Further features of the present invention will become apparent from the following description of exemplary embodiments (with reference to the attached drawings).

BRIEF DESCRIPTION OF THE DRAWINGS

FIG. 28 is a view showing the arrangement of a fixed arm, a separation arm, and a driving arm;

DESCRIPTION OF THE EMBODIMENTS

The first to seventh embodiments of the present invention will now be described with reference to the accompanying drawings. The present invention is not limited to the following embodiments, and includes changes and modifications of arrangements within the scope of the present invention. In addition, not all the combinations of features described in the embodiments are necessarily essential to the present invention.

First Embodiment

Figure 1:
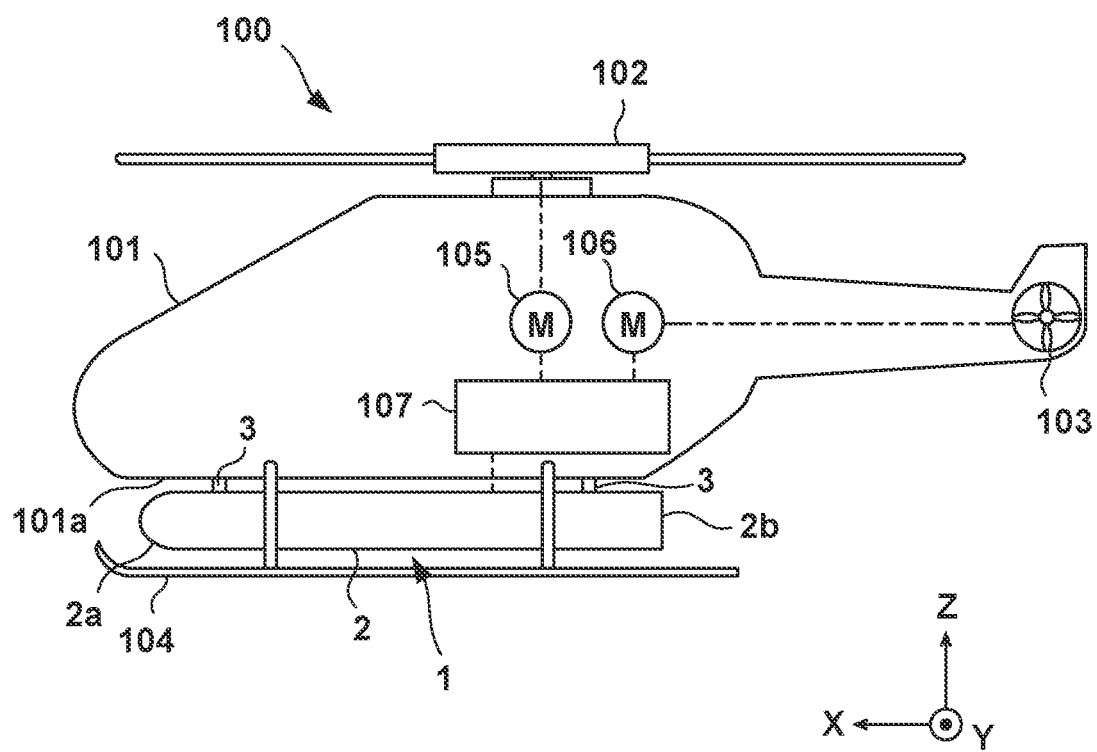
FIG. 1 is a schematic view of a flying body including a power supply device according to an embodiment of the present invention.

FIG. 1 is a schematic view of a flying body 100 including a power supply device 1 according to an embodiment of the present invention. In FIG. 1, arrows X, Y, and Z indicate the front-and-rear direction, the widthwise direction (left-and-right direction), and the up-and-down direction of the flying body 100, respectively. The flying body 100 according to this embodiment is an electric propulsion type flying body using motors 105 and 106 as driving sources and, more particularly, a helicopter.

The flying body 100 includes an airframe 101, a main rotor 102 provided in the upper portion of the airframe 101, a tail rotor 103 provided in the rear portion of the airframe 101, and skids 104. The motor 105 is a driving source that rotates the main rotor 102, and the motor 106 is a driving source that rotates the tail rotor 103. Driving of the motors 105 and 106 is controlled by a control device 107 using power supplied from the power supply device 1.

Figure 2:
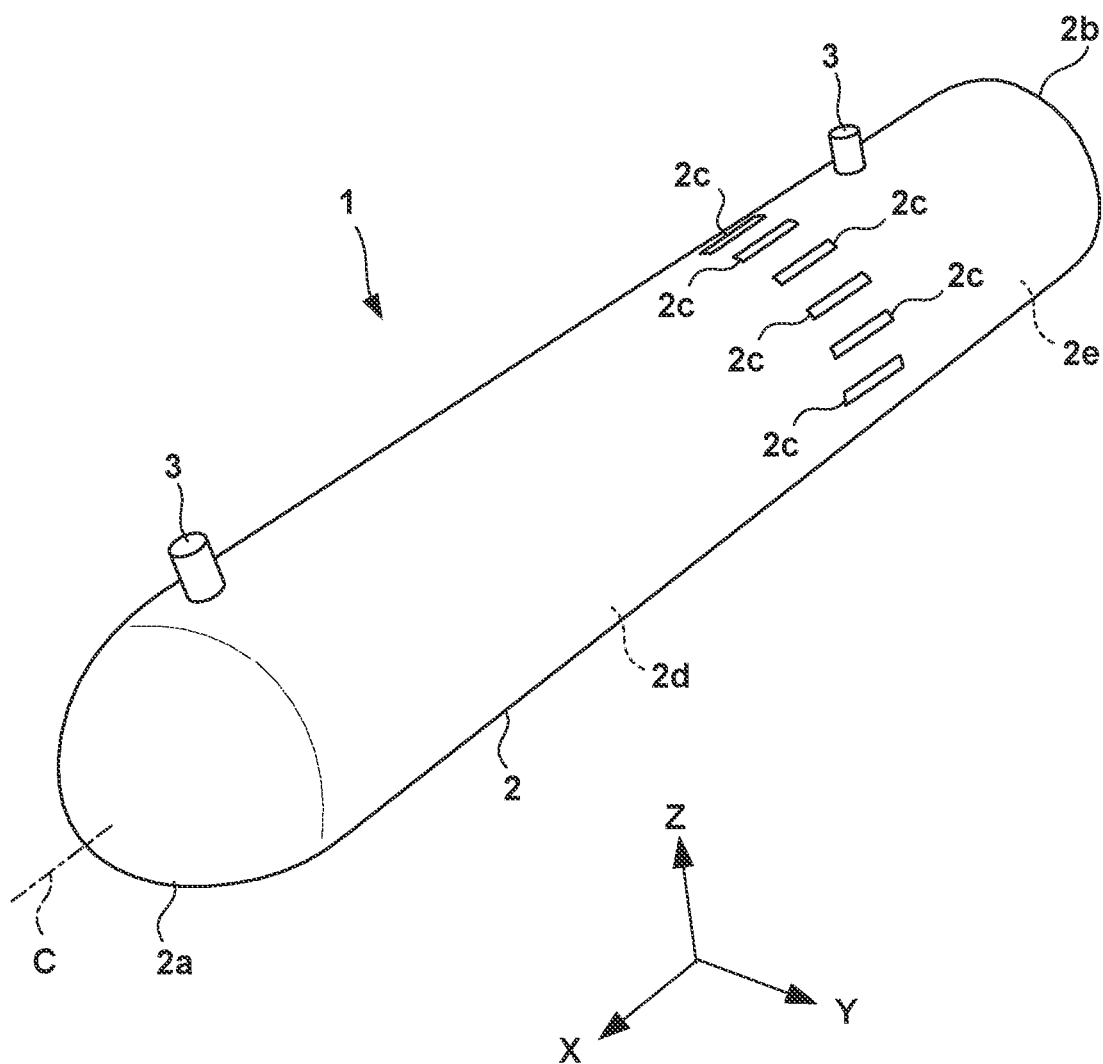
FIG. 2 is a perspective view of the power supply device shown in FIG. 1.

The power supply device 1 functions as the main power supply of the flying body 100, and supplies not only the driving power for the motors 105 and 106 but also power to each electric load in the flying body 100. The power supply device 1 will be described with reference to FIG. 2 in addition to FIG. 1. FIG. 2 is a perspective view of the power supply device 1.

The power supply device 1 includes a housing 2 that forms the outer wall of the housing 2, and a plurality of connecting portions 3 that connect the housing 2 and the airframe 101. The housing 2 is arranged outside the airframe 101 and, in this embodiment, supported at the center in the Y direction while being hung from the bottom wall of the airframe 101 via the connecting portions 3. When the housing 2 is arranged outside the airframe 101, occupation of the internal space of the airframe 101 by the power supply device 1 can be avoided. This contributes to expansion of a cabin, improvement of layout of other components, and improvement of maintenability of the power supply device 1.

The housing 2 has an outer shape long in the X direction. In this embodiment, the housing 2 has a pod-like outer shape long in the X direction in particular. In other words, the X direction is the longitudinal direction of the housing 2. When the housing 2 has such an outer shape, the air drag during forward flight of the flying body 100 can be reduced while arranging the housing 2 outside the airframe 101. The housing 2 according to this embodiment is a hollow body having a cylindrical shape long in the X direction. This can make the influence of a cross wind smaller. The housing 2 can be formed by, for example, connecting a plurality of parts having a cylindrical shape in the X direction. In FIG. 2, a center axis C indicates the center axis of the cylinder.

Of a distal end portion 2a and a rear end portion 2b of the housing 2 in the X direction, the distal end portion 2a has a tapered shape whose diameter is reduced toward the front. In this embodiment, the distal end portion 2a has a hemispherical shape but may have a triangular pyramid shape. When the distal end portion 2a has a tapered shape, the air drag during forward flight of the flying body 100 can further be reduced. A plurality of air intake ports 2c configured to take air into a power generation unit 4 to be described later are formed in the housing 2. The air intake port 2c is a slit-shaped opening long in the X direction, and the plurality of air intake ports 2c are formed in the circumferential direction of the housing 2.

The plurality of (here, two) connecting portions 3 are formed apart in the X direction. The housing 2 is connected apart from the airframe 101 by the connecting portions 3. The connecting portion 3 may inseparably fix the power supply device 1 and the airframe 101 by welding or the like, but may detachably connect the power supply device 1 and the airframe 101. The structure that detachably connect them may be a fastening structure using a bolt and a threaded hole, or may be an engaging structure using a hook and a hole. When the power supply device 1 is detachable from the airframe 101, a contribution can be made for exchange of the power supply device 1 or improvement of maintenability.

Figure 3:
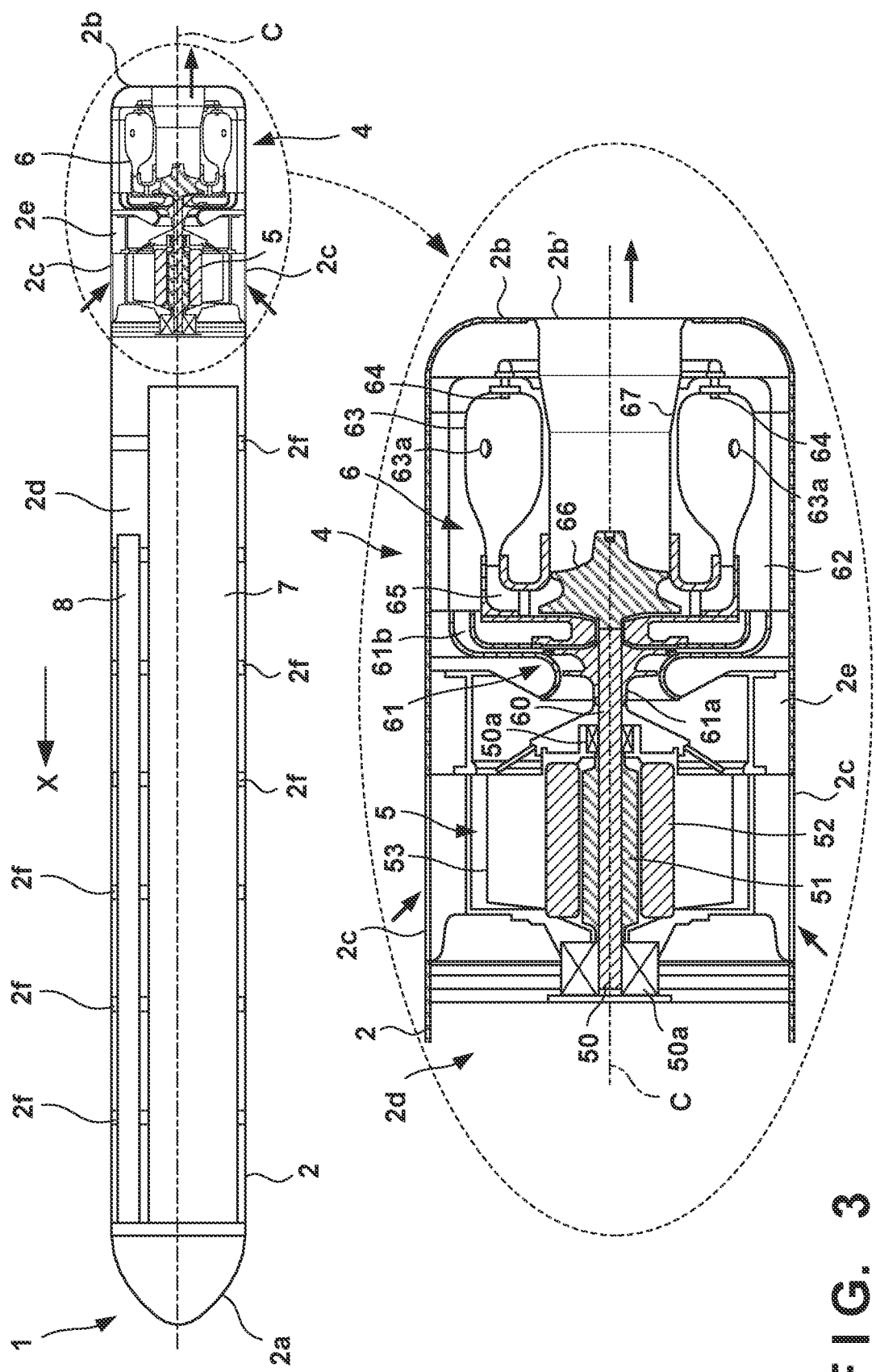
FIG. 3 shows an explanatory view and a partial enlarged view of the internal structure of the power supply device shown in FIG. 1.

The internal structure of the housing 2 will be described next with reference to FIG. 3. FIG. 3 shows an explanatory view and a partial enlarged view of the internal structure of the power supply device, which correspond to a sectional view of the power supply device 1 passing through the center axis C.

The internal space of the housing 2 is roughly divided into a reserving portion 2d on the front side and a storage portion 2e on the rear side. The reserving portion 2d and the storage portion 2e are arranged in the longitudinal direction (X direction) of the housing 2. With this layout, the power supply device 1 that has a small air drag and is long in the X direction can easily be formed. A plurality of annular reinforcing members 2f are provided apart in the X direction on the inner circumferential surface of the housing 2, thereby improving the strength of the housing 2.

The storage portion 2e stores the power generation unit 4. The reserving portion 2d is a space to reserve the fuel (light oil or the like) of the power generation unit 4. In this embodiment, a fuel tank 7 is stored. However, the reserving portion 2d itself may form a fuel tank. The fuel tank 7 is a hollow body having a tubular shape long in the X direction. The reserved fuel is supplied to the power generation unit 4 by a pump (not shown). In this embodiment, the reserving portion 2d is designed to have a large range in the X direction of the housing 2 as compared to the storage portion 2e, and a larger amount of fuel can be reserved. This can increase the cruising distance of the flying body 100.

In this embodiment, the reserving portion 2d is also used as the storage space for a control unit 8. The control unit 8 controls the power generation unit 4. In this embodiment, the control unit 8 is provided in the power supply device 1. However, instead of providing the control unit 8 in the power supply device 1, the control unit 107 of the flying body 100 may control the power generation unit 4.

The power generation unit 4 includes a power generator 5, and a gas turbine engine 6. The power generator 5 generates power by the output of the gas turbine engine 6. The gas turbine engine 6 includes a rotating shaft 60 provided on the same axis as the rotation axis C of the housing 2. When the rotating shaft 60 is provided on the same axis as the rotation axis C, the larger gas turbine engine 6 can be stored in the housing 2 having a cylindrical shape without wasting the space.

The gas turbine engine 6 includes a compressor 61. The compressor 61 includes an impeller 61a attached to the rotating shaft 60, and a diffuser 61b. As the impeller 61a rotates, air is sent from the air intake ports 2c to a compression chamber 62 while being compressed via the diffuser 61b.

The compressed air in the compression chamber 62 flows from opening portions 63a provided in the circumferential wall of a combustion chamber 63 and other opening portions (not shown) into the combustion chamber 63. In the combustion chamber 63, a plurality of fuel injection nozzles 64 are provided in the circumferential direction of the rotation axis C. The fuel reserved in the fuel tank 7 is supplied to the fuel injection nozzles 64 via a pipe (not shown), and the fuel injection nozzles 64 inject the fuel into the combustion chamber 63. At the time of start, an ignition device (not shown) ignites the air fuel mixture in the combustion chamber 63. After that, combustion of the air fuel mixture continuously occurs in the combustion chamber 63.

A combustion gas flow that has a high temperature and a high pressure in the combustion chamber 63 jets out from turbine nozzles 65 to a tubular exhaust pipe 67 on the same axis as the center axis C and, in the process, rotates a turbine 66 attached to the rotating shaft 60. The turbine 66, the rotating shaft 60, and the impeller 61a integrally rotate. An exhaust portion 2b' that is an opening portion communicating with the exhaust pipe 67 is formed in the rear end portion 2b of the housing 2, and the combustion gas flow (exhaust gas flow) is discharged to the rear of the housing 2. In this embodiment, since the gas turbine engine 6 is arranged adjacent to the rear end portion 2b of the housing 2, exhaust to the rear can smoothly be performed. Note that in this embodiment, the gas turbine engine 6 exclusively aims at driving the power generator 5, and actively using the exhaust gas flow as the thrust of the flying body 100 is not assumed. However, a form in which the exhaust gas flow is used as an auxiliary thrust can also be employed.

The power generator 5 includes a rotating shaft 50 on the same axis as the rotating shaft 60. That is, the rotating shaft 50 is also provided on the same axis as the center axis C, and the larger power generator 5 can be stored in the housing 2 having a cylindrical shape without wasting the space. In this embodiment, the rotating shaft 50 and the rotating shaft 60 are integrally formed. Bearings 50a that rotatably support the rotating shaft 50 (and the rotating shaft 60) are provided at the two end portions of the power generator 5 in the X direction.

A rotor 51 such as a permanent magnet is provided on the rotating shaft 50, and a stator 52 such as a coil is provided around the rotor 51. A plurality of fins 53 for cooling are provided around the stator 52 in the circumferential direction of the rotating shaft 50 and cool the power generator 5 by air cooling.

The control unit 8 includes a circuit that controls power generation of the power generator 5, and a circuit that controls driving of the gas turbine engine 6. An auxiliary power supply such as a lead battery may be provided as the power supply in activating the control unit 8. The auxiliary power supply may be provided in the power supply device 1, or an auxiliary power supply provided on the side of the airframe 101 may be used. Power generated by the power generator 5 is supplied to the control unit 107 of the flying body 100 via a cable (not shown). The cable may pass through the connecting portions 3. The control unit 8 and the control unit 107 may be able to communicate with each other, and the control unit 8 may perform power generation control in accordance with an instruction from the control unit 107.

In the power supply device 1 with this arrangement, the gas turbine engine 6 is driven by the fuel reserved in the fuel tank 7, the rotating shaft 50 is rotated by the rotation of the rotating shaft 60 that is the output of the gas turbine engine 6, and the power generator 5 generates power. The generated power is supplied to the flying body 100 and used to drive the motors 105 and 106.

Since the power supply device 1 is arranged outside the airframe 101, the degree of freedom in designing the airframe 101 of the flying body 100 can be improved. For example, it is possible to ensure a wider cabin space in the airframe 101 and improve the comfort of crew. In addition, noise and vibrations generated by the operation of the power supply device 1 are reduced as compared to a case in which the power supply device 1 is provided in the airframe 101, and silence improves. Furthermore, as compared to a case in which the power supply device 1 is provided in the airframe 101, access to the inside of the power supply device 1 is easy, the maintenance is facilitated, and the maintenance burden is reduced. The power supply device 1 alone can be developed separately from the airframe 101, various kinds of qualification tests and type certifications before mass production become easy, and mass production can be implemented early. The housing 2 of the power supply device 1 has a shape long in the front-and-rear direction of the flying body 100, and forms a pod in a low air drag shape with a small front projection area. For this reason, even in the arrangement in which the power supply device 1 is arranged outside the airframe 101, the fuel consumption performance (air drag reduction) of the flying body 100 is not greatly lowered. Since the gas turbine engine 6 of the power supply device 1 does not aim at generating the thrust of the flying body 100, the rigidity of the connecting portions 3 can be low, and the structure can be relatively simple.

<Other Examples of Arrangement of Power Generation Unit>

Figure 4:
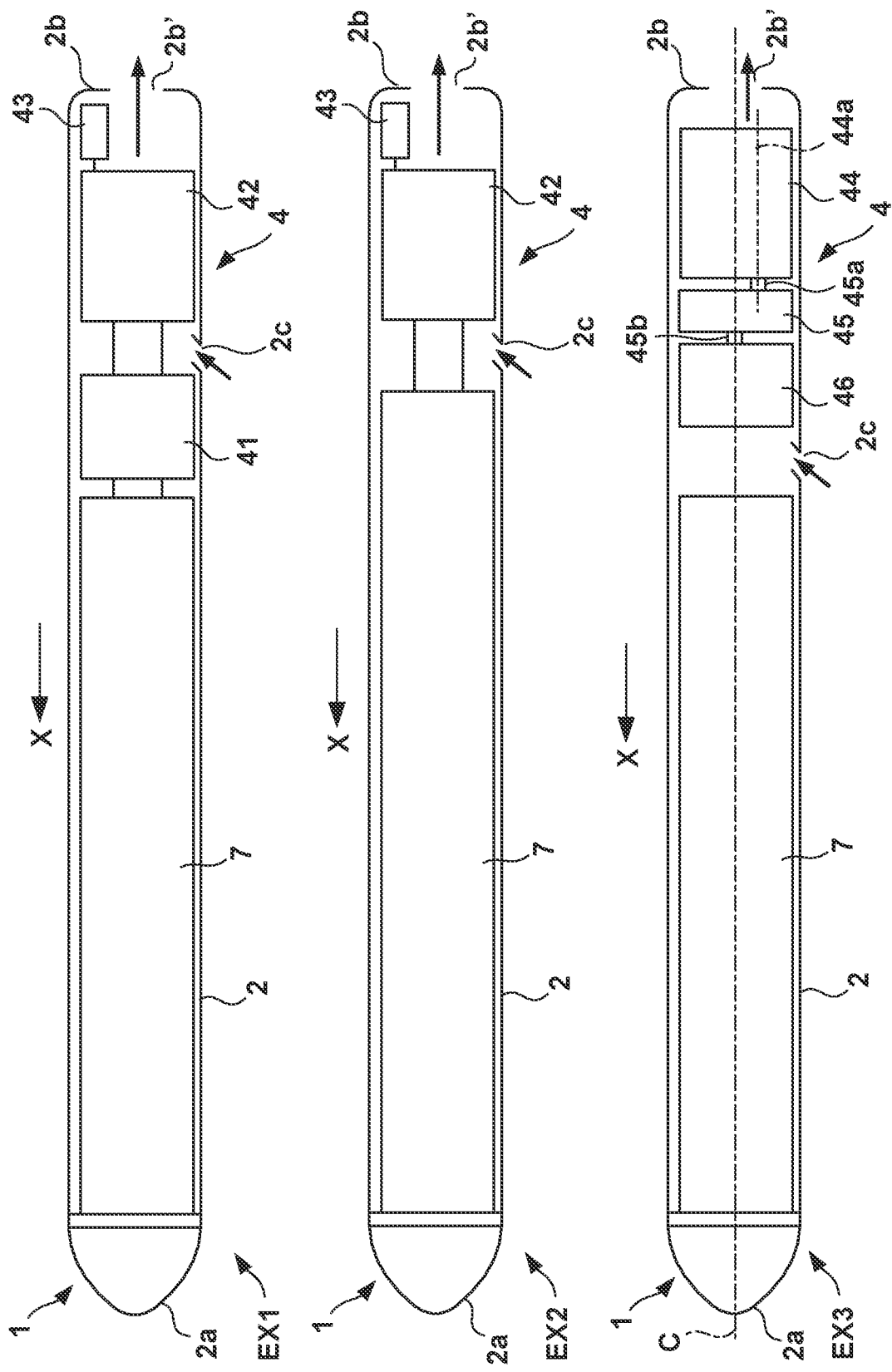
FIG. 4 is an explanatory view of a power supply device according to another example.

In the above embodiment, the combination of the gas turbine engine 6 and the power generator 5 is shown as the power generation unit 4. However, the present invention is not limited to this. FIG. 4 shows other examples EX1 to EX3 of the power generation unit 4.

The example EX1 shows an example in which a fuel cell is used. The power generation unit 4 includes a fuel reformer 41, a fuel cell (fuel cell stack) 42, and an inverter 43. Methanol, gasoline, or the like is reserved in the fuel tank 7. The fuel reformer 41 reforms the fuel in the fuel tank 7 into hydrogen gas by a chemical reaction, and supplies it to the fuel cell 42. The fuel cell 42 generates power using the hydrogen gas supplied from the fuel reformer 41 and air (oxygen) taken from the air intake ports 2c. The exhaust gas is exhausted from the exhaust portion 2b' to the outside of the housing 2. The generated power is rectified by the inverter 43 and supplied to the airframe 101. In the housing 2, a control unit that controls the power generation amount of the power generation unit 4 may be provided. In the example using the fuel cell, it is advantageous from the viewpoint of the power generation efficiency or low pollution. In addition, pipes can be made simpler than in the example in which the gas turbine engine 6 and the power generator 5 are combined.

The example EX2 also shows an example in which a fuel cell is used. In this example, it is assumed that hydrogen is reserved in the fuel tank 7. The power generation unit 4 does not include the fuel reformer 41, and includes the fuel cell (fuel cell stack) 42 and the inverter 43. Hydrogen gas is directly supplied from the fuel tank 7 to the fuel cell 42. Since the fuel reformer 41 is not provided, the apparatus can be made compact and lightweight.

The power generation unit 4 can also be formed by combining an internal combustion engine other than a gas turbine engine and a power generator. The example EX3 shows an example. The power generation unit 4 includes a reciprocating engine 44, a decelerator 45, and a power generator 46. The reciprocating engine 44 is, for example, a gasoline engine or a diesel engine, and a fuel such as gasoline or light oil is reserved in the fuel tank 7 in accordance with the type of the reciprocating engine 44.

The reciprocating engine 44 can be either a single-cylinder engine or a multi-cylinder engine. In a case of a multi-cylinder engine, various kinds of engine layouts such as an in-line layout or a V layout can be employed as the cylinder layout. In this embodiment, the reciprocating engine 44 is arranged such that its cylinder line direction is directed in the X direction. Because of this engine layout, it is difficult to arrange an output shaft 44a (crankshaft) on the same axis as the center axis C in many cases. In this embodiment, the position of the shaft is converted by interposing the shaft conversion portion 45 between the reciprocating engine 44 and the power generator 46. The shaft conversion portion 45 is, for example, a decelerator such as a gear device. An input shaft 45a of the shaft conversion portion 45 is arranged on the same axis as the output shaft 44a, and an output shaft 45b of the shaft conversion portion 45 is arranged on the same axis as the center axis C. The power generator 46 is a power generator having a structure similar to that of the power generator 5. The power generator 46 includes a rotating shaft on the same axis as the output shaft 45b, and generates power as it rotates. When the reciprocating engine 44 is used, the power supply device 1 of relatively low cost can be provided.

Other Embodiments

In the above embodiment, a helicopter has been shown as the flying body. In addition to such a rotorcraft, the present invention can be applied not only to an aircraft such as a fixed-wing aircraft or airship but also to a flying type personal mobility, spacecraft, a space shuttle, and the like. The rotorcraft can include a glider aircraft represented by a glider and an aircraft represented by a propeller plane. The present invention is also applicable to a flying body that is not of electric propulsion type.

The connection portions of the power supply device can include the upper surface of a wing portion of the airframe and the bottom surface of a wing portion of the airframe in addition to the bottom surface of the airframe. The power supplied by the power supply device may be power supplied to a power load that constitutes a driving source such as a motor, may be power supplied to a power load other than the driving source, or may be power supplied to both.

A plurality of power supply devices may be provided in one flying body. If a plurality of power supply devices are provided, they may be juxtaposed in the widthwise direction of the flying body, or may be arranged in one line in the front-and-rear direction of the flying body.

In the above embodiment, an example in which the housing 2 has a cylindrical shape has been described. However, the housing 2 may have another tubular shape such as a square tubular shape. In addition, the housing 2 may include a portion with a cylindrical shape and a portion with a square tubular shape.

Second Embodiment

The second embodiment of the present invention will be described with reference to FIGS. 5 to 11.

Figure 5:
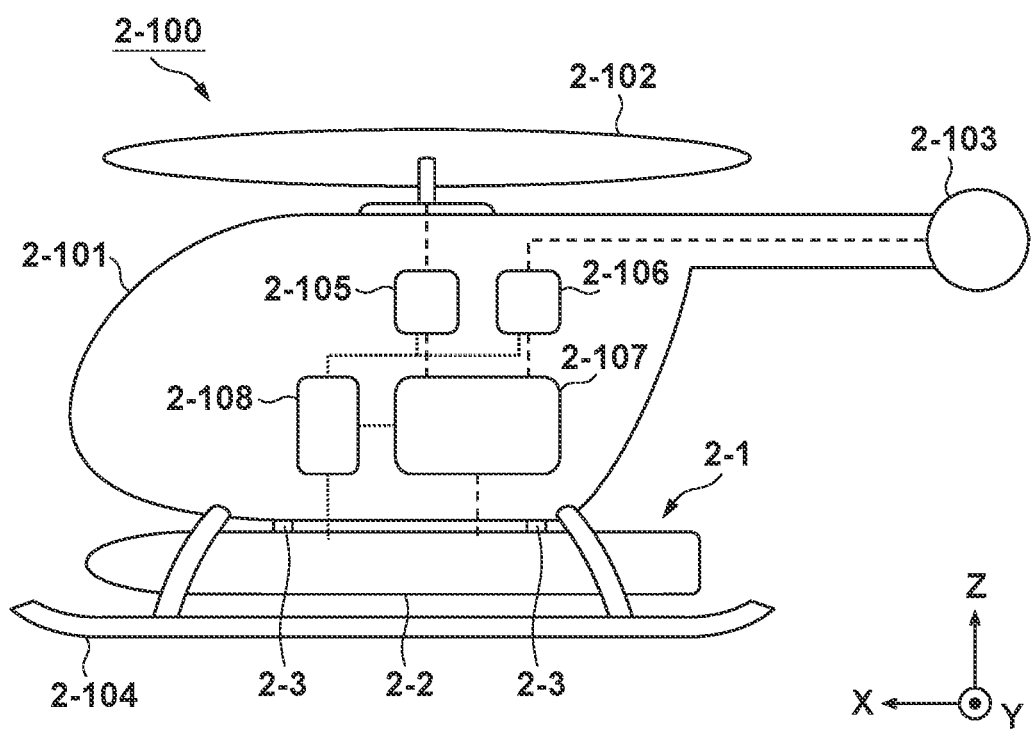
FIG. 5 is a schematic view of a flying body including a power supply device.

FIG. 5 is a schematic view of a flying body 2-100 including a power supply device 2-1 according to the second embodiment of the present invention. In FIG. 5, arrows X, Y, and Z indicate the front-and-rear direction, the widthwise direction (left-and-right direction), and the up-and-down direction of the flying body 2-100, respectively. The flying body 2-100 according to the second embodiment is an electric propulsion type flying body using motors 2-105 and 2-106 as driving sources and, more particularly, a helicopter.

The flying body 2-100 includes an airframe 2-101 with a cabin, a main rotor 2-102 provided in the upper portion of the airframe 2-101, a tail rotor 2-103 provided in the rear portion of the airframe 2-101, and skids 2-104. The motor 2-105 is a driving source that rotates the main rotor 2-102, and the motor 2-106 is a driving source that rotates the tail rotor 2-103. Power is suppled from a battery 2-107 to the motors 2-105 and 2-106, and driving of the motors 2-105 and 2-106 is controlled by a control device 2-108. In addition, power generated by the power supply device 2-1 is supplied to the battery 2-107 via a cable (not shown). In the second embodiment, the power generated by the power supply device 2-1 is supplied to the battery 2-107 of the airframe 2-101. However, the power generated by the power supply device 2-1 may directly be supplied to the motors 2-105 and 2-106 without an intervention of a battery.

The power supply device 2-1 is arranged outside the airframe 2-101, and connected to the airframe 2-101 by a plurality of connecting mechanisms 2-3. In the second embodiment, the power supply device 2-1 is arranged between the left and right skids 2-104 in the Y direction, and supported while being hung from the bottom wall of the airframe 2-101. When the power supply device 2-1 is arranged outside the airframe 2-101, occupation of the internal space of the airframe 2-101 by the power supply device 2-1 can be avoided. This can expand the cabin, improve layout of other components, and improve of maintenability of the power supply device 2-1.

Figure 6:
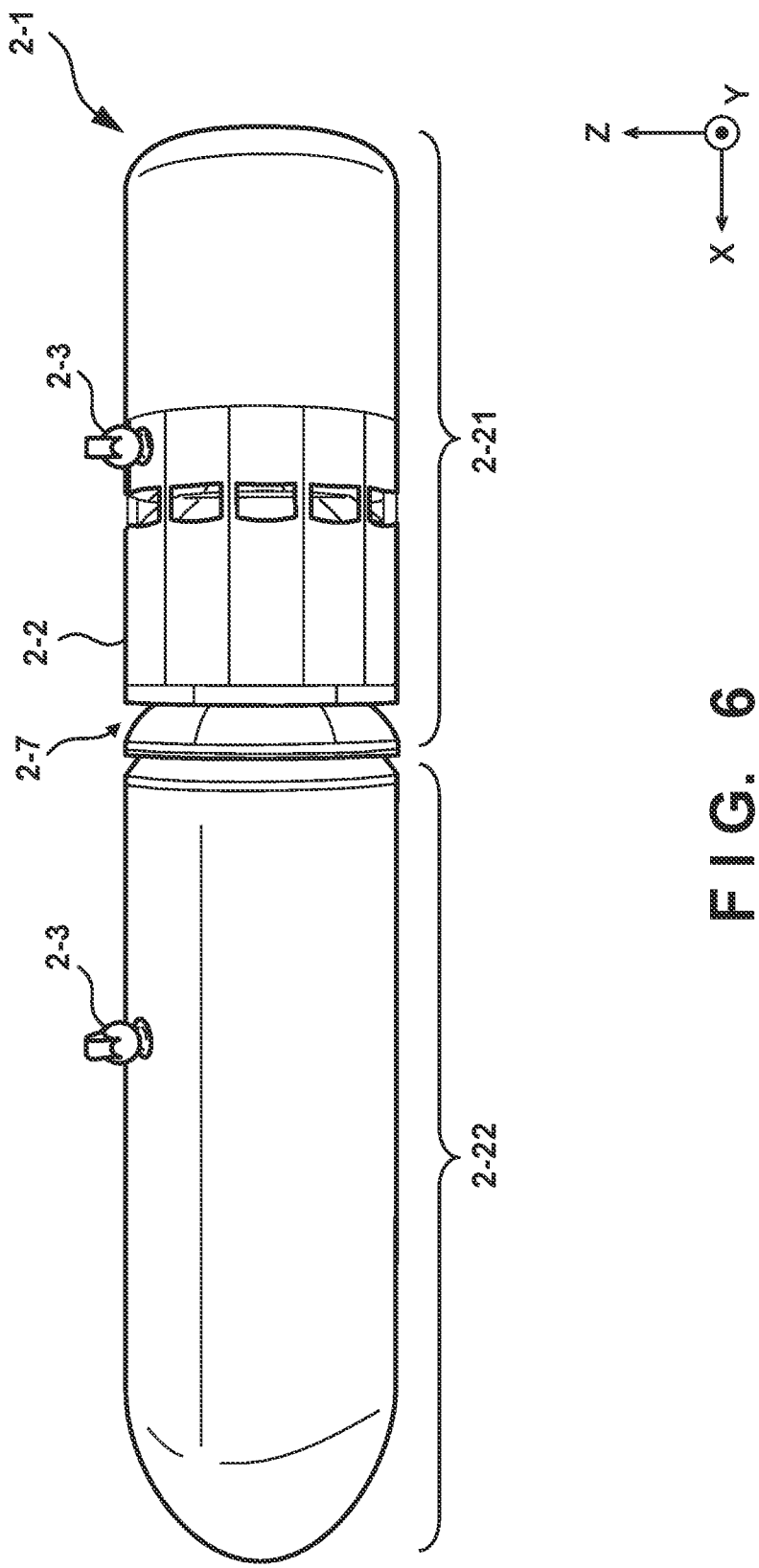
FIG. 6 is an external view of the power supply device.
Figure 7:
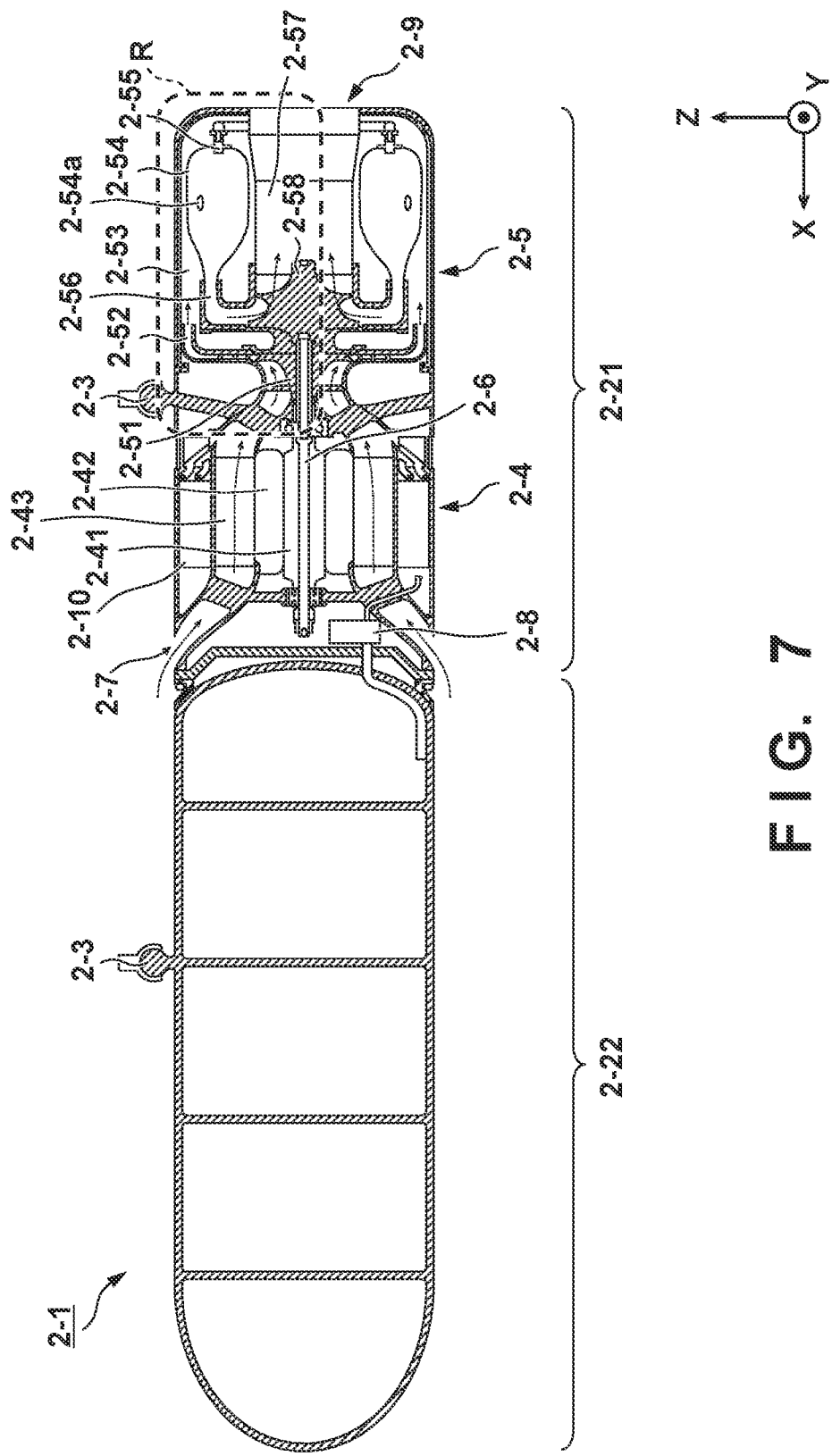
FIG. 7 is a sectional view of the power supply device.

The power supply device 2-1 will be described next with reference to FIGS. 6 and 7. FIG. 6 is an external view of the power supply device 2-1, and FIG. 7 is a sectional view of the power supply device 2-1. The power supply device 2-1 includes a hollow housing 2-2 that forms the outer wall of the power supply device 2-1, and the plurality of connecting mechanisms 2-3 that connect the housing 2-2 and the airframe 2-101.

The housing 2-2 has an outer shape long in the X direction (that is, a pod-like outer shape long in the X direction). Hence, in other words, the X direction defined in the second embodiment can be said to be the longitudinal direction of the housing 2-2. When the housing 2-2 arranged outside the airframe 2-101 has such an outer shape, the air drag during forward flight of the flying body 2-100 can be reduced. Since the body portion of the housing 2-2 according to the second embodiment has a columnar shape, the influence of a cross wind can be made smaller. In addition, the distal end portion of the housing 2-2 has a tapered shape whose diameter is reduced toward the front. In the second embodiment, the distal end portion of the housing 2-2 is formed into a hemispherical shape but may have a triangular pyramid shape. When the distal end portion is formed into a tapered shape, the air drag during forward flight of the flying body 2-100 can further be reduced.

The plurality of connecting mechanisms 2-3 are provided on the housing 2-2 apart in the front-and-rear direction of the flying body 2-100, and connect the housing 2-2 and the airframe 2-101. The housing 2-2 according to the second embodiment includes a total of two connecting mechanisms 2-3 including one connecting mechanism 2-3 on a storage portion 2-21 to be described later, and one connecting mechanism 2-3 on a fuel tank 2-22, and is connected apart from the airframe 2-101 by the plurality of (two) connecting mechanisms 2-3. The connecting mechanism 2-3 detachably connects the power supply device 2-1 (housing 2-2) and the airframe 2-101. The structure may be a fastening structure using a bolt and a threaded hole, or may be an engaging structure using a hook and a hole. When the power supply device 2-1 (housing 2-2) is detachable from the airframe 2-101, exchange of the power supply device 2-1 can be facilitated, or maintenability can be improved.

[Internal Structure of Housing]

The internal structure of the housing 2-2 will be described next. The housing according to the second embodiment includes the storage portion 2-21 that stores a power generation unit, and the fuel tank 2-22 serving as a reserving portion that stores the fuel of the power generation unit. For example, methanol, gasoline, or the like can be used as the fuel reserved in the fuel tank 2-22. The storage portion 2-21 and the fuel tank 2-22 are arrayed along the front-and-rear direction (X direction) of the flying body 2-100, and separably connected by a connecting portion. In the second embodiment, the fuel tank 2-22 is arranged on the front side of the flying body 2-100, and the storage portion 2-21 is arranged on the rear side of the flying body 2-100. In addition, the storage portion 2-21 and the fuel tank 2-22 are preferably formed into the same thickness (sectional diameter). When the storage portion 2-21 and the fuel tank 2-22 are constituted/arranged in this way, the air drag during forward flight of the flying body 2-100 can be reduced.

Figure 8:
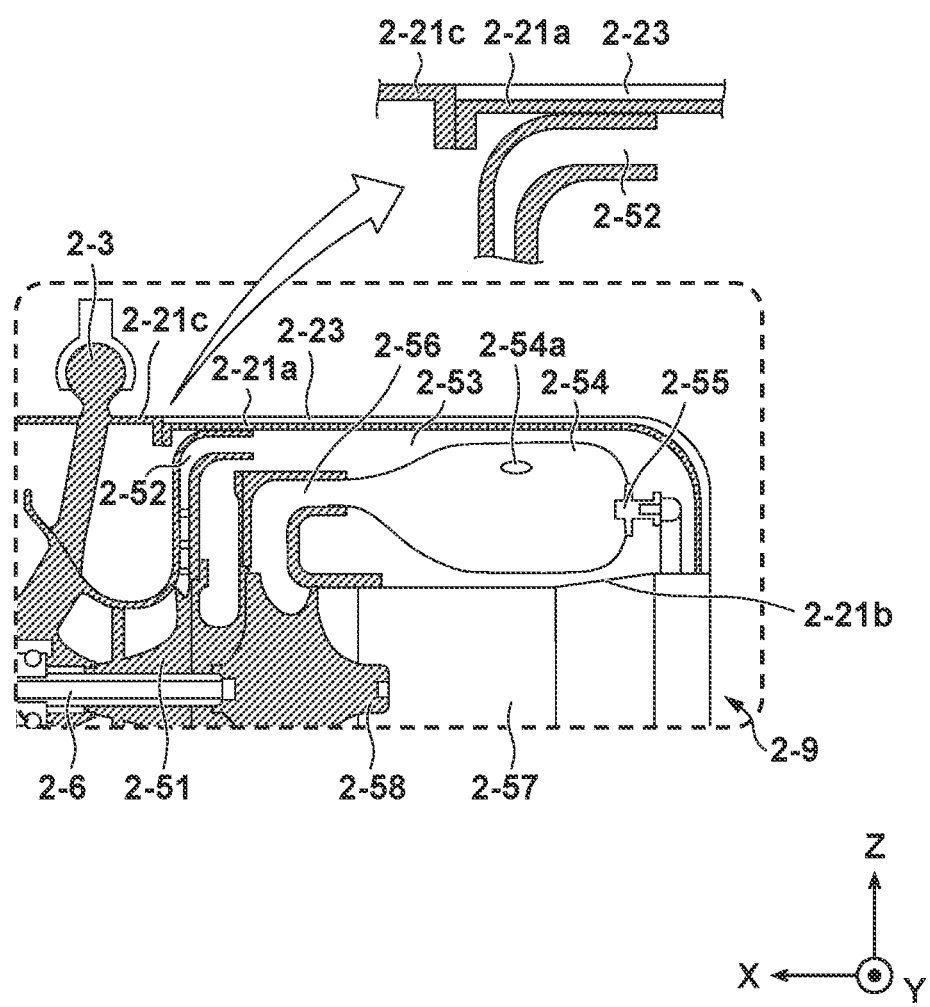
FIG. 8 is an enlarged view of a region R shown in FIG. 7.

The power generation unit stored in the storage portion 2-21 will be described with reference to FIGS. 7 and 8. FIG. 8 is an enlarged view of a region R shown in FIG. 7. The power generation unit includes a power generator 2-4 and a gas turbine engine 2-5. The power generator 2-4 generates power by the output of the gas turbine engine 2-5. In the second embodiment, the power generator 2-4 and the gas turbine engine 2-5 are provided on a common rotating shaft 2-6. When the gas turbine engine 2-5 rotationally drives the rotating shaft 2-6, the power generator 2-4 can generate power. With this arrangement, the power generator 2-4 and the gas turbine engine 2-5 can be arranged without wasting the space, and the size can be reduced.

The gas turbine engine 2-5 includes a compressor including an impeller 2-51 and a diffuser 2-52. The impeller 2-51 is attached to the rotating shaft 2-6. Air taken from air intake ports 2-7 is sent to a compression chamber 2-53 while being compressed via the diffuser 2-52 as the impeller 2-51 rotates. As shown in FIG. 8, the compression chamber 2-53 is a closed space defined between a tubular outer circumferential case 2-21a that constitutes part (first portion) of the storage portion 2-21 surrounding the gas turbine engine 2-5 and a tubular inner circumferential case 2-21b that is arranged inside the outer circumferential case 2-21a and constitutes an exhaust pipe 2-57. The compressed air held in the compression chamber 2-53 is taken from opening portions 2-54a provided in the circumferential wall of a combustion chamber 2-54 and other opening portions into the combustion chamber 2-54. In the combustion chamber 2-54, fuel injection nozzles 2-55 are provided, and the fuel taken from the fuel tank 2-22 via a pipe by a fuel pump 2-8 (supply portion) is injected (supplied) into the combustion chamber 2-54 by the fuel injection nozzles 2-55. At the time of start, an ignition device (not shown) ignites the air fuel mixture in the combustion chamber 2-54. After that, combustion of the air fuel mixture continuously occurs in the combustion chamber 2-54.

A combustion gas that has a high temperature and a high pressure in the combustion chamber 2-54 jets out from turbine nozzles 2-56 to the exhaust pipe 2-57 (the inside of the inner circumferential case 2-21b), rotates a turbine 2-58 attached to the rotating shaft 2-6, and is discharged to the rear from an exhaust port 2-9 provided in the rear portion of the power supply device 2-1. The impeller 2-51, the turbine 2-58, and a rotor 2-41 (permanent magnet) of the power generator 2-4 to be described later are provided on the rotating shaft 2-6, and the impeller 2-51 and the rotor 2-41 can integrally be rotated by the rotation of the turbine 2-58. Note that in the second embodiment, the gas turbine engine 2-5 exclusively aims at driving the power generator 2-4, and actively using the exhaust gas flow as the thrust of the flying body 2-100 is not assumed. However, a form in which the exhaust gas flow is used as an auxiliary thrust is also possible.

The power generator 2-4 includes the rotor 2-41 such as a permanent magnet attached to the rotating shaft 2-6 and a stator 2-42 such as a coil disposed around the rotor 2-41. When the rotating shaft 2-6 is rotated by the gas turbine engine 2-5, and the rotor 2-41 attached to the rotating shaft 2-6 thus rotates, the stator 2-42 can generate power. In addition, a plurality of fins 2-43 configured to cool the stator 2-42 are provided around the stator 2-42 in the circumferential direction of the rotating shaft 2-6. The plurality of fins 2-43 are arranged in a space to which the air taken from the air intake ports 2-7 is guided. When the air passes between the plurality of fins 2-43, the plurality of fins 2-43 are cooled, and the stator 2-42 can thus be cooled.

A control unit 2-10 includes a circuit that controls power generation of the power generator 2-4, and a circuit that controls driving of the gas turbine engine 2-5. An auxiliary power supply such as a battery may be provided as the power supply in activating the control unit 2-10. The auxiliary power supply may be provided in the housing 2-2, or may be provided in the airframe 2-101. Power generated by the power generator 2-4 is supplied to a power load (the battery 2-107 or the motors 2-105 and 2-106) in the airframe 2-101 via a cable (not shown). The cable may pass through the connecting mechanisms 2-3. In addition, the control unit 2-10 of the power supply device 2-1 may be able to communicate with the control device 2-108 of the airframe 2-101, and the control unit 2-10 may be configured to perform power generation control in accordance with an instruction from the control device 2-108.

As described above, when the power supply device 2-1 is arranged outside the airframe 2-101, the degree of freedom in designing the airframe 2-101 of the flying body 2-100 can be improved. For example, it is possible to ensure a wider cabin space in the airframe 2-101 and improve the comfort of crew. In addition, noise and vibrations generated by the operation of the power supply device 2-1 are reduced as compared to a case in which the power supply device 2-1 is provided in the airframe 2-101, and silence can be improved. Furthermore, as compared to a case in which the power supply device 2-1 is provided in the airframe 2-101, access to the inside of the power supply device 2-1 is easy, the maintenance is facilitated, and the maintenance burden can be reduced. The power supply device 2-1 alone can be developed separately from the airframe 2-101, various kinds of qualification tests and type certifications before mass production become easy, and mass production can be implemented early. Furthermore, the power supply device 2-1 has a shape long in the front-and-rear direction of the flying body 2-100, that is, a low air drag shape with a small front projection area. For this reason, even in the arrangement in which the power supply device 2-1 is arranged outside the airframe 2-101, the fuel consumption performance of the flying body 2-100 is not greatly lowered. Since the gas turbine engine 2-5 of the power supply device 2-1 does not aim at generating the thrust of the flying body 2-100, the rigidity of the connecting mechanisms 2-3 can be low, and the structure can be relatively simple.

[Heat Insulating Structure]

The power supply device 2-1 according to the second embodiment is arranged outside the airframe 2-101. Since the gas turbine engine 2-5 that is a constituent element of the power generation unit becomes hot, safety needs to be ensured. In addition, since the power supply device 2-1 is exposed to outside air at the time of flight, there is a fear about lowering of the thermal efficiency (fuel consumption performance) of the gas turbine engine 2-5. Hence, in the power supply device 2-1 according to the second embodiment, in the housing 2-2, the outer circumferential case 2-21a that is part (first portion) of the storage portion 2-21 surrounding the gas turbine engine 2-5 is covered by a heat insulating member 2-23.

An example of the arrangement of the heat insulating member 2-23 will be described with reference to FIG. 8. The heat insulating member 2-23 is formed into a tubular shape to cover the tubular outer circumferential case 2-21a. In the portion where the exhaust port 2-9 is arranged, an opening is provided so the discharge of the combustion gas is not impeded. In addition, the sectional diameter (thickness) of the heat insulating member 2-23 is formed to be equal to or less than the sectional diameter (thickness) of part (second portion 2-21c) of the storage portion 2-21 surrounding the power generator 2-4. More preferably, the outer surface of the heat insulating member 2-23 is configured to form a continuous surface that continues to the outer surface of the second portion 2-21c. That is, the heat insulating member 2-23 is preferably configured not to form a step at the boundary between the outer surface of the second portion 2-21c of the storage portion 2-21 and the outer surface of the heat insulating member 2-23 (for example, to form a step of 0.5 mm or less). When the heat insulating member 2-23 has such an outer shape, the air drag during forward flight of the flying body 2-100 can be reduced.

Figure 9:
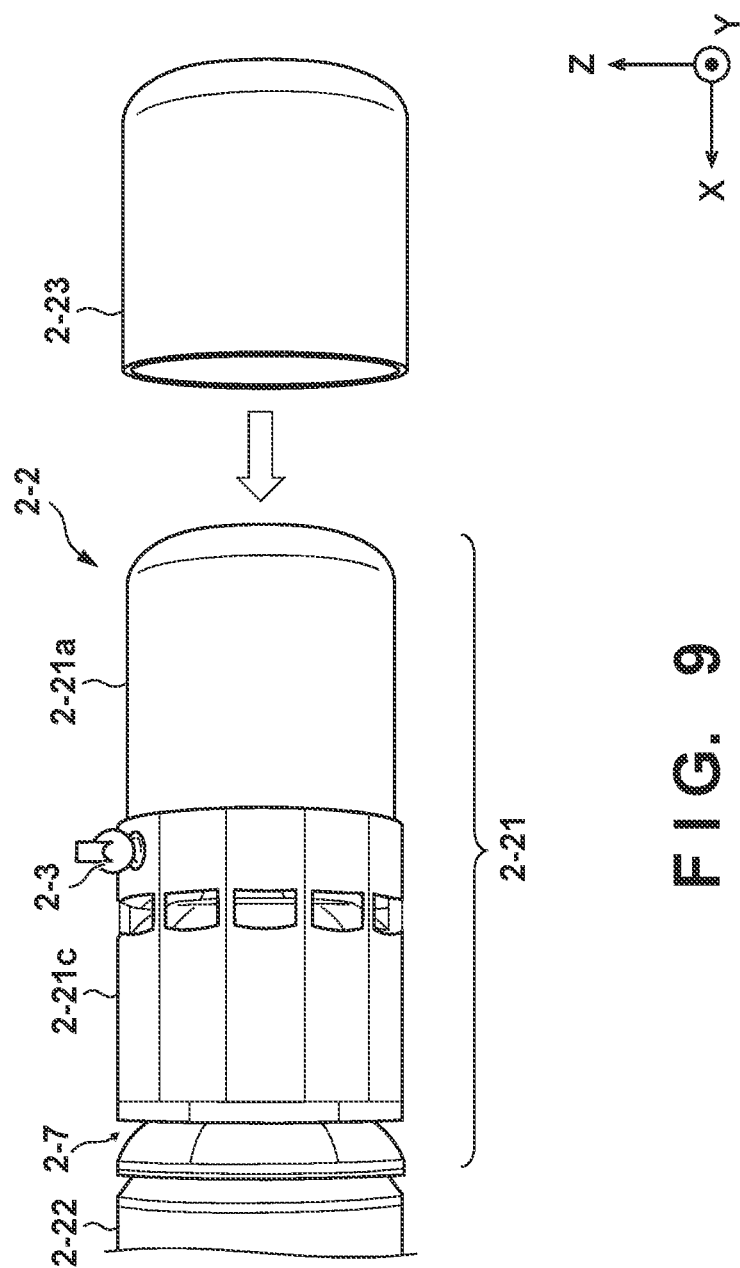
FIG. 9 is a schematic view showing an example of attachment of a heat insulating member.

In the second embodiment, as shown in FIG. 9, the heat insulating member 2-23 is formed into a tubular shape, fitted on the outer circumferential case 2-21a, and joined to the outer circumferential case 2-21a. As the joining method for the heat insulating member 2-23 and the outer circumferential case 2-21a, for example, adhesive joining using an adhesive, mechanical joining using a rivet, a screw, or the like, or welding can be used. If mechanical joining using a detachable part such as a screw is applied, the heat insulating member 2-23 may be configured to be detachable for the outer circumferential case 2-21a. In a case in which the heat insulating member 2-23 is configured to be detachable, when performing maintenance of the gas turbine engine 2-5, the heat insulating member 2-23 can be detached from the outer circumferential case 2-21a to easily access the gas turbine engine 2-5. Hence, the maintenability can be improved.

Figure 10:
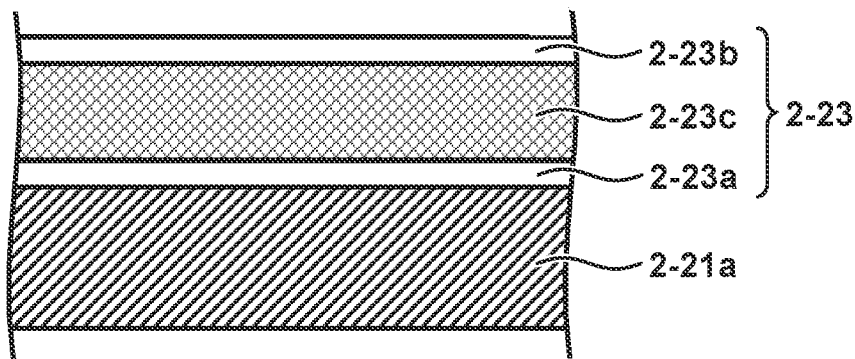
FIG. 10 is a schematic view showing the sectional structure of the heat insulating member.

The detailed sectional structure of the heat insulating member 2-23 will be described next with reference to FIG. 10. FIG. 10 is a schematic view showing the sectional structure of the heat insulating member 2-23. The heat insulating member 2-23 includes an inside member 2-23a that surrounds the outer circumferential case 2-21a (the first portion of the storage portion 2-21), an outside member 2-23b that surrounds the inside member 2-23a, and a core member 2-23c interposed between the inside member 2-23a and the outside member 2-23b. The inside member 2-23a is in contact with (connected to) the outer surface of the outer circumferential case 2-21a. In the second embodiment, the inside member 2-23a and the outside member 2-23b are made of a metal such as stainless steel or steel, and the core member 2-23c is made of at least one of alumina fiber, glass fiber, and ceramic fiber. When the core member 2-23c is interposed in this way, a higher heat insulating effect can be implemented as compared to a case in which the gas turbine engine 2-5 is covered with only a metal such as stainless steel or steel. It is therefore possible to ensure safety and reduce the lowering of the thermal efficiency (fuel consumption performance) of the gas turbine engine 2-5.

Figure 11:
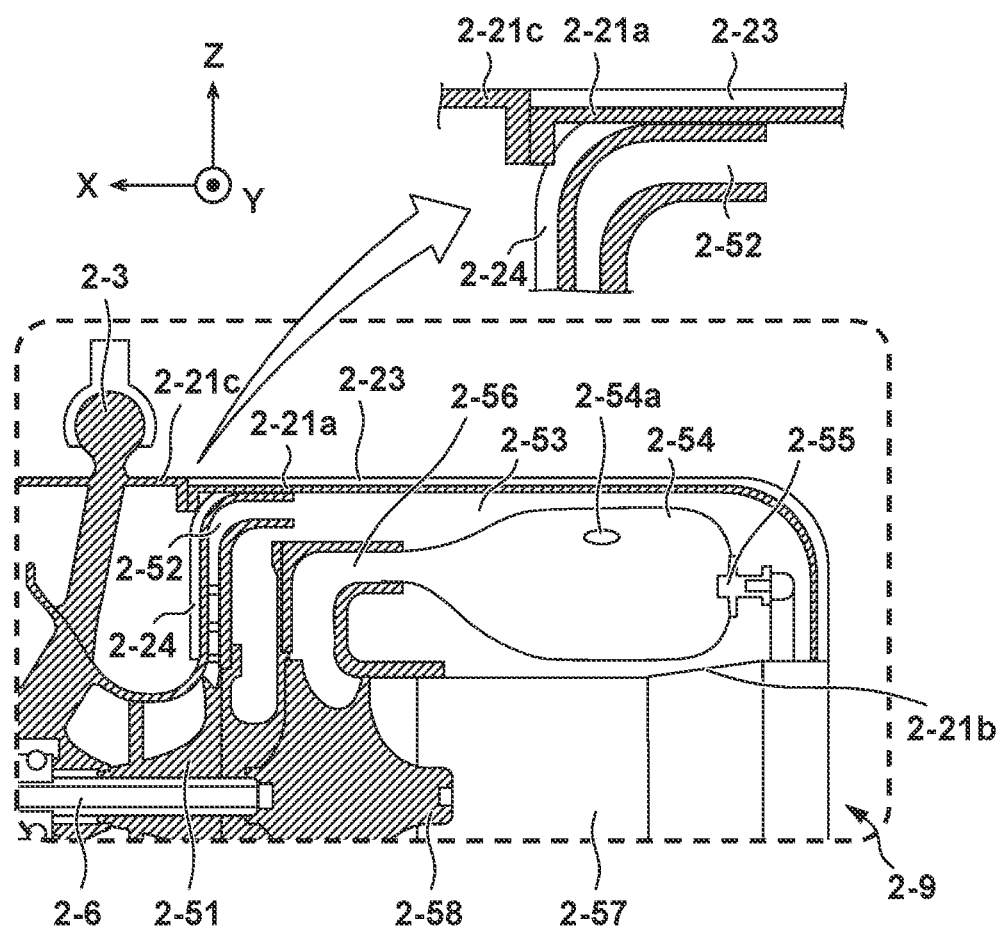
FIG. 11 is a schematic view showing an example in which a second heat insulating member is further provided.

Here, in the second embodiment, a heat insulating member 2-24 (second heat insulating member) may also be provided between the power generator 2-4 and the gas turbine engine 2-5. For example, as shown in FIG. 11, the heat insulating member 2-24 can be provided on the surface of the diffuser 2-52 of the gas turbine engine 2-5 on the side of the power generator 2-4. FIG. 11 is an enlarged view of the region R in FIG. 7, and shows an example in which the heat insulating member 2-24 is provided between the power generator 2-4 and the gas turbine engine 2-5, in addition to the heat insulating member 2-23 surrounding the outer circumferential case 2-21a. When the heat insulating member 2-24 is provided in this way, heat transmitted from the gas turbine engine 2-5 to the power generator 2-4 can be reduced, and the lowering of the thermal efficiency (fuel consumption performance) of the gas turbine engine 2-5 can further be reduced. In the power generator 2-4 as well, the lowering of the power generation efficiency caused by heat can be reduced.

Other Embodiments

In the above second embodiment, a helicopter has been shown as the flying body 2-100. In addition to such a rotorcraft, the present invention can be applied not only to an aircraft such as a fixed-wing aircraft or airship but also to a flying type personal mobility, spacecraft, a space shuttle, and the like. The rotorcraft can include a glider aircraft represented by a glider and an aircraft represented by a propeller plane. The present invention is also applicable to a flying body that is not of electric propulsion type.

The connection portions of the power supply device 2-1 can include the upper surface of a wing portion of the airframe 2-101 and the bottom surface of a wing portion of the airframe 2-101 in addition to the bottom surface of the airframe 2-101. The power supplied by the power supply device 2-1 may be power supplied to a power load that constitutes a driving source such as a motor, may be power supplied to a power load other than the driving source, or may be power supplied to both.

A plurality of power supply devices 2-1 may be provided in one flying body. If a plurality of power supply devices are provided, they may be juxtaposed in the widthwise direction of the flying body, or may be arranged in one line in the front-and-rear direction of the flying body.

In the above second embodiment, an example in which the housing 2-2 has a cylindrical shape has been described. However, the housing 2-2 may have another tubular shape such as a square tubular shape. In addition, the housing 2-2 may include a portion with a cylindrical shape and a portion with a square tubular shape.

Third Embodiment

The third embodiment of the present invention will be described below with reference to FIGS. 12 to 17.

[Outline of Flying Body]

Figure 12:
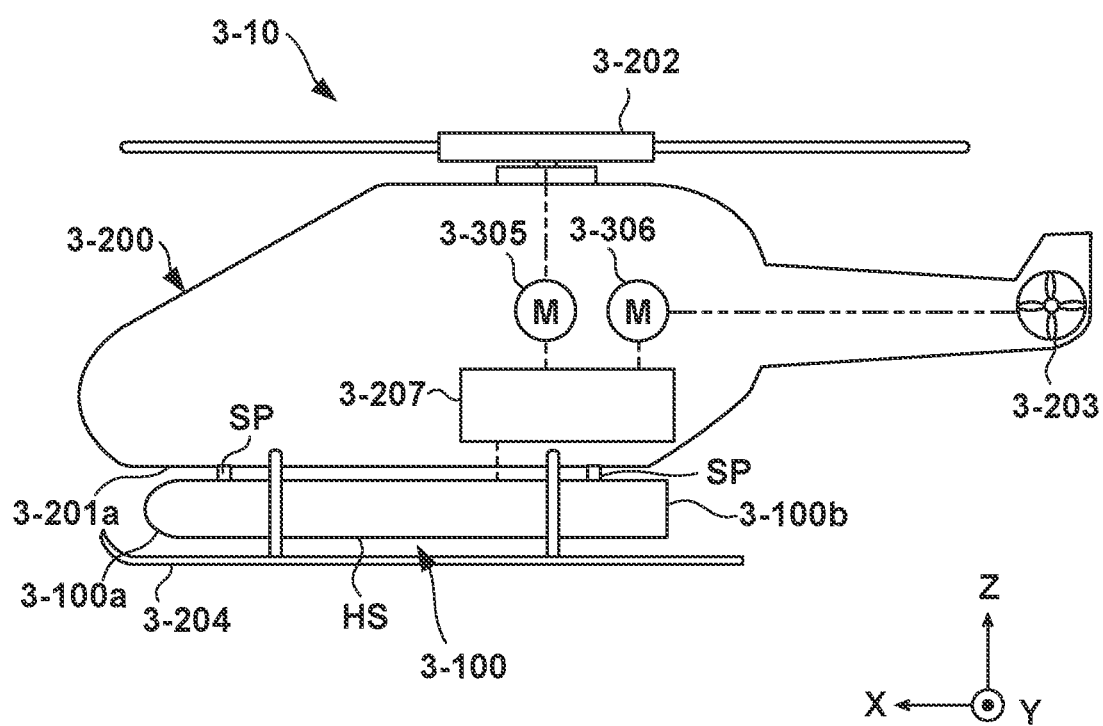
FIG. 12 is a schematic view of a flying body including a power supply device according to the third embodiment.

FIG. 12 is a schematic view of a flying body 3-10 including a power supply device 3-100 according to the third embodiment of the present invention. In FIG. 12, arrows x, y, and z indicate the front-and-rear direction, the widthwise direction (left-and-right direction), and the up-and-down direction of the flying body 3-10, respectively. The flying body 3-10 according to the third embodiment is an electric propulsion type flying body using motors 3-305 and 3-306 as driving sources and, more particularly, a helicopter.

The flying body 3-10 includes an airframe 3-200, a main rotor 3-202 provided in the upper portion of the airframe 3-200, a tail rotor 3-203 provided in the rear portion of the airframe 3-200, and skids 3-204. The motor 3-305 is a driving source that rotates the main rotor 3-202, and the motor 3-306 is a driving source that rotates the tail rotor 3-203. Driving of the motors 3-305 and 3-306 is controlled by a control unit 3-207 (control device) using power supplied from the power supply device 3-100.

The power supply device 3-100 functions as the main power supply of the flying body 3-10, and supplies not only the driving power for the motors 3-305 and 3-306 but also power to each power load in the flying body 3-10.

The power supply device 3-100 includes a housing HS that forms the outer wall of the power supply device 3-100, and a plurality of connecting portions (to be referred to as "separation mechanisms SP" hereinafter) configured to be able to connect or separate the housing HS to or from the airframe 3-200. A plurality of (here, two) separation mechanisms SP are provided apart in the x direction. The housing HS is connected apart from the airframe 3-200 by the separation mechanisms SP. The housing HS is arranged outside the airframe 3-200 and, in the third embodiment, supported at the center in the y direction while being hung from the bottom wall of the airframe 3-200 via the separation mechanisms SP. When the housing HS is arranged outside the airframe 3-200, occupation of the internal space of the airframe 3-200 by the power supply device 3-100 can be avoided. This contributes to expansion of a cabin, improvement of layout of other components, and improvement of maintenability of the power supply device 3-100.

The housing HS has an outer shape long in the x direction. In the third embodiment, the housing HS has a pod-like outer shape long in the x direction in particular. In other words, the x direction is the longitudinal direction of the housing HS. When the housing HS has such an outer shape, the air drag during forward flight of the flying body 3-10 can be reduced while arranging the housing HS outside the airframe 3-200. The housing HS according to the third embodiment is a hollow body having a cylindrical shape long in the x direction. This can make the influence of a cross wind smaller.

The housing HS can be formed by, for example, connecting a plurality of parts having a cylindrical shape in the x direction. Of a distal end portion 3-100*a* and a rear end portion 3-100*b* of the housing HS in the x direction, the distal end portion 3-100*a* has a tapered shape whose diameter is reduced toward the front. In the third embodiment, the distal end portion 3-100*a* has a hemispherical shape but may have a triangular pyramid shape. When the distal end portion 3-100*a* has a tapered shape, the air drag during forward flight of the flying body 3-10 can further be reduced.

[Outline of Power Supply Device]

Figure 13:
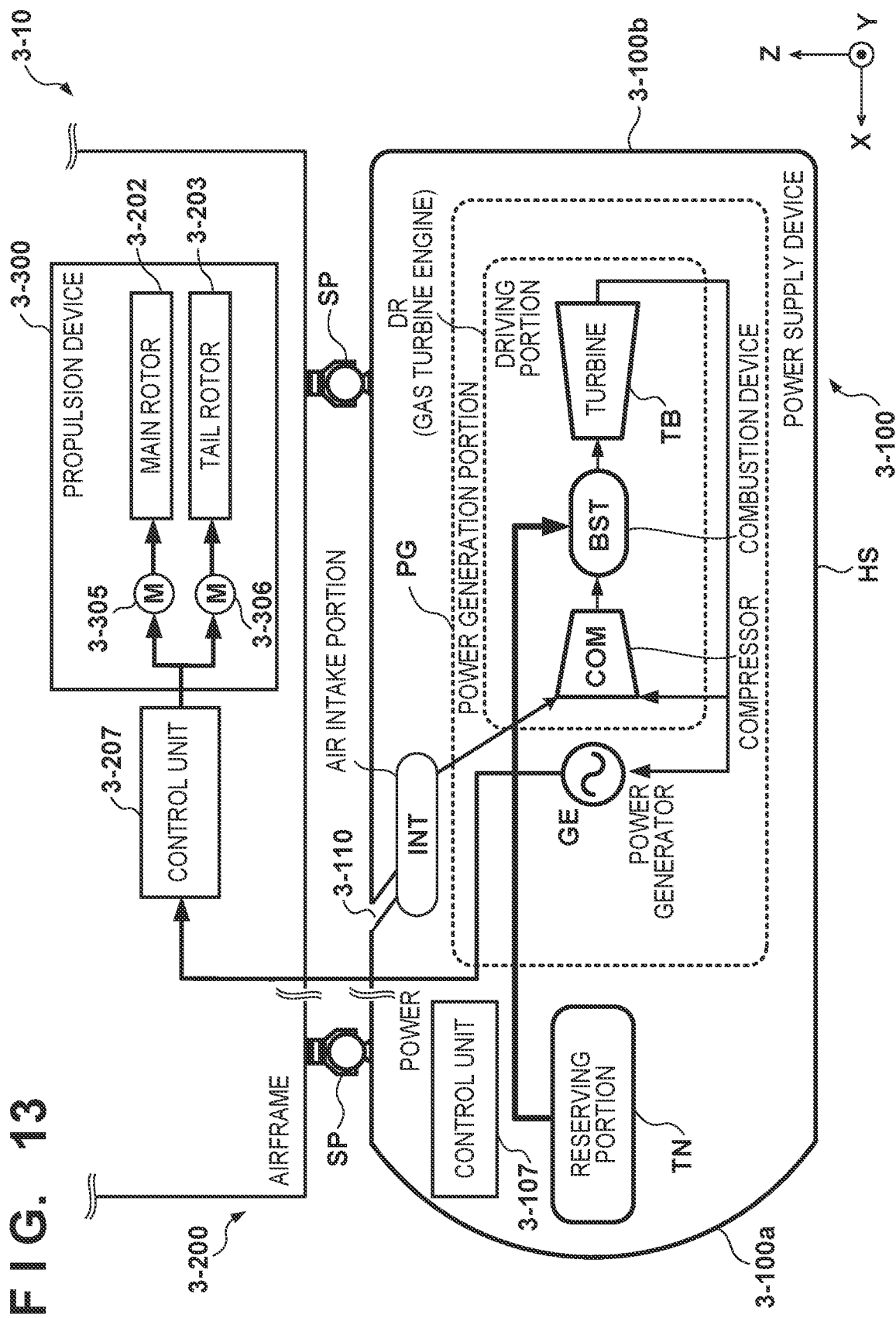
FIG. 13 is a block diagram showing the functional arrangement of the power supply device according to the third embodiment.

FIG. 13 is a block diagram showing the functional arrangement of the power supply device 3-100 according to the third embodiment of the present invention. The flying body 3-10 including a propulsion device 3-300 that generates a thrust based on power includes the power supply device 3-100 and the airframe 3-200 (airframe main body). The power supply device 3-100 is connected to the outside of the airframe 3-200. Here, the propulsion device 3-300 includes the main rotor 3-202 using the motor 3-305 as the driving source, and the tail rotor 3-203 using the motor 3-306 as the driving source, which have been described with reference to FIG. 12. The power supply device 3-100 supplies generated power to the control unit 3-207 of the airframe 3-200, and the control unit 3-207 controls driving of the motors 3-305 and 3-306 based on the supplied power. In FIG. 13, the x direction is the flying direction in which the flying body 3-10 propels, and is the longitudinal direction of the power supply device 3-100. The y direction is the widthwise direction of the housing HS, and the z direction is the vertical direction of the housing HS orthogonal to the longitudinal direction (x direction) and the widthwise direction (y direction) of the housing HS.

A power generation portion PG includes a power generator GE and a driving portion DR (gas turbine engine), and the power generator GE generates power by the output of the driving portion DR. Here, the driving portion DR (gas turbine engine) includes a compressor COM, a combustion device BST, and a turbine TB, and generates motive power used to rotationally drive the power generator GE.

The power generation portion PG (the power generator GE, the compressor COM, the combustion device BST, and the turbine TB) supplies power used to drive the propulsion device 3-300 (the main rotor 3-202, the tail rotor 3-203, and the motors 3-305 and 3-306) of the flying body 3-10 that generates a thrust.

In the power supply device 3-100, the hollow cylindrical housing HS that stores the power generation portion PG (the power generator GE, the compressor COM, the combustion device BST, and the turbine TB), a reserving portion TN (fuel tank) that reserves a fuel and supplies it to the combustion device BST in the power generation portion PG, and an air intake portion INT that takes outside air and supplies it to the compressor COM in the power generation portion PG is connected to the airframe 3-200 of the flying body 3-10 via the detachable separation mechanisms SP.

As shown in FIG. 13, in the housing HS of the power supply device 3-100, the reserving portion TN (fuel tank), the air intake portion INT, and the power generation portion PG (the power generator GE and the driving portion DR (the gas turbine engine: the compressor COM, the combustion device BST, and the turbine TB)) are integrally packaged. The power supply device 3-100 is connected in the vertical direction to the lower side surface of the airframe 3-200 via the separation mechanisms SP.

An inlet portion 3-110 of the air intake portion INT is formed in the outer peripheral surface of the housing HS, and takes the air outside the housing HS. The air taken by the inlet portion 3-110 of the air intake portion INT is introduced into the compressor COM via an introduction passage formed in the housing. The air intake portion INT will be described later in detail with reference to FIGS. 15 and 16.

Figure 14:
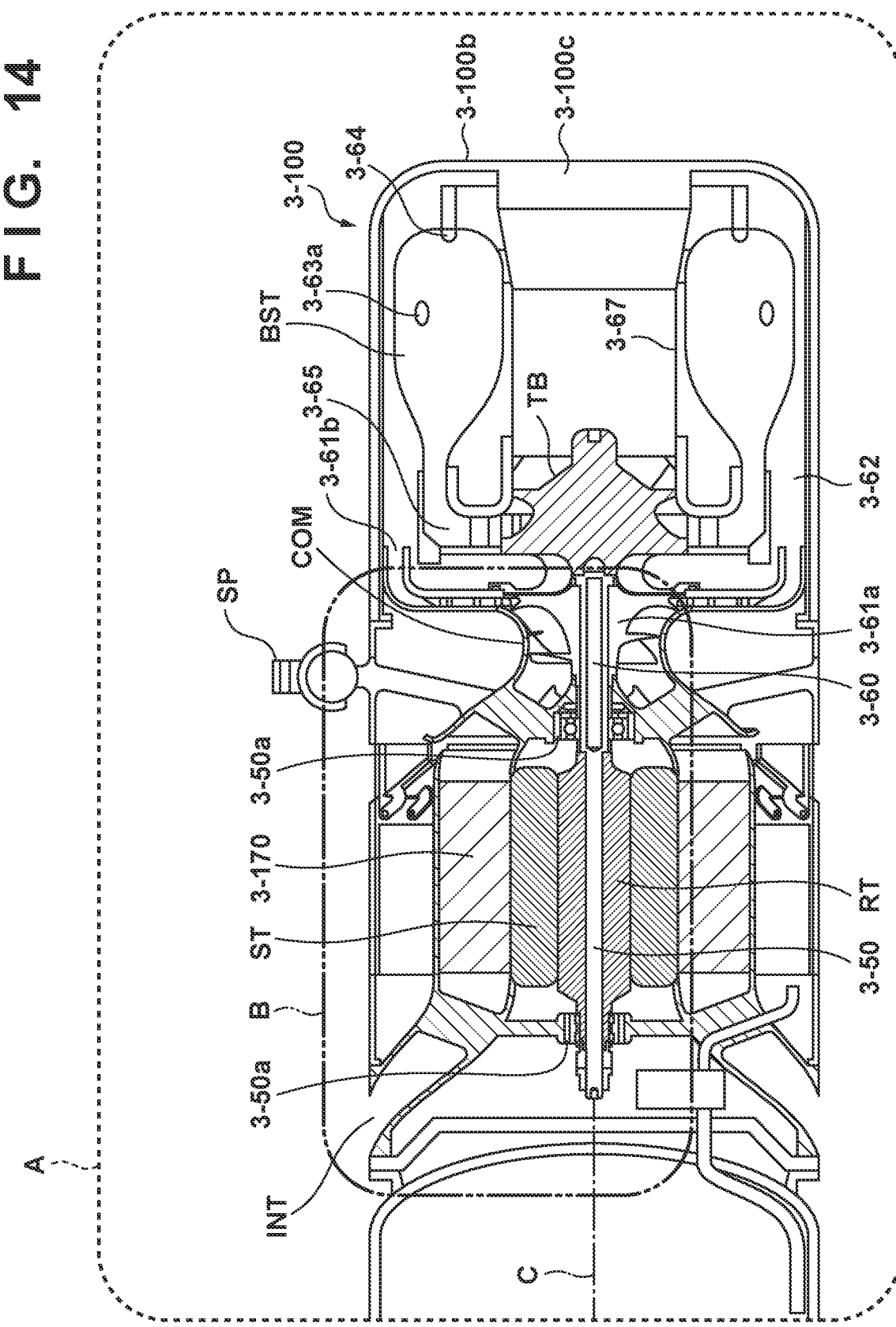
FIG. 14 is a view showing the detailed arrangement of a power generation unit.
Figure 15:
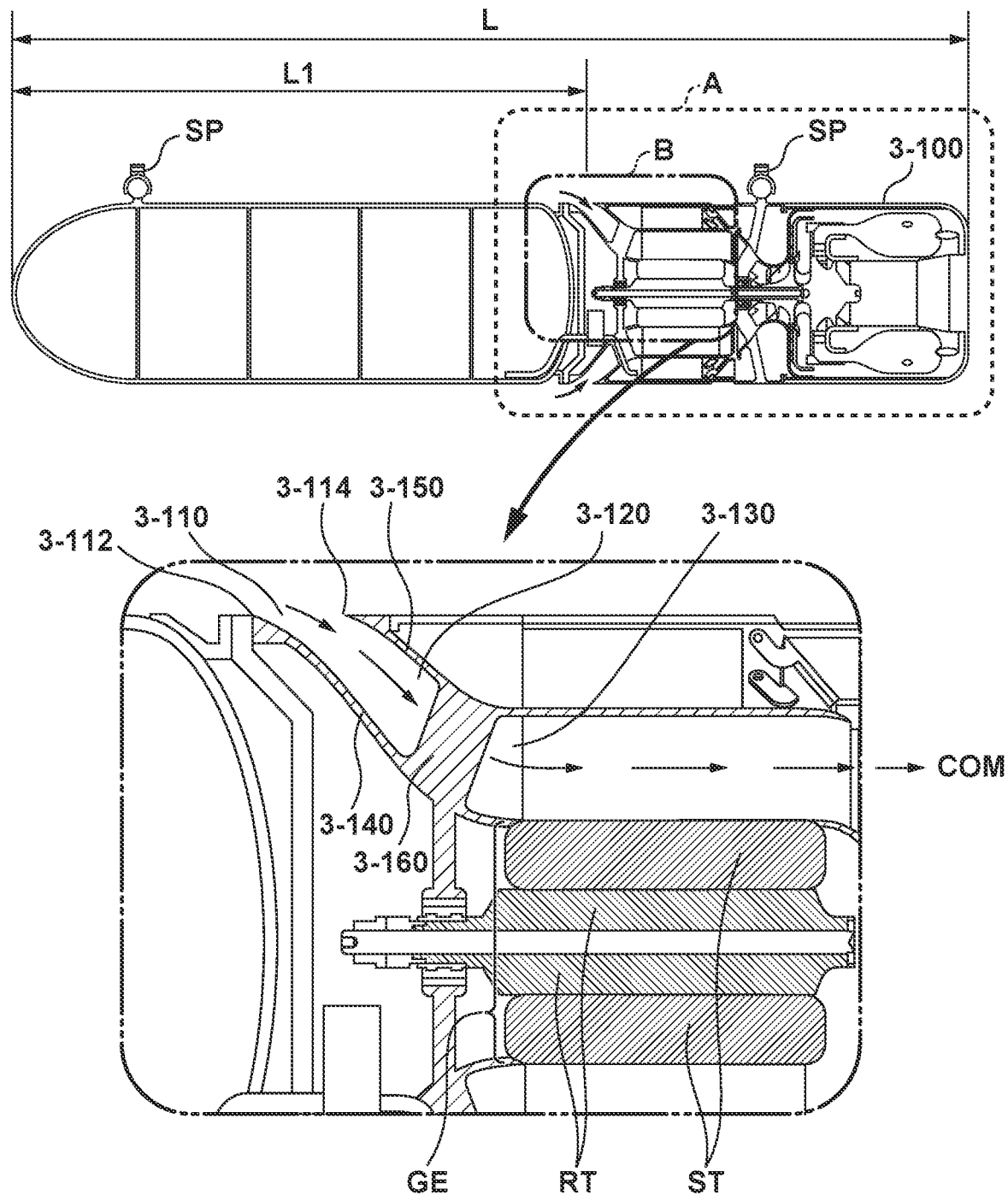
FIG. 15 is a sectional view showing the structure of an air intake portion.

FIG. 14 is a view showing the detailed arrangement of the power generation portion PG (the power generator GE and the driving portion DR (gas turbine engine)), and this portion is an arrangement corresponding to a portion A in FIG. 15. The driving portion DR (gas turbine engine) includes a rotating shaft 3-60 provided on the same axis as a rotation axis C of the housing HS. When the rotating shaft 3-60 is provided on the same axis as the rotation axis C, the larger driving portion DR (gas turbine engine) can be stored in the housing HS having a cylindrical shape without wasting the space.

The compressor COM of the driving portion DR (gas turbine engine) includes an impeller 3-61*a* attached to the rotating shaft 3-60, and a diffuser 3-61*b*. As the impeller 3-61*a* rotates, air taken from the air intake portion INT is sent to a compression chamber 3-62 while being compressed via the diffuser 3-61*b*.

The compressed air in the compression chamber 3-62 flows from opening portions 3-63*a* provided in the circumferential wall of the combustion device BST and other opening portions into the combustion device BST. In the combustion device BST, a plurality of fuel injection nozzles 3-64 are provided in the circumferential direction of the rotation axis C. The fuel reserved in the reserving portion TN (fuel tank) is supplied to the fuel injection nozzles 3-64 via a pipe (not shown), and the fuel injection nozzles 3-64 inject the fuel into the combustion device BST. At the time of start, an ignition device (not shown) ignites the air fuel mixture in the combustion device BST. After that, combustion of the air fuel mixture continuously occurs in the combustion device BST.

A combustion gas flow that has a high temperature and a high pressure in the combustion device BST jets out from turbine nozzles 3-65 to a tubular exhaust pipe 3-67 on the same axis as the center axis C and, in the process, rotates the turbine TB attached to the rotating shaft 3-60. The turbine TB, the rotating shaft 3-60, and the impeller 3-61a integrally rotate. An exhaust portion 3-100c that is an opening portion communicating with the exhaust pipe 3-67 is formed in the rear end portion 3-100b of the housing HS, and the combustion gas flow (exhaust gas flow) is discharged to the rear of the housing HS.

In the third embodiment, since the driving portion DR (gas turbine engine) is arranged adjacent to the rear end portion 3-100b of the housing HS, exhaust to the rear can smoothly be performed. Note that in the third embodiment, the driving portion DR (gas turbine engine) exclusively aims at driving the power generator GE, and actively using the exhaust gas flow as the thrust of the flying body 3-10 is not assumed. However, a form in which the exhaust gas flow is used as an auxiliary thrust can also be employed.

The power generator GE includes a rotating shaft 3-50 on the same axis as the rotating shaft 3-60. That is, the rotating shaft 3-50 is also provided on the same axis as the center axis C, and the larger power generator GE can be stored in the housing HS having a cylindrical shape without wasting the space. Bearings 3-50a that rotatably support the rotating shaft 3-50 (and the rotating shaft 3-60) are provided at the two end portions of the power generator GE in the x direction.

A rotor RT such as a permanent magnet is provided on the rotating shaft 3-50, and a stator ST such as a coil is provided around the rotor RT. A plurality of heat sinks 3-170 for cooling are provided around the stator ST in the circumferential direction of the rotating shaft 3-50 and cool the power generator GE by air cooling.

A control unit 3-107 (control device) provided in the power supply device 3-100 includes a circuit that controls power generation of the power generator GE, and a circuit that controls driving of the driving portion DR (gas turbine engine). An auxiliary power supply such as a lead battery may be provided as the power supply in activating the control unit 3-107. The auxiliary power supply may be provided in the power supply device 3-100, or an auxiliary power supply provided on the side of the airframe 3-200 may be used. Power generated by the power generator GE is supplied to the control unit 3-207 of the airframe 3-200 via a cable (not shown). The cable may pass through the separation mechanisms SP. The control unit 3-107 of the power supply device 3-100 and the control unit 3-207 of the airframe 3-200 may be able to communicate with each other, and the control device of the power supply device 3-100 may perform power generation control in accordance with an instruction from the control unit 3-207 of the airframe 3-200.

In the power supply device 3-100 with this arrangement, the driving portion DR (gas turbine engine) is driven by the fuel reserved in the reserving portion TN (fuel tank), the rotating shaft 3-50 is rotated by the rotation of the rotating shaft 3-60 that is the output of the driving portion DR, and the power generator GE generates power. The generated power is supplied to the control unit 3-207 of the airframe 3-200 and used to drive the motors 3-305 and 3-306 for the propulsion device 3-300 (the main rotor 3-202 and the tail rotor 3-203).

Since the power supply device 3-100 is arranged outside the airframe 3-200, the degree of freedom in designing the airframe 3-200 of the flying body 3-10 can be improved. For example, it is possible to ensure a wider cabin space in the airframe 3-200 and improve the comfort of crew. In addition, noise and vibrations generated by the operation of the power supply device 3-100 are reduced as compared to a case in which the power supply device 3-100 is provided in the airframe 3-200, and silence improves. Furthermore, as compared to a case in which the power supply device 3-100 is provided in the airframe 3-200, access to the inside of the power supply device 3-100 is easy, the maintenance is facilitated, and the maintenance burden is reduced.

[Structure of Air Intake Portion INT]

The structure of the air intake portion INT will be described next. FIG. 15 is a view showing the sectional structure of the air intake portion INT on an x-z plane. The sectional structure shown in FIG. 15 corresponds to a portion B shown in FIG. 14. As shown in FIG. 15, the air intake portion INT includes the inlet portion 3-110 that is formed in the outer peripheral surface of the housing HS and takes air outside the housing, a hollow introduction passage 3-120 communicating with the inlet portion 3-110 and formed in the housing HS, and an outlet portion 3-130 that supplies the air taken from the inlet portion 3-110 to the driving portion DR (gas turbine engine) via the introduction passage 3-120.

The inlet portion 3-110 is formed into an annular shape along the outer peripheral surface of the housing HS. In addition, the introduction passage 3-120 is divided, in the housing HS, by an inner cylinder wall 3-140 connected to one end 3-112 of the inlet portion 3-110 and formed in the housing HS and an outer cylinder wall 3-150 connected to the other end 3-114 of the inlet portion 3-110 and covering the inner cylinder wall 3-140. The outlet portion 3-130 that supplies air to the compressor COM of the driving portion DR is formed at the terminal portion of the introduction passage 3-120.

According to the air intake portion INT of the third embodiment, as shown in FIG. 15, since the inlet portion 3-110 of the air intake portion INT does not project to the outside of the housing HS, the air drag decreases, and the propulsion efficiency can be improved.

Additionally, the inlet portion 3-110 of the air intake portion INT is formed at a position L1 about 60% to 70% from the front with respect to a total length L of the housing HS. When the flying body 3-10 flies, a flow of air with a predetermined velocity gradient is generated on the outer surface portion of the housing HS. Because of the viscosity of air, the flow velocity is low near the surface of the housing HS. The velocity gradient increases along with an increase in the distance from the surface of the housing HS, and the flow obtains the velocity of a uniform flow at a predetermined distance. In a layer (boundary layer) with the flow velocity change from the surface of the housing HS to the position at which the uniform flow velocity is obtained, a back flow occurs in the boundary layer because of a pressure gradient caused by the viscosity of air, the boundary layer is peeled from the surface of the housing HS and pushed to the downstream side, and a layer of a vortex is formed on the rear side of the housing HS. This vortex is successively fragmented to form a complex turbulent flow. This increases the air drag received by the housing HS.

When the inlet portion 3-110 is formed at the position L1 about 60% to 70% from the front with respect to the total length L of the housing HS, the air that flows near the outer peripheral surface of the housing HS can be taken from the inlet portion 3-110 before the development of the peeling region. This can suppress generation of the turbulent flow and keep the flow of the boundary layer of the air longer. It is therefore possible to reduce the air drag.

Figure 16:
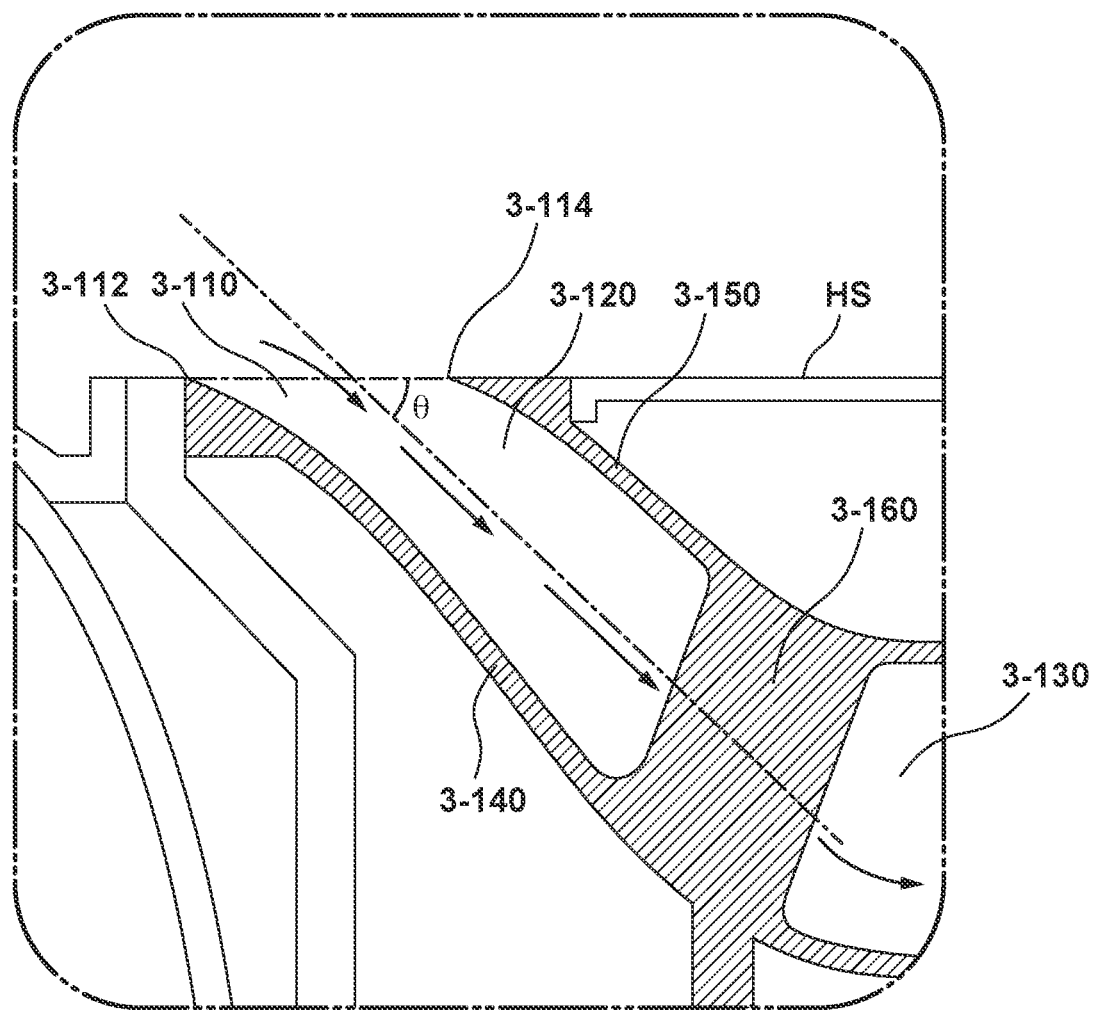
FIG. 16 is an enlarged sectional view showing the structure of the air intake portion.

FIG. 16 is an enlarged view of the sectional structure of the air intake portion INT. As shown in FIG. 16, the introduction passage 3-120 is formed while tilting from the inlet portion 3-110 to the rear side of the housing HS in the longitudinal direction. The introduction passage 3-120 tilts by a predetermined angle θ made by the surface of the housing HS and the center line passing through the center of the inlet portion 3-110 and the center of the introduction passage 3-120. The introduction passage 3-120 is formed to tilt by the predetermined angle θ within the range of, for example, 20° to 60°.

When the introduction passage 3-120 communicating with the inlet portion 3-110 is formed to tilt with respect to the outer peripheral surface of the housing HS, the pressure loss in the inlet portion 3-110 and the introduction passage 3-120 in a case in which an advanced speed is generated in the flying body 3-10 can be reduced. It is therefore possible to easily take air from the inlet portion 3-110 as compared to a case in which the introduction passage is formed at a right angle with respect to the outer peripheral surface, and easily take air flowing near the outer peripheral surface of the housing HS into the introduction passage.

Additionally, as shown in FIG. 16, the end of the inner cylinder wall 3-140 of the introduction passage 3-120 connected to the surface of the housing HS (the one end 3-112 of the inlet portion 3-110) is formed by a curved surface. When the end (corner portion) of the inner cylinder wall 3-140 is formed by a curved surface to eliminate a portion projecting from the surface (outer peripheral surface) of the housing HS, the air drag can be reduced, and air flowing near the outer peripheral surface of the housing HS can easily be taken from the inlet portion. It is therefore possible to reduce the air drag.

Figure 17:
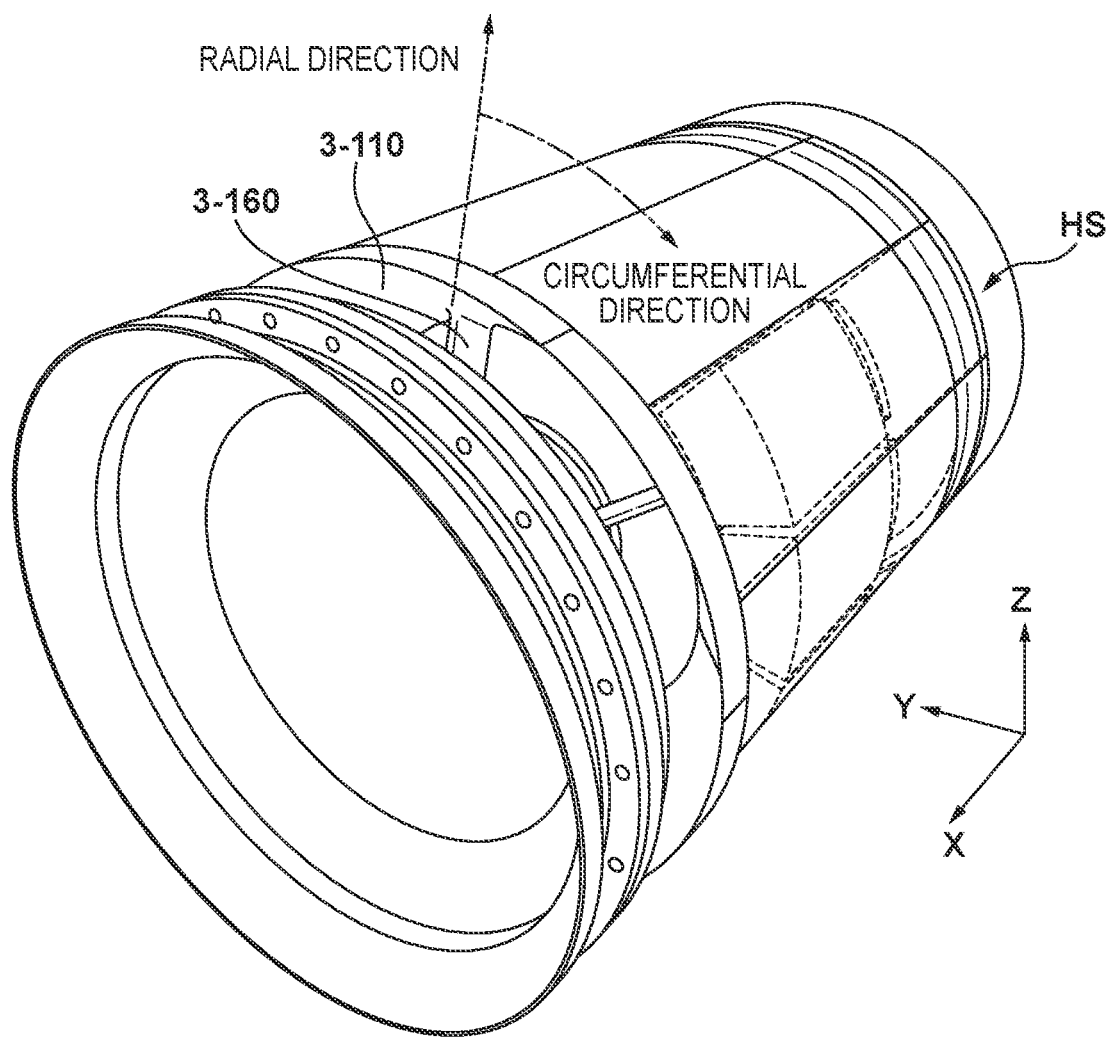
FIG. 17 is a view schematically showing the layout of struts.

FIG. 17 is a schematic view of the housing HS showing a state in which part of the housing HS is cut away on a y-z plane. In the introduction passage 3-120, a support member that connects the inner cylinder wall 3-140 and the outer cylinder wall 3-150 is provided in the radial direction of the introduction passage 3-120. The support member provided in the radial direction is formed by a plurality of struts 3-160 arranged in the circumferential direction of the introduction passage 3-120. The sectional shape of the strut 3-160 is formed into a wing shape from the front side to the rear side of the strut 3-160. When the plurality of struts 3-160 extending in the radial direction in the introduction passage 3-120 are used to support, the portion between the inner cylinder wall 3-140 and the outer cylinder wall 3-150 can be reinforced. In addition, when the sectional shape of the strut 3-160 is formed into a wing shape, the pressure loss in the introduction passage 3-120 can be reduced, and the propulsion efficiency can be improved.

Fourth Embodiment

The fourth embodiment of the present invention will be described below with reference to FIGS. 18 to 26. The outline of a flying body including a power supply device 3-100 according to the fourth embodiment is similar to FIG. 12 described in the third embodiment.

[Outline of Power Supply Device]

Figure 18:
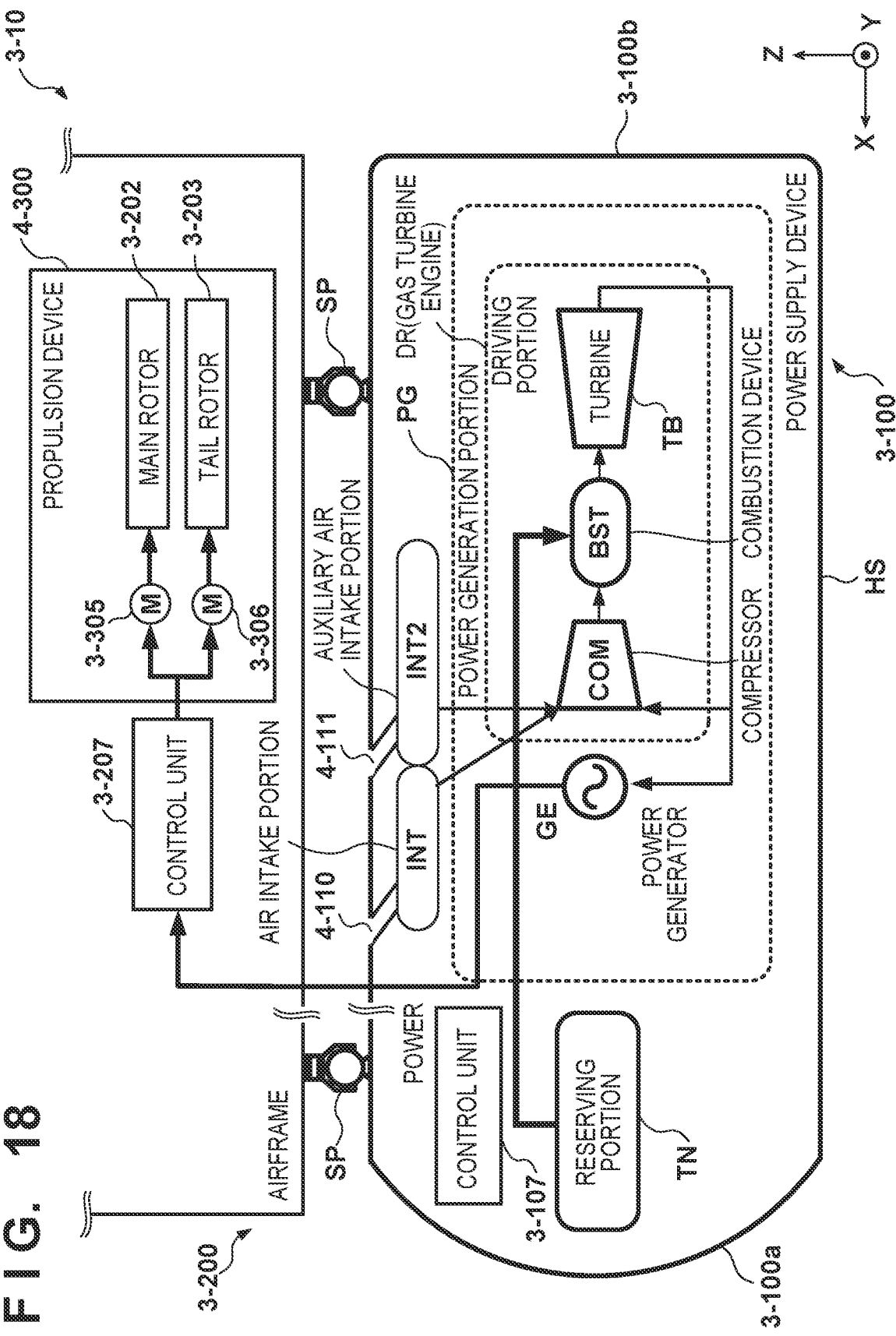
FIG. 18 is a block diagram showing the functional arrangement of a power supply device according to the fourth embodiment.

FIG. 18 is a block diagram showing the functional arrangement of the power supply device 3-100 according to the fourth embodiment of the present invention. A flying body 3-10 including a propulsion device 4-300 that generates a thrust based on power includes the power supply device 3-100 and an airframe 3-200 (airframe main body). The power supply device 3-100 is connected to the outside of the airframe 3-200. Here, the propulsion device 4-300 includes a main rotor 3-202 using a motor 3-305 as the driving source, and a tail rotor 3-203 using a motor 3-306 as the driving source, which have been described with reference to FIG. 12. The power supply device 3-100 supplies generated power to a control unit 3-207 of the airframe 3-200, and the control unit 3-207 controls driving of the motors 3-305 and 3-306 based on the supplied power. In FIG. 18, the x direction is the flying direction in which the flying body 3-10 propels, and is the longitudinal direction of the power supply device 3-100. The y direction is the widthwise direction of a housing HS, and the z direction is the vertical direction of the housing HS orthogonal to the longitudinal direction (x direction) and the widthwise direction (y direction) of the housing HS.

A power generation portion PG includes a power generator GE and a driving portion DR (gas turbine engine), and the power generator GE generates power by the output of the driving portion DR. Here, the driving portion DR (gas turbine engine) includes a compressor COM, a combustion device BST, and a turbine TB, and generates motive power used to rotationally drive the power generator GE.

The power generation portion PG (the power generator GE, the compressor COM, the combustion device BST, and the turbine TB) supplies power used to drive the propulsion device 4-300 (the main rotor 3-202, the tail rotor 3-203, and the motors 3-305 and 3-306) of the flying body 3-10 that generates a thrust.

In the power supply device 3-100, the housing HS that stores the power generation portion PG (the power generator GE, the compressor COM, the combustion device BST, and the turbine TB), a reserving portion TN (fuel tank) that reserves a fuel and supplies it to the combustion device BST in the power generation portion PG, and air intake portions (INT and INT2) that take outside air and supply it to the compressor COM in the power generation portion PG is connected to the airframe 3-200 of the flying body 3-10 via detachable separation mechanisms SP.

As shown in FIG. 18, in the housing HS of the power supply device 3-100, the reserving portion TN (fuel tank), the air intake portions (INT and INT2), and the power generation portion PG (the power generator GE and the driving portion DR (the gas turbine engine: the compressor COM, the combustion device BST, and the turbine TB)) are integrally packaged. The power supply device 3-100 is connected in the vertical direction to the lower side surface of the airframe 3-200 via the separation mechanisms SP.

Inlet portions 4-110 and 4-111 of the air intake portions (INT and INT2) are formed in the outer peripheral surface of the housing HS, and take the air outside the housing HS. The air taken by the inlet portion 4-110 of the air intake portion INT is introduced into the compressor COM via an introduction passage formed in the housing. In addition, the air taken by the auxiliary inlet portion 4-111 of the air intake portion INT2 is introduced into the compressor COM. Details of the air intake portions (INT and INT2) will be described later in detail with reference to FIGS. 20 and 21.

Figure 19:
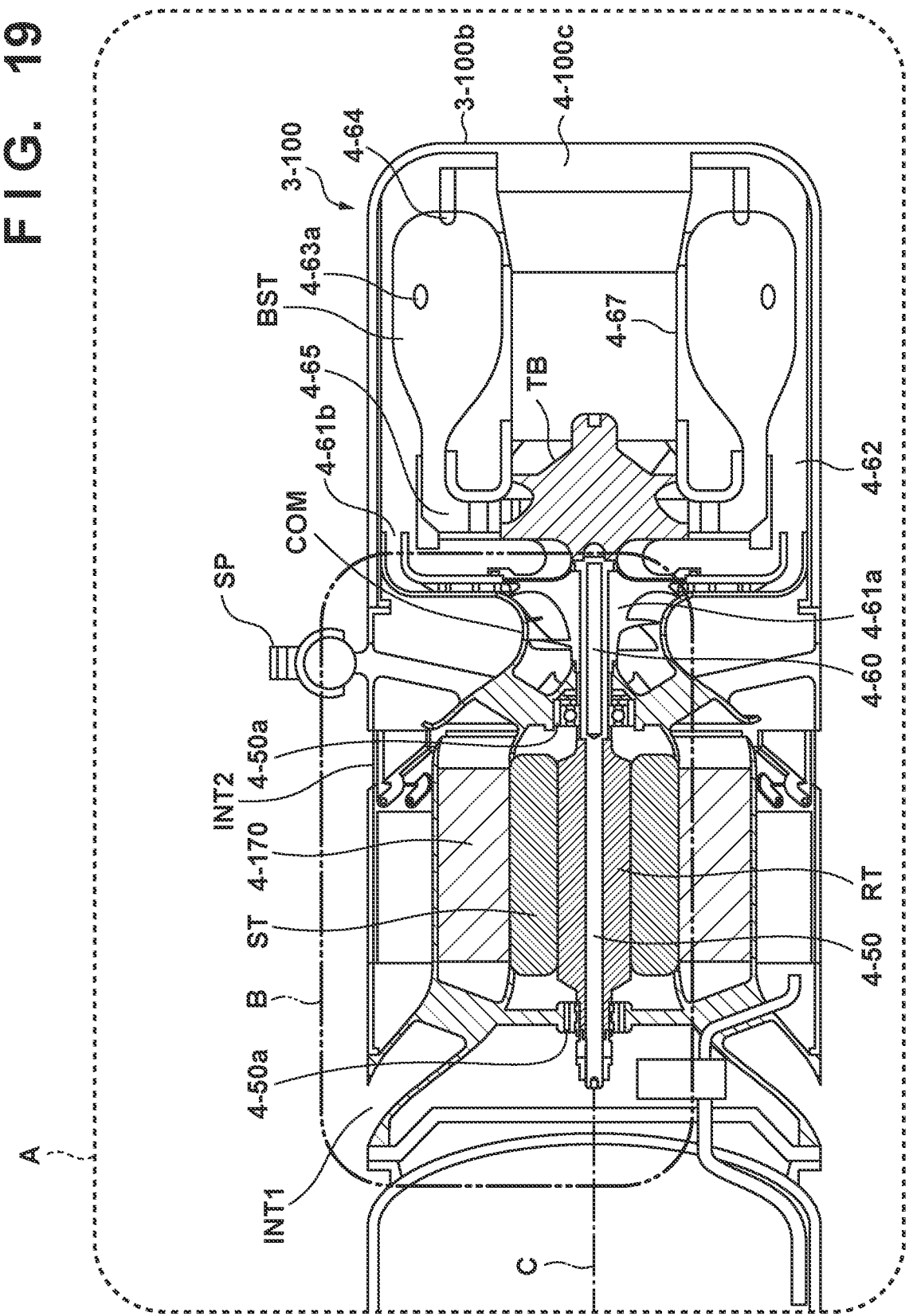
FIG. 19 is a view showing the detailed arrangement of a power generation unit PG.
Figure 20:
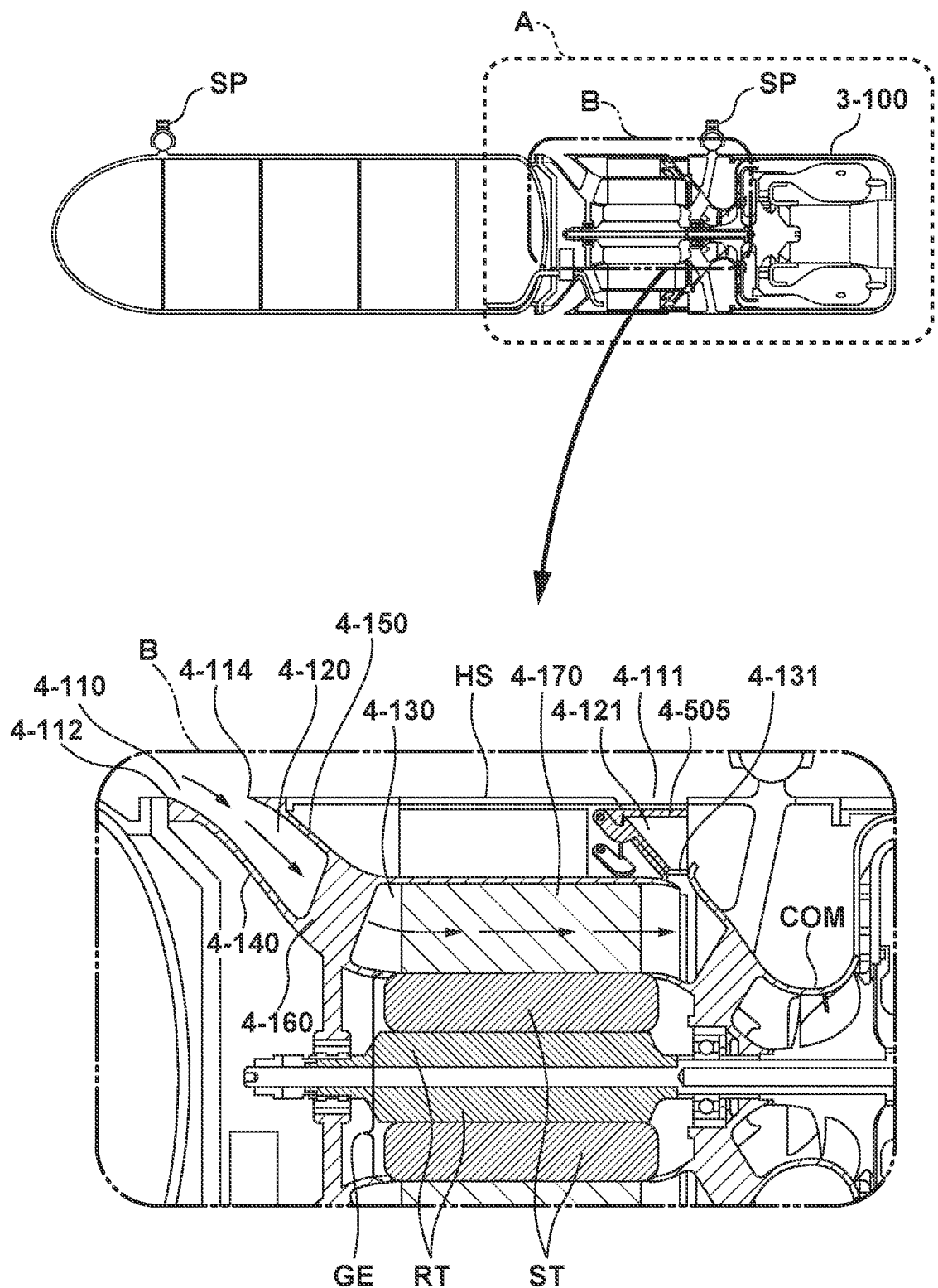
FIG. 20 is a view showing the sectional structure of air intake portions (INT and INT2)

FIG. 19 is a view showing the detailed arrangement of the power generation portion PG (the power generator GE and the driving portion DR (gas turbine engine)), and this portion is an arrangement corresponding to a portion A in FIG. 20. The driving portion DR (gas turbine engine) includes a rotating shaft 4-60 provided on the same axis as a rotation axis C of the housing HS. When the rotating shaft 4-60 is provided on the same axis as the rotation axis C, the larger driving portion DR (gas turbine engine) can be stored in the housing HS having a cylindrical shape without wasting the space.

The compressor COM of the driving portion DR (gas turbine engine) includes an impeller 4-61a attached to the rotating shaft 4-60, and a diffuser 4-61b. As the impeller 4-61a rotates, air taken from the air intake portions (INT and INT2) is sent to a compression chamber 4-62 while being compressed via the diffuser 4-61b.

The compressed air in the compression chamber 4-62 flows from opening portions 4-63a provided in the circumferential wall of the combustion device BST and other opening portions into the combustion device BST. In the combustion device BST, a plurality of fuel injection nozzles 4-64 are provided in the circumferential direction of the rotation axis C. The fuel reserved in the reserving portion TN (fuel tank) is supplied to the fuel injection nozzles 4-64 via a pipe (not shown), and the fuel injection nozzles 4-64 inject the fuel into the combustion device BST. At the time of start, an ignition device (not shown) ignites the air fuel mixture in the combustion device BST. After that, combustion of the air fuel mixture continuously occurs in the combustion device BST.

A combustion gas flow that has a high temperature and a high pressure in the combustion device BST jets out from turbine nozzles 4-65 to a tubular exhaust pipe 4-67 on the same axis as the center axis C and, in the process, rotates the turbine TB attached to the rotating shaft 4-60. The turbine TB, the rotating shaft 4-60, and the impeller 4-61a integrally rotate. An exhaust portion 4-100c that is an opening portion communicating with the exhaust pipe 4-67 is formed in a rear end portion 3-100b of the housing HS, and the combustion gas flow (exhaust gas flow) is discharged to the rear of the housing HS.

In the fourth embodiment, since the driving portion DR (gas turbine engine) is arranged adjacent to the rear end portion 3-100b of the housing HS, exhaust to the rear can smoothly be performed. Note that in the fourth embodiment, the driving portion DR (gas turbine engine) exclusively aims at driving the power generator GE, and actively using the exhaust gas flow as the thrust of the flying body 3-10 is not assumed. However, a form in which the exhaust gas flow is used as an auxiliary thrust can also be employed.

The power generator GE includes a rotating shaft 4-50 on the same axis as the rotating shaft 4-60. That is, the rotating shaft 4-50 is also provided on the same axis as the center axis C, and the larger power generator GE can be stored in the housing HS having a cylindrical shape without wasting the space. Bearings 4-50a that rotatably support the rotating shaft 4-50 (and the rotating shaft 4-60) are provided at the two end portions of the power generator GE in the x direction.

A rotor RT such as a permanent magnet is provided on the rotating shaft 4-50, and a stator ST such as a coil is provided around the rotor RT. A plurality of heat sinks 4-170 for cooling are provided around the stator ST in the circumferential direction of the rotating shaft 4-50 and cool the power generator GE by air cooling.

A control unit 3-107 provided in the power supply device 3-100 includes a circuit that controls power generation of the power generator GE, and a circuit that controls driving of the driving portion DR (gas turbine engine). An auxiliary power supply such as a lead battery may be provided as the power supply in activating the control unit 3-107. The auxiliary power supply may be provided in the power supply device 3-100, or an auxiliary power supply provided on the side of the airframe 3-200 may be used. Power generated by the power generator GE is supplied to the control unit 3-207 of the airframe 3-200 via a cable (not shown). The cable may pass through the separation mechanisms SP. The control unit 3-107 of the power supply device 3-100 and the control unit 3-207 of the airframe 3-200 may be able to communicate with each other, and the control device of the power supply device 3-100 may perform power generation control in accordance with an instruction from the control unit 3-207 of the airframe 3-200.

In the power supply device 3-100 with this arrangement, the driving portion DR (gas turbine engine) is driven by the fuel reserved in the reserving portion TN (fuel tank), the rotating shaft 4-50 is rotated by the rotation of the rotating shaft 4-60 that is the output of the driving portion DR, and the power generator GE generates power. The generated power is supplied to the control unit 3-207 of the airframe 3-200 and used to drive the motors 3-305 and 3-306 for the propulsion device 4-300 (the main rotor 3-202 and the tail rotor 3-203).

Since the power supply device 3-100 is arranged outside the airframe 3-200, the degree of freedom in designing the airframe 3-200 in the flying body 3-10 can be improved. For example, it is possible to ensure a wider cabin space in the airframe 3-200 and improve the comfort of crew. In addition, noise and vibrations generated by the operation of the power supply device 3-100 are reduced as compared to a case in which the power supply device 3-100 is provided in the airframe 3-200, and silence improves. Furthermore, as compared to a case in which the power supply device 3-100 is provided in the airframe 3-200, access to the inside of the power supply device 3-100 is easy, the maintenance is facilitated, and the maintenance burden is reduced.

[Structures of Air Intake Portions (INT and INT2)]

The power supply device 3-100 according to the fourth embodiment includes the plurality of air intake portions (INT and INT2) arranged in the longitudinal direction (x direction). The air intake portion INT is an air intake portion provided on the front side in the longitudinal direction, and the air intake portion INT2 (to be also referred to as the auxiliary air intake portion INT2 hereinafter) is an air intake portion provided on the rear side in the longitudinal direction.

(Structure of Air Intake Portion INT)

The structure of the air intake portion INT provided on the front side of the housing HS in the longitudinal direction will be described first. FIG. 20 is a view showing the sectional structure of the air intake portions (INT and INT2) on an x-z plane. The sectional structure shown in FIG. 20 corresponds to a portion B shown in FIG. 19. As shown in FIG. 20, the air intake portion INT provided on the front side of the housing HS in the longitudinal direction includes the inlet portion 4-110 that is formed in the outer peripheral surface of the housing HS and takes air outside the housing, an introduction passage 4-120 communicating with the inlet portion 4-110 and formed in the housing HS, and an outlet portion 4-130 that supplies the air taken from the inlet portion 4-110 to the compressor COM of the driving portion DR (gas turbine engine) via the introduction passage 4-120.

The inlet portion 4-110 is formed into an annular shape along the outer peripheral surface of the housing HS. In addition, the introduction passage 4-120 is divided, in the housing HS, by an inner cylinder wall 4-140 connected to one end 4-112 of the inlet portion 4-110 and formed in the housing HS, and an outer cylinder wall 4-150 connected to the other end 4-114 of the inlet portion 4-110 and covering the inner cylinder wall 4-140. The outlet portion 4-130 that supplies air to the compressor COM of the driving portion DR is formed at the terminal portion of the introduction passage 4-120.

As shown in FIG. 20, since the inlet portion 4-110 of the air intake portion INT does not project to the outside of the housing HS, the air drag decreases, and the propulsion efficiency can be improved. In addition, the introduction passage 4-120 is formed while tilting from the inlet portion 4-110 to the rear side of the housing HS in the longitudinal direction. When the introduction passage 4-120 communicating with the inlet portion 4-110 is formed to tilt with respect to the outer peripheral surface of the housing HS, the pressure loss in the inlet portion 4-110 and the introduction passage 4-120 in a case in which an advanced speed is generated in the flying body 3-10 can be reduced. It is therefore possible to easily take air from the inlet portion 4-110 as compared to a case in which the introduction passage is formed at a right angle with respect to the outer peripheral surface, and easily take air flowing near the outer peripheral surface of the housing HS into the introduction passage.

Additionally, as shown in FIG. 20, the end of the inner cylinder wall 4-140 of the introduction passage 4-120 connected to the surface of the housing HS (the one end 4-112 of the inlet portion 4-110) is formed by a curved surface. When the end (corner portion) of the inner cylinder wall 4-140 is formed by a curved surface to eliminate a portion projecting from the surface (outer peripheral surface) of the housing HS, the air drag can be reduced, and air flowing near the outer peripheral surface of the housing HS can easily be taken from the inlet portion 4-110. It is therefore possible to reduce the air drag.

The power generator GE is arranged on the front side of the driving portion DR (the compressor COM, the combustion device BST, and the turbine TB) and on the lower side of the introduction passage 4-120. The heat sinks 4-170 configured to dissipate the heat of the power generator GE are arranged on the outer peripheral portion of the stator ST of the power generator GE. The heat sinks 4-170 are arranged in a passage in which air flows from the inlet portion 4-110 to the compressor COM of the driving portion DR. That is, the heat sinks 4-170 are arranged between the outlet portion 4-130 and the compressor COM of the driving portion DR.

Figure 25:
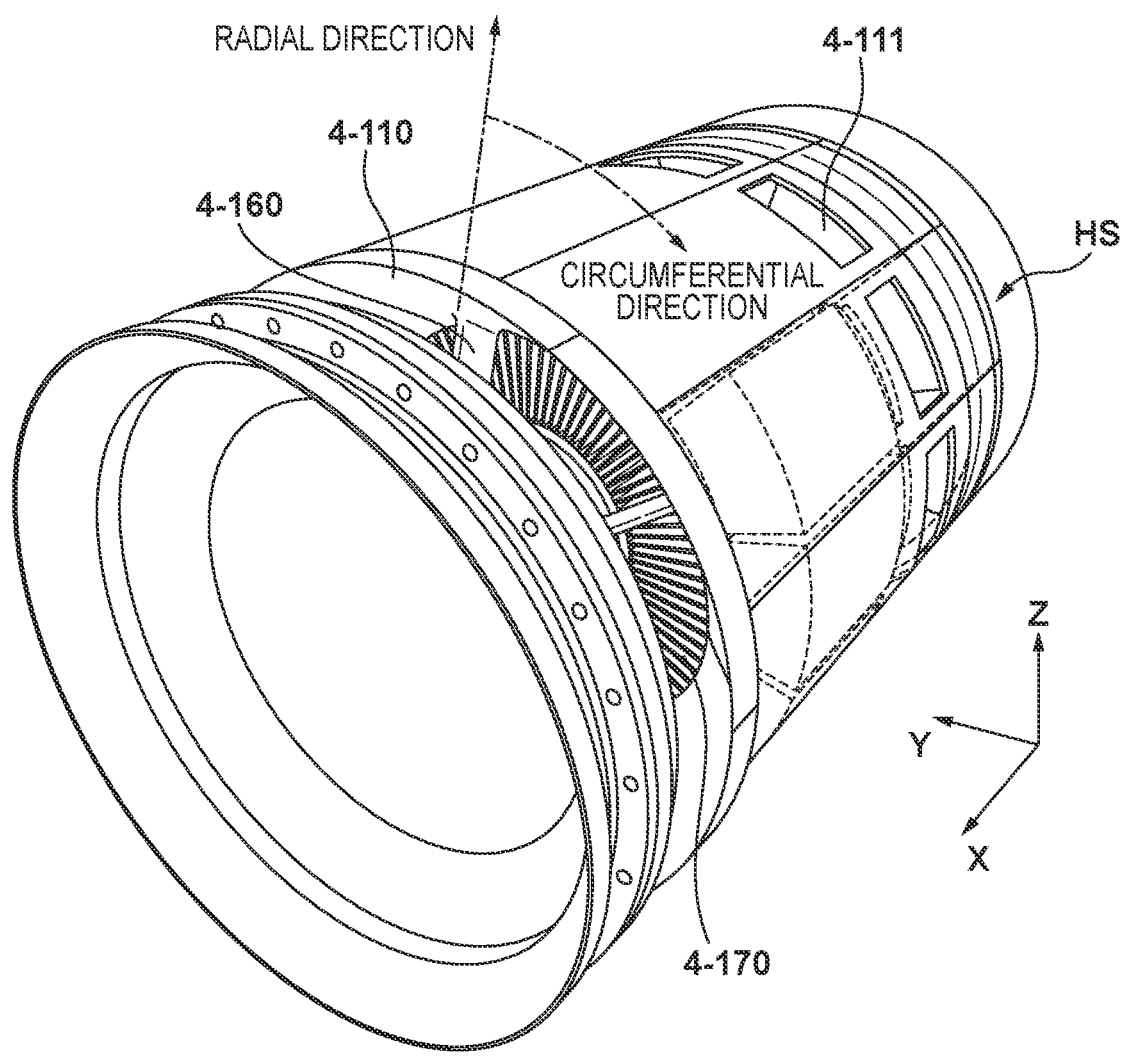
FIG. 25 is a schematic view showing a state in which part of a housing is cut away by a y-z plane.

FIG. 25 is a schematic view of the housing HS showing a state in which part of the housing HS is cut away on a y-z plane. In the introduction passage 4-120, a support member that connects the inner cylinder wall 4-140 and the outer cylinder wall 4-150 is provided in the radial direction of the introduction passage 4-120. The support member provided in the radial direction is formed by a plurality of struts 4-160 arranged in the circumferential direction of the introduction passage 4-120. As shown in FIG. 25, the plurality of heat sinks 4-170 arranged in the circumferential direction are formed on the rear side of the struts 4-160.

When the air taken from the inlet portion 4-110 flows to the introduction passage 4-120, the power generator GE is cooled by heat dissipation from the heat sinks 4-170. When the power generator GE is cooled, reduction of power output from the power generator GE can be suppressed, and the propulsion efficiency can be improved.

(Structure of Auxiliary Air Intake Portion INT2)

The structure of the air intake portion (the auxiliary air intake portion INT2) provided on the rear side of the housing HS in the longitudinal direction will be described next. As described with reference to FIG. 20, the power generator GE can be cooled by placing the heat sinks 4-170 such as heat dissipation fins around the stator ST of the power generator GE. Here, the heat sinks 4-170 are set to satisfy requirements for cooling of the power generator even under conditions with a high temperature of outside air to be taken. For this reason, in a state with a low outside air temperature, the capacity of the heat sinks can be small in principle, that is, the pressure loss caused by the heat sinks can be made small. However, if the heat sinks are arranged for a high temperature state, a pressure loss more than necessary may occur.

Figure 23:
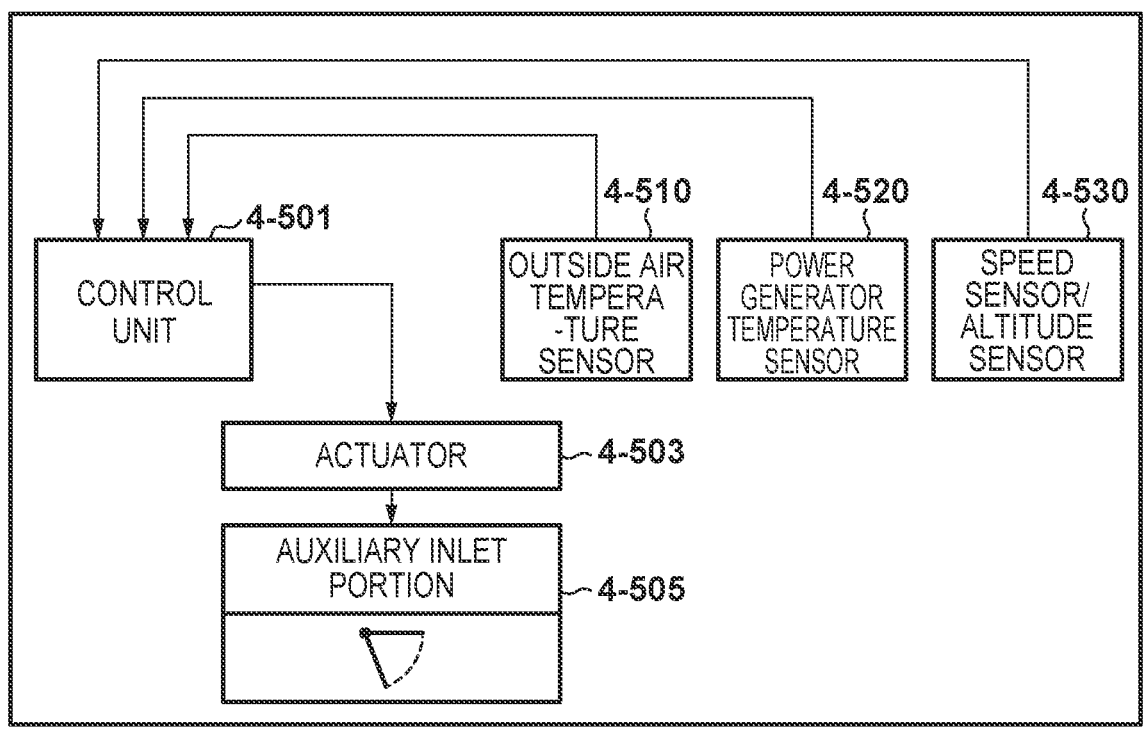
FIG. 23 is a control block diagram showing control of opening/closing of the movable member in an auxiliary air intake portion.

FIG. 23 is a control block diagram of the control unit 3-107 that controls opening/closing of a movable member 4-505 in the auxiliary air intake portion INT2. The auxiliary air intake portion INT2 provided on the rear side of the housing HS in the longitudinal direction is an air intake portion functioning as the bypass of the air intake portion INT provided on the front side. If the temperature of the power generator GE is higher than a threshold temperature, a control unit 4-501 shown in FIG. 23 controls the operation of the movable member 4-505 to make air flow from the introduction passage 4-120 of the air intake portion INT with a large pressure loss to an auxiliary introduction passage 4-121 on the side of the auxiliary air intake portion INT2.

That is, to reduce the pressure loss caused by the heat sinks 4-170, the control unit 4-501 opens the auxiliary air intake portion INT2 based on the temperature of the power generator GE detected by temperature detection portions. Accordingly, air inflow from the side of the auxiliary air intake portion INT2 with a small air drag becomes dominant as compared to the air drag in the heat sinks 4-170 on the downstream side of the air intake portion INT, and the pressure loss decreases consequently.

In the control block diagram of FIG. 23, when the detection results of the temperature detection portions are input to the control unit 4-501, the control unit 4-501 controls opening/closing of the movable member 4-505 by driving the actuator 4-503 based on the detection result of each sensor. A driving mechanism configured to drive the movable member 4-505 will be described later with reference to FIG. 22.

Here, the temperature detection portions include an outside air temperature sensor 4-510 that detects the air temperature outside the flying body 3-10, a power generator temperature sensor 4-520 that detects the temperature of the power generator GE, a speed sensor that detects the airframe speed of the flying body 3-10, and an altitude sensor 4-530 that detects the altitude of the flying body 3-10.

As shown in FIG. 20, the power supply device 3-100 includes the auxiliary air intake portion INT2 that is arranged at a position on the rear side of the heat sinks 4-170, takes outside air, and supplies it to the compressor COM of the driving portion DR. The auxiliary air intake portion INT2 includes the movable member 4-505 that can be opened/closed in accordance with the temperature of the power generator GE detected by the temperature detection portion (for example, the power generator temperature sensor 4-520), and the auxiliary inlet portion 4-111 (opening portion) formed in the outer peripheral surface of the housing HS and configured to take air outside the housing HS in a state in which the movable member 4-505 is open.

The movable member 4-505 is arranged in the opening plane of the auxiliary inlet portion 4-111 so as to be flush with the outer peripheral surface of the housing HS. In a state in which the movable member 4-505 is open, the air outside the housing HS is taken from the auxiliary inlet portion 4-111. In a state in which the movable member 4-505 is closed, air intake is blocked.

The auxiliary air intake portion INT2 includes the auxiliary introduction passage 4-121 that is formed in the housing HS and communicates with the auxiliary inlet portion 4-111 in a state in which the movable member 4-505 is open, and an outlet portion 4-131 that supplies air taken from the auxiliary inlet portion 4-111 to the compressor COM of the driving portion DR arranged on the rear side of the auxiliary introduction passage 4-121. As shown in FIG. 25, a plurality of auxiliary inlet portions 4-111 are provided in the outer peripheral surface of the housing HS at a predetermined interval in the circumferential direction.

If the movable member 4-505 is opened, air intake from the inlet portion 4-110 on the front side is reduced by the pressure loss caused by the heat sinks 4-170. If the temperature of the power generator GE is lower than a predetermined threshold temperature, the movable member 4-505 of the auxiliary air intake portion INT2 is opened to supply air to the driving portion DR via the auxiliary introduction passage 4-121 (bypass passage) communicating with the auxiliary inlet portions 4-111, thereby reducing a wasteful pressure loss.

(Modification of Air Intake Portion INT)

Figure 21:
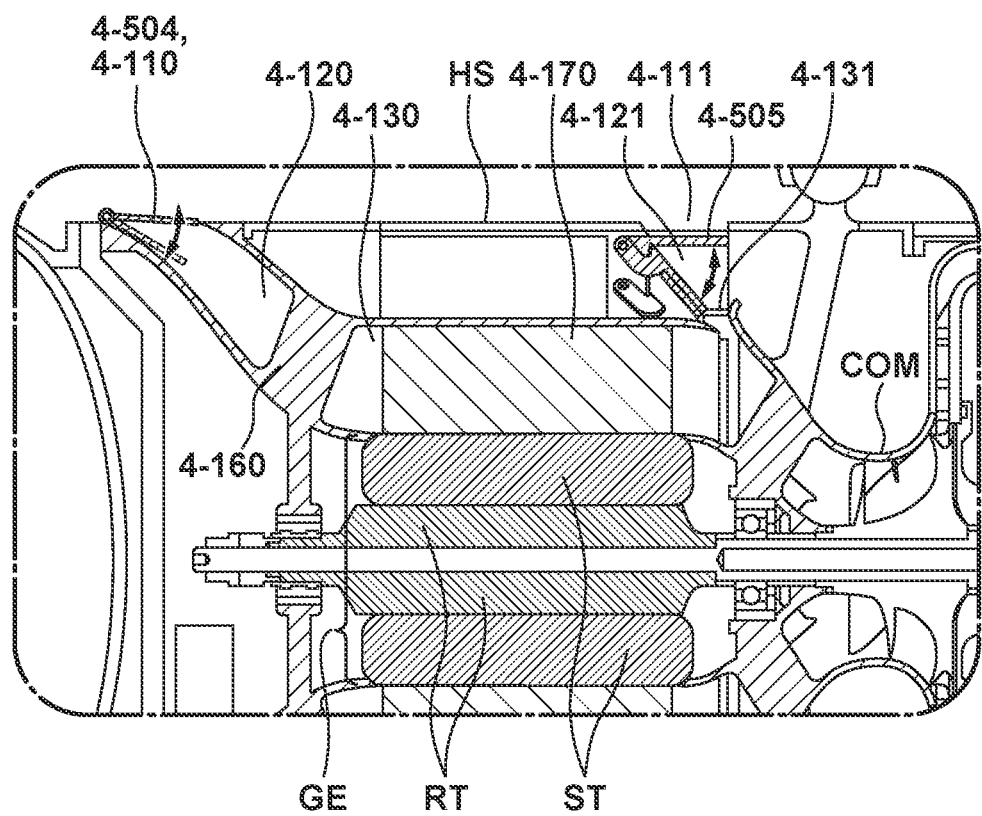
FIG. 21 is a view showing a sectional structure concerning a modification of the air intake portion INT.
Figure 24:
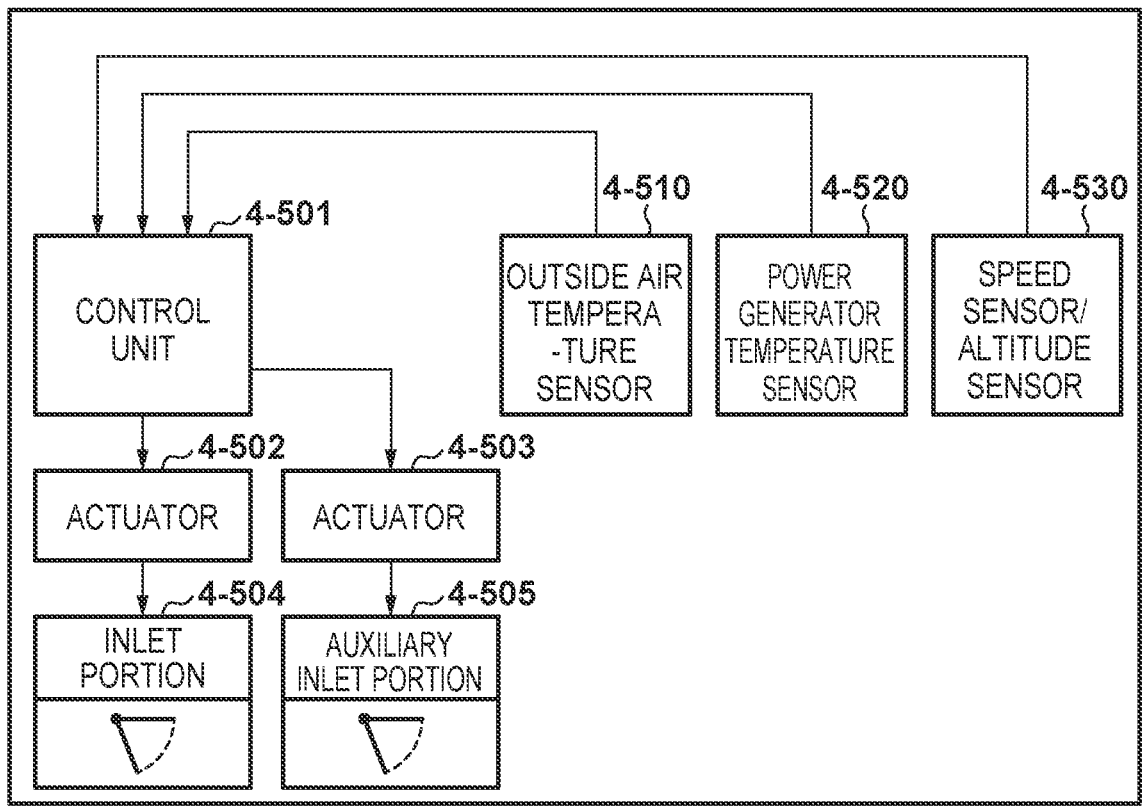
FIG. 24 is a control block diagram showing control of air intake and opening/closing of the movable member in the auxiliary air intake portion.

FIG. 24 is a control block diagram of the control unit 3-107 that controls opening/closing of a movable member 4-504 in the air intake portion INT and the movable member 4-505 in the auxiliary air intake portion INT2. A modification of the air intake portion (INT) using this control block diagram will be described. FIG. 21 is a view showing a sectional structure concerning the modification of the air intake portion INT. In the modification shown in FIG. 21, the air intake portion INT arranged on the front side of the auxiliary air intake portion INT2 includes the movable member 4-504 that can be opened/closed in accordance with the temperature of the power generator GE detected by the temperature detection portion (for example, the power generator temperature sensor 4-520). The control unit 4-501 controls opening/closing of the movable members 4-504 and 4-505 by driving actuators 4-502 and 4-503 based on the detection result of each sensor. A driving mechanism configured to drive the movable member 4-505 will be described later with reference to FIG. 22.

The inlet portion 4-110 of the air intake portion INT is formed into an annular shape along the outer peripheral surface of the housing HS, and a plurality of movable members 4-504 are provided on the outer peripheral surface of the housing HS at a predetermined interval in the circumferential direction.

The movable member 4-504 of the air intake portion INT is a movable member similar to the movable member 4-505 of the auxiliary air intake portion INT2 described with reference to FIG. 20, and opening/closing of the movable member 4-504 is controlled by the control unit 4-501. The movable member 4-504 is arranged in the opening plane of the inlet portion 4-110. In a state in which the movable member 4-504 is open, the air outside the housing HS is taken from the inlet portion 4-110. In a state in which the movable member 4-504 is closed, air intake is blocked.

(Driving Mechanism Configured to Drive Movable Members 4-504 and 4-505)

Figure 22:
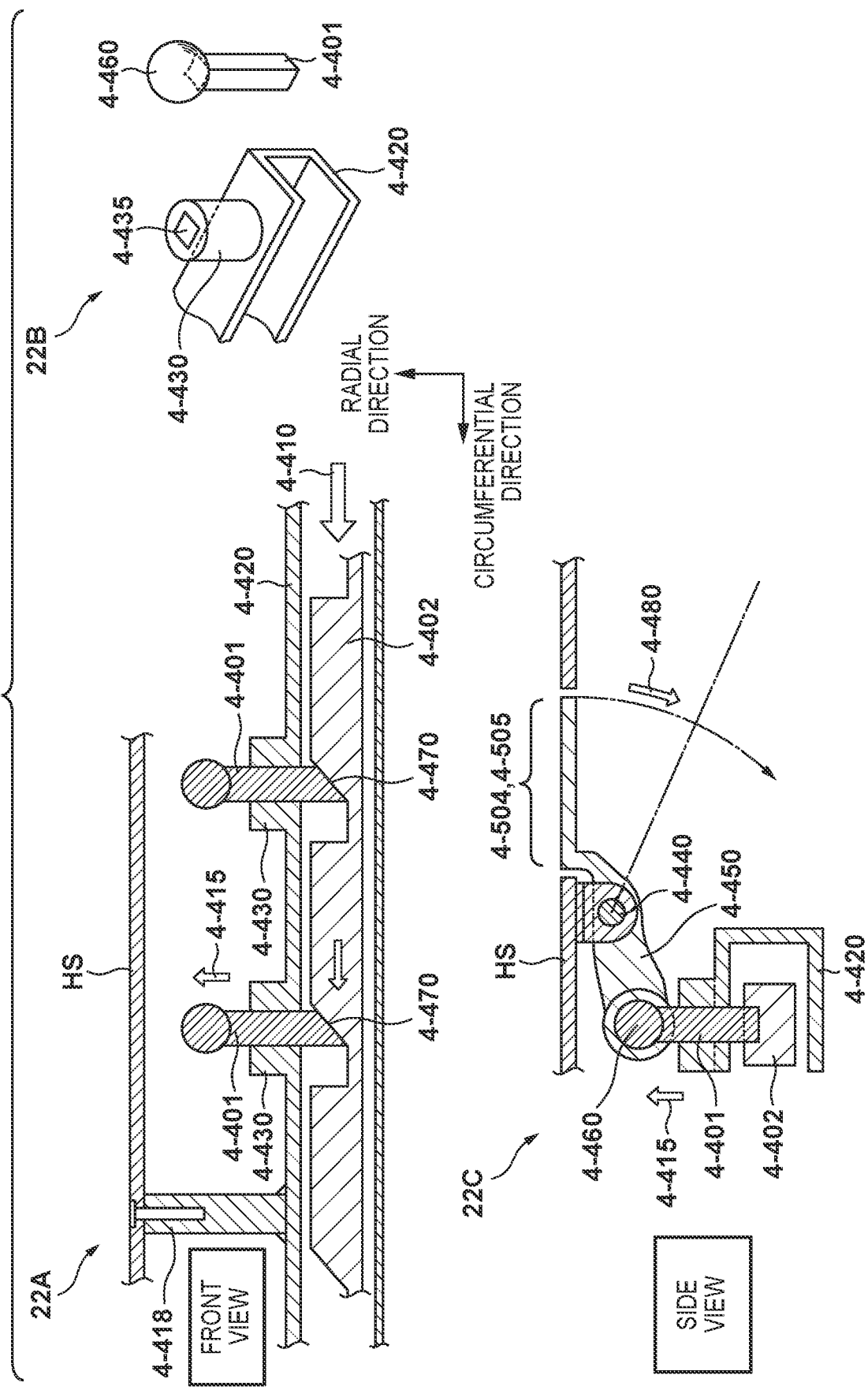
FIG. 22 depicts views for exemplarily explaining a driving mechanism configured to drive movable members.

FIG. 22 depicts views for exemplarily explaining a driving mechanism configured to drive the movable members 4-504 and 4-505. 22A of FIG. 22 is a front view (sectional view) of the driving mechanism viewed from a y-z plane. The driving mechanism is actually formed to have an annular section with a curvature. Here, a linear sectional view with an infinite curvature is shown for the descriptive convenience. As for a coordinate system shown in 22A of FIG. 22, the horizontal direction is the circumferential direction of the housing HS, and the vertical direction is the radial direction of the housing HS.

22B of FIG. 22 is a view schematically showing radial direction sliders 4-401 and slider guides (a circumferential direction slider guide 4-420 and a radial direction slider guide 4-430) in 22A of FIG. 22. In addition, 22C of FIG. 22 is a side view (sectional view) of the driving mechanism viewed from an x-z plane. As for a coordinate system shown in 22C of FIG. 22, the vertical direction with respect to the drawing surface is the circumferential direction of the housing HS, and the longitudinal direction corresponds to the radial direction of the housing HS.

As shown in 22A of FIG. 22, the circumferential direction slider guide 4-420 is mechanically joined to the housing HS via a joint member 4-418. In addition, the radial direction slider guide 4-430 is formed on the circumferential direction slider guide 4-420. An opening portion 4-435 in which the radial direction slider 4-401 can slidably move in the up-and-down direction (z direction) is formed in the radial direction slider guide 4-430.

A circumferential direction slider 4-402 is connected to the actuators 4-502 and 4-503 each formed by, for example, a motor, a hydraulic piston, or the like, and can be moved in the direction of an arrow 4-410 by driving the actuators 4-502 and 4-503. Here, for example, as shown in 22B of FIG. 22, the circumferential direction slider 4-402 moves while its movement in the circumferential direction is guided by the circumferential direction slider guide 4-420 having a U-shaped section. When a driving force is transmitted to the circumferential direction slider 4-402 by driving the actuators 4-502 and 4-503 based on the control of the control unit 4-501, the circumferential direction slider 4-402 can move in the direction of the arrow 4-410 (circumferential direction) while being guided by the circumferential direction slider guide 4-420.

Wedge cam faces 4-470 are formed in the circumferential direction slider 4-402, and the wedge cam faces 4-470 and the lower surfaces of the radial direction sliders 4-401 are in contact. When the circumferential direction slider 4-402 is moved in the direction of the arrow 4-410 (circumferential direction) by driving the actuators 4-502 and 4-503, the lower surfaces of the radial direction sliders 4-401, which are in contact with the wedge cam faces 4-470, are pushed up along the wedge cam faces 4-470, and the radial direction sliders 4-401 rise in the direction of an arrow 4-415.

In addition, when the circumferential direction slider 4-402 is moved in the direction (circumferential direction) opposite to the arrow 4-410 by driving the actuators 4-502 and 4-503 in the reverse direction, the lower surfaces of the radial direction sliders 4-401, which are in contact with the wedge cam faces 4-470, descend along the wedge cam faces 4-470, and the radial direction sliders 4-401 descend.

As show in 22C of FIG. 22, a distal end portion 4-460 of each radial direction slider 4-401 is connected to an opening/closing crank arm 4-450. The opening/closing crank arm 4-450 is supported to be rotatable about a fulcrum 4-440 held on the inner surface side of the housing HS. The movable member 4-504 (or the movable member 4-505) described with reference to FIGS. 20 and 21 is formed at the distal end of the opening/closing crank arm 4-450. When the radial direction slider 4-401 rises in the direction of the arrow 4-415, the opening/closing crank arm 4-450 rotates about the fulcrum 4-440 in the direction of an arrow 4-480. When the opening/closing crank arm 4-450 rotates, the movable member 4-504 (or the movable member 4-505) formed at the distal end of the opening/closing crank arm 4-450 also rotates in the direction of the arrow 4-480, and the movable member is set in an open state.

Similarly, when the radial direction slider 4-401 descends, the opening/closing crank arm 4-450 rotates about the fulcrum 4-440 in the direction reverse to the arrow 4-480. When the opening/closing crank arm 4-450 rotates in the direction reverse to the arrow 4-480, the movable member 4-504 (or the movable member 4-505) formed at the distal end of the opening/closing crank arm 4-450 also rotates in the direction reverse to the arrow 4-480, and the movable member is set in a close state. According to the driving mechanism as shown in FIG. 22, the control unit 4-501 controls the actuators 4-502 and 4-503, thereby controlling the opening/closing of the movable members 4-504 and 4-505.

(Passage Switching Control)

Figure 26:
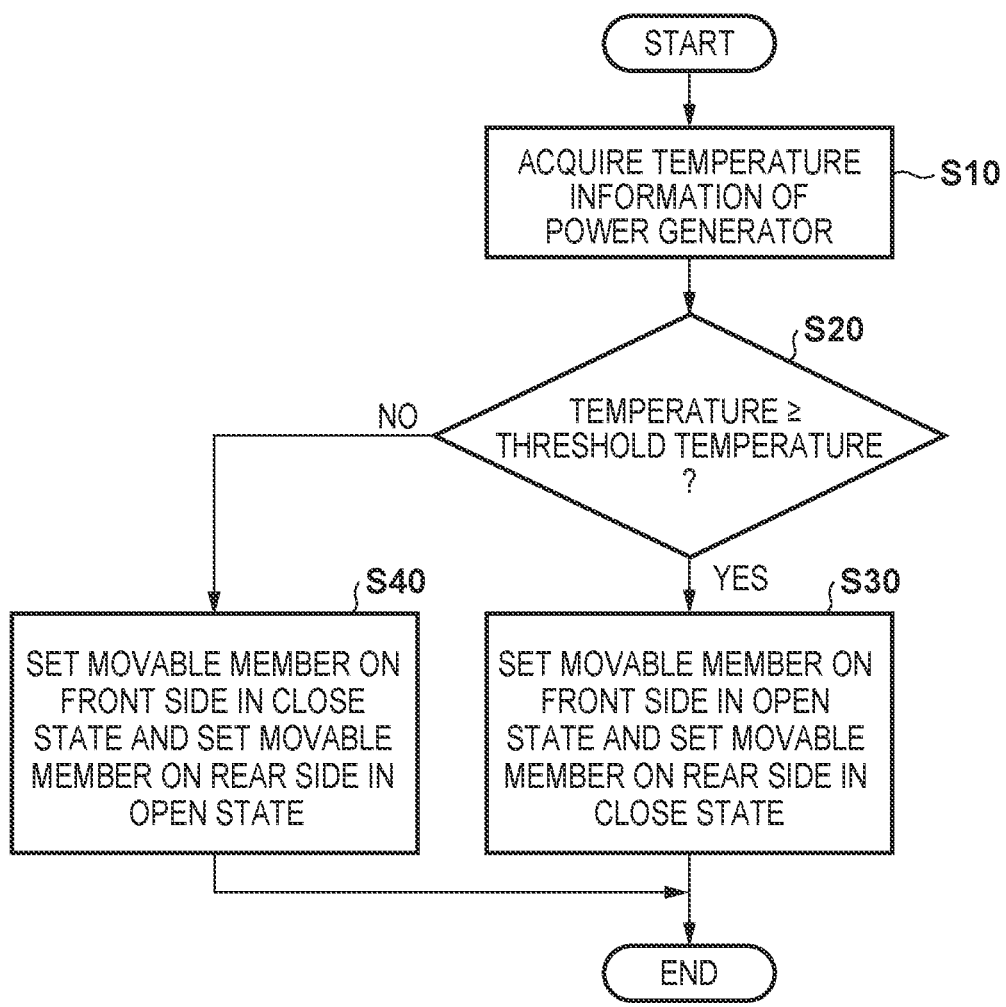
FIG. 26 is a view for explaining the procedure of passage switching control.

FIG. 26 is a view for explaining the procedure of passage switching control executed by the control unit 4-501. The description of FIG. 26 is a description about the arrangement shown in FIG. 21 in which the movable members 4-504 and 4-505 are arranged on the front side and the rear side of the housing HS. This also applies to the arrangement shown in FIG. 20 in which the movable member 4-505 is arranged only on the rear side of the housing HS.

First, in step S10, the temperature information of the power generator GE is acquired. The control unit 4-501 collects temperature information from the temperature detection portions (the outside air temperature sensor 4-510, the power generator temperature sensor 4-520, the speed sensor, and the altitude sensor 4-530), thereby acquiring the temperature information of the power generator GE. The control unit 4-501 can acquire the temperature information of the power generator GE based on the detection result of the power generator temperature sensor 4-520. At this time, the temperature information of the power generator GE can be corrected by auxiliarily using the detection results of the outside air temperature sensor 4-510, the speed sensor, and the altitude sensor 4-530.

In step S20, the control unit 4-501 determines whether the temperature of the power generator GE is equal to or more than a threshold temperature. If the temperature of the power generator GE is equal to or more than the threshold temperature (YES in step S20), the control unit 4-501 advances the process to step S30.

In step S30, the control unit 4-501 controls the actuator 4-502 such that the movable member 4-504 in the air intake portion INT provided on the front side of the housing HS in the longitudinal direction is set in the open state. In addition, the control unit 4-501 controls the actuator 4-503 such that the movable member 4-505 in the auxiliary air intake portion INT2 provided on the rear side of the housing HS in the longitudinal direction is set in the close state.

Accordingly, air is taken from the inlet portion 4-110 of the air intake portion INT, and the air flows to the introduction passage 4-120. When the air flows to the introduction passage 4-120, the power generator GE is cooled by heat dissipation from the heat sinks 4-170. When the power generator GE is cooled, reduction of power output from the power generator GE can be suppressed, and the propulsion efficiency can be improved.

On the other hand, if it is determined in step S20 that the temperature of the power generator GE is less than the threshold temperature (NO in step S20), the control unit 4-501 advances the process to step S40.

In step S40, the control unit 4-501 controls the actuator 4-502 such that the movable member 4-504 in the air intake portion INT provided on the front side of the housing HS in the longitudinal direction is set in the close state. In addition, the control unit 4-501 controls the actuator 4-503 such that the movable member 4-505 in the auxiliary air intake portion INT2 provided on the rear side of the housing HS in the longitudinal direction is set in the open state.

If the temperature of the power generator GE is lower than a predetermined threshold temperature, the inlet portion 4-110 is blocked not to make the air flow to the introduction passage 4-120 passing through the heat sinks 4-170, and the movable member 4-505 of the auxiliary air intake portion INT2 is opened to supply the air to the driving portion DR via the auxiliary introduction passage 4-121 that does not pass through the heat sinks 4-170, thereby reducing a wasteful pressure loss.

The process of this step is applied to the arrangement shown in FIG. 20. The movable member 4-504 is not arranged in the arrangement shown in FIG. 20. However, when the movable member 4-505 of the auxiliary air intake portion INT2 is opened, air intake from the inlet portion 4-110 on the front side is reduced by the pressure loss caused by the heat sinks 4-170, and the air is taken from the side of the auxiliary air intake portion INT2 by driving the compressor COM. In the arrangement shown in FIG. 20 as well, the air is supplied to the driving portion DR via the auxiliary introduction passage 4-121 communicating with the auxiliary inlet portion 4-111, thereby reducing a wasteful pressure loss.

5Ath Embodiment

The 5Ath to 5Cth embodiments of the present invention will be described below with reference to the accompanying drawings. The outline of flying bodies according to the 5Ath to 5Cth embodiments is similar to FIGS. 12 to 14 described in the third embodiment.

(Structure of Separation Mechanism SP)

Figure 27:
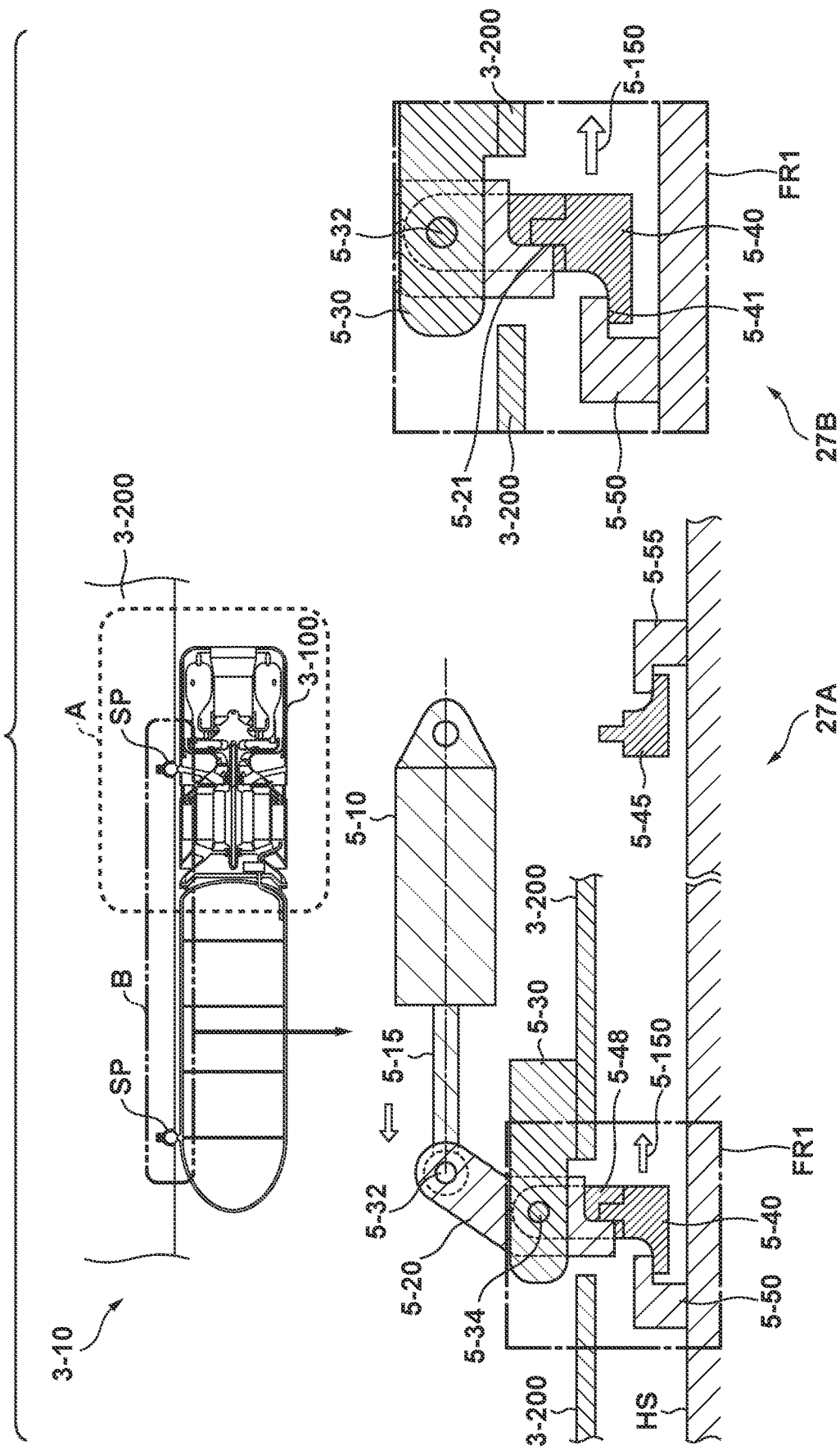
FIG. 27 depicts a view showing the structure of a separation mechanism in a flying body according to the 5Ath embodiment.

27A of FIG. 27 is a view showing the structure of a separation mechanism SP in a flying body 3-10 (FIG. 12) according to the embodiment. 27B of FIG. 27 is an enlarged view of a peripheral region FR1 of an engaging portion 5-40 and a following engaging portion 5-50 shown in 27A of FIG. 27. 27A of FIG. 27 shows, as an example, the separation mechanism SP provided in the front portion of an airframe 3-200, and it is assumed that a similar separation mechanism SP is arranged even on the rear side of the airframe 3-200.

The separation mechanism SP includes engaging portions (the engaging portion 5-40 on the front side of the airframe 3-200 in the longitudinal direction and an engaging portion 5-45 on the rear side) attached to the front portion and the rear portion of the airframe 3-200 that constitutes the flying body 3-10, and following engaging portions (the following engaging portion 5-50 on the front side of the housing HS in the longitudinal direction and a following engaging portion 5-55 on the rear side) attached to the front side and the rear side of a housing HS and engaging with the engaging portions 5-40 and 5-45 to attach the housing HS to the airframe 3-200. When the engaging portions 5-40 and 5-45 cancel the engaging states with the following engaging portions 5-50 and 5-55, a power supply device 3-100 (the housing HS) separates from the airframe 3-200.

Components configured to drive the engaging portion 5-40 will be described next. In the separation mechanism SP, a separation driving portion 5-10 is held in the airframe 3-200 and generates a driving force for canceling an engaging state. As the components configured to transmit the driving force of the separation driving portion 5-10 to the engaging portion 5-40, the separation mechanism SP includes a fixed arm 5-30 fixed to the airframe 3-200, a separation arm 5-48 in which the engaging portion 5-40 is formed, and a driving arm 5-20 that is rotatably connected, at a first pivoting portion 5-32, to a driving rod 5-15 of the separation driving portion 5-10 and rotatably connected, at a second pivoting portion 5-34, to the fixed arm 5-30 and is configured to transmit the driving force of the separation driving portion 5-10 to the separation arm 5-48.

FIG. 28 is a view showing the arrangement of the fixed arm 5-30, the separation arm 5-48, and the driving arms 5-20. The driving arms 5-20 are configured to sandwich the separation arm 5-48 from the left and right sides. Each of the left and right driving arms 5-20 is rotatably connected, at the first pivoting portion 5-32, to the driving rod 5-15 of the separation driving portion 5-10. A slidable cam face 5-21 is formed at an end portion of the driving arm 5-20, and the slidable cam face 5-21 is in contact with the convex portion of the separation arm 5-48. When the driving arm 5-20 is driven by the driving force of the separation driving portion 5-10, the motion of the driving arm 5-20 is transmitted to the separation arm 5-48 via the slidable cam face 5-21.

The fixed arm 5-30 is fixed to the airframe 3-200 by a fixing portion 5-31. The left and right driving arms 5-20 and the separation arm 5-48 are stored in the fixed arm 5-30 (width H) formed into a U shape. The left and right driving arms 5-20 and the separation arm 5-48 are rotatably connected to the fixed arm 5-30 at the second pivoting portion 5-34. The engaging portion 5-40 is formed on the separation arm 5-48, and a slidable cam face 5-41 having a predetermined curvature is formed on the engaging portion 5-40. In an engaging state in which the power supply device 3-100 and the airframe 3-200 are connected, the engaging portion 5-40 on which the slidable cam face 5-41 is formed engages with the following engaging portion 5-50 (FIG. 27). When the motion of the driving arms 5-20 is transmitted to the separation arm 5-48, the engaging portion 5-40 moves in the direction of an arrow 5-150, and the engaging state with the following engaging portion 5-50 is canceled. When the separation driving portion 5-10 drives the driving arms 5-20 and the separation arm 5-48 to cancel the engaging state between the engaging portion 5-40 and the following engaging portion 5-50, the power supply device 3-100 (the housing HS) can be separated from the airframe 3-200. An arrangement that cancels the engaging state between the engaging portion 5-40 and the following engaging portion 5-50 on the front side has been described with reference to FIG. 27. When a similar driving mechanism is arranged on the rear side, the engaging state between the engaging portion 5-45 and the following engaging portion 5-55 on the rear side can also be canceled.

According to the separation mechanism SP of this embodiment, the power supply device 3-100 can be separated from the flying body 3-10 (FIG. 12). This facilitates the maintenance operation of the power supply device 3-100. In addition, at the time of maintenance of the power supply device 3-100, the power supply device can be replaced (rented) with another power supply device to avoid troubles in commercial flights. It is therefore possible to increase the operation efficiency of the flying body in commercial flights.

(Modification)

In the 5Ath embodiment, an arrangement in which the driving mechanisms configured to drive the engaging portions 5-40 and 5-45 are provided to cancel the engaging state between the engaging portion 5-40 and the following engaging portion 5-50 on the front side and the engaging state between the engaging portion 5-45 and the following engaging portion 5-55 on the rear side has been described.

In this modification, an arrangement in which instead of providing the driving mechanisms on both of the front side and the rear side, the driving mechanism is provided only on one side, and the engaging state between the engaging portion and the following engaging portion is canceled on the other side without using the driving mechanism will be described.

Figure 29:
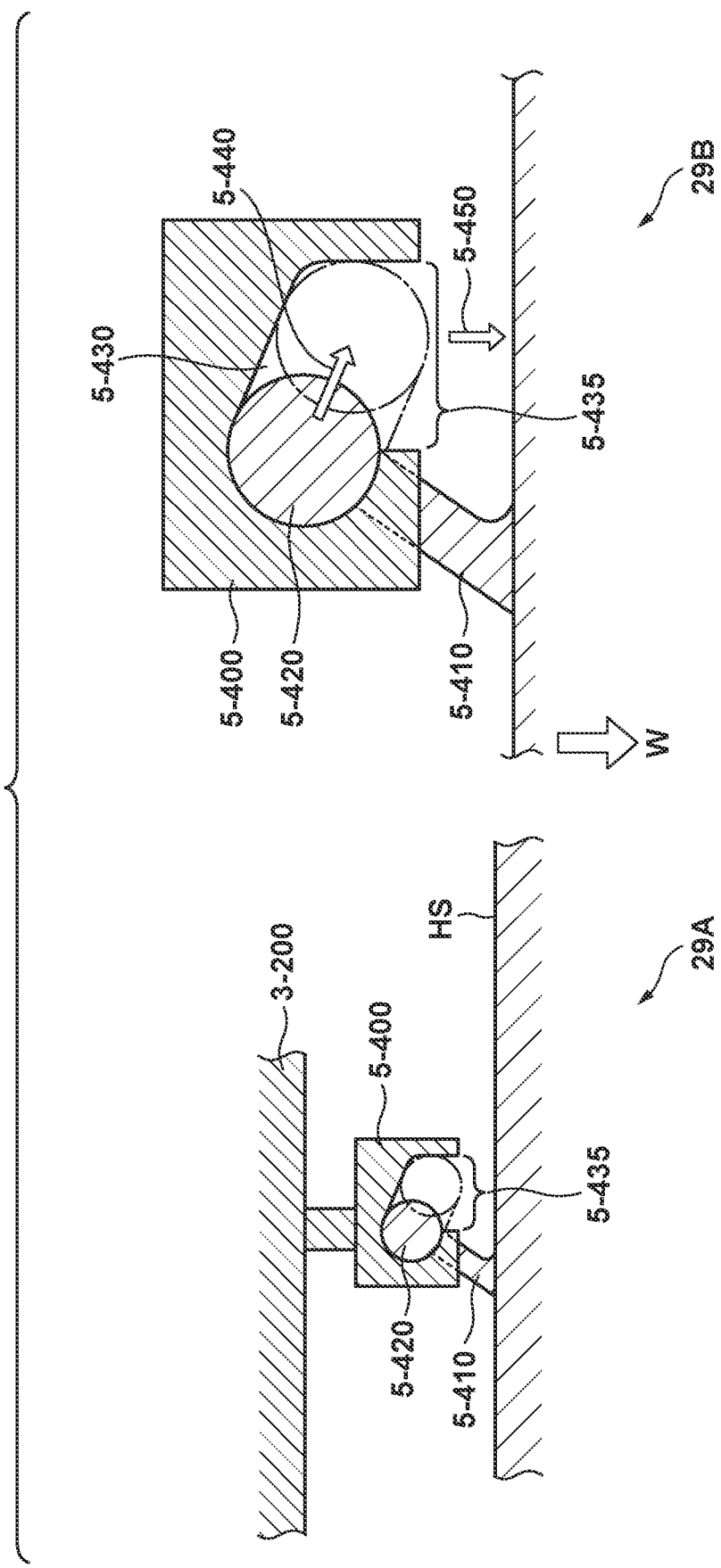
FIG. 29 depicts a view for explaining an arrangement of a modification of a separation mechanism.

29A of FIG. 29 is a view for explaining the arrangement of the modification, and 29B of FIG. 29 is an enlarged view of 29A of FIG. 29. Of the front portion and the rear portion of the airframe 3-200, the separation mechanism SP on one side is formed based on the separation driving portion 5-10, the fixed arm 5-30, the separation arm 5-48, and the driving arms 5-20 described with reference to FIG. 27 to 28. Of the front portion and the rear portion of the airframe 3-200, the separation mechanism SP on the other side has the arrangement as shown in FIG. 29.

In the separation mechanism SP on the other side, a slider engaging portion 5-400 functions as an engaging portion attached to the airframe 3-200. A projecting portion (for example, a spherical projection 5-420) is formed integrally with the end portion of a following engaging portion 5-410 attached to the housing HS of the power supply device 3-100. As shown in 29B of FIG. 29, a long slider engaging hole 5-430 is formed in the slider engaging portion 5-400 while obliquely tilting. In addition, a slider opening portion 5-435 is formed on the lower end face of the slider engaging portion 5-400. The projecting portion (the spherical projection 5-420) of the following engaging portion 5-410 is configured to engage with the slider engaging hole 5-430 in the engaging state. In the engaging state, the following engaging portion 5-410 is held by the slider engaging portion 5-400.

The state shown in 29B of FIG. 29 indicates an engaging state in which the projection (the spherical projection 5-420) of the following engaging portion 5-410 is held by the slider engaging portion 5-400. The spherical projection 5-420 indicated by an alternate long and short dashed line represents a state in which the spherical projection 5-420 has moved (slidably moved) in an obliquely downward direction along the slider engaging hole 5-430 in the direction of an arrow 5-440.

The slider engaging hole 5-430 holds the following engaging portion 5-410 (the spherical projection 5-420) in the engaging state. If the engaging state is canceled by the separation mechanism SP on one side, a rotation moment based on a weight W of the power supply device with respect to the spherical projection 5-420 as a fulcrum acts on the spherical projection 5-420. At the same time, a force component of the weight W based on the tilt angle of the slider engaging hole 5-430 acts. At this time, the slider engaging hole 5-430 slidably moves the following engaging portion 5-410 from the holding position in the direction of the arrow 5-440 by the weight W of the power supply device 3-100 (the housing HS). The slider opening portion 5-435 separates the slidably moved following engaging portion 5-410 in the direction of an arrow 5-450.

The separation mechanism SP on one side is formed by the driving mechanism including the separation driving portion, the fixed arm, the separation arm, and the driving arms. The separation mechanism SP on the other side cancels the engaging state between the engaging portion and the following engaging portion without using the driving mechanism, as shown in FIG. 29. This can reduce cost and weight.

5Bth Embodiment

The arrangement of a separation mechanism SP of a flying body 3-10 (FIG. 12) according to the 5Bth embodiment will be described next. The arrangement of the flying body 3-10 is similar to the arrangement described in the 5Ath embodiment. The flying body 3-10 includes a power supply device 3-100 and an airframe 3-200 (airframe main body), and the power supply device 3-100 is connected to the lower surface side of the airframe 3-200 via the separation mechanism SP in the vertical direction.

Figure 30:
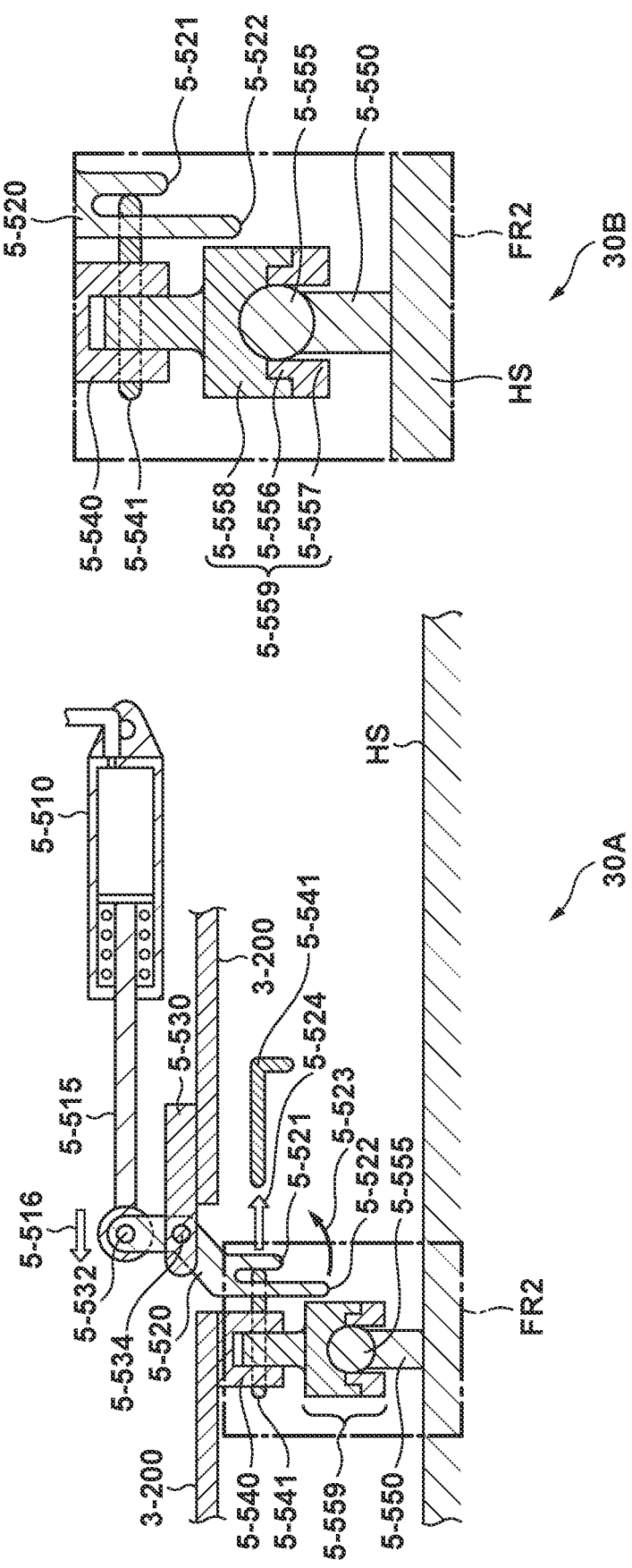
FIG. 30 depicts a view showing the structure of the separation mechanism of a flying body according to the 5Bth embodiment.

30A of FIG. 30 is a view showing the structure of the separation mechanism SP of the flying body 3-10 according to the 5Bth embodiment and 30B of FIG. 30 is an enlarged view of a peripheral region FR2 of an engaging portion 5-540 and a following engaging portion 5-550 shown in 30A of FIG. 30.

The engaging portion 5-540 is provided on the front side of the airframe 3-200 in the longitudinal direction. In addition, the following engaging portion 5-550 is provided on the front side of a housing HS in the longitudinal direction. A projecting portion (for example, a spherical projection 5-555) is formed integrally with the end portion of the following engaging portion 5-550. As shown in 30B of FIG. 30, a joint upper member 5-558 and a joint lower member 5-557 sandwich the spherical projection 5-555 in the up-and-down direction, and are fastened by a fastening portion 5-556 in this state. In this state, the spherical projection 5-555 is pivotally supported by the joint upper member 5-558 and the joint lower member 5-557.

Here, the three members, that is, the fastening portion 5-556, the joint lower member 5-557, and the joint upper member 5-558 form a spherical joint portion 5-559.

In this embodiment, the following engaging portion is formed by the following engaging portion 5-550, the spherical projection 5-555, and the spherical joint portion 5-559 (5-556, 5-557, and 5-558). The following engaging portion can function as a spherical joint. Since the following engaging portion (5-550, 5-555, and 5-559 (5-556, 5-557, and 5-558)) has the function of a spherical joint, when attaching the power supply device 3-100 (the housing HS) to the airframe 3-200 of the flying body 3-10, it is possible to easily adjust the relative positions of the airframe 3-200 of the flying body 3-10 and the power supply device 3-100 (the housing HS). Hence, the operation efficiency can be improved.

When a connecting pin 5-541 formed into an L shape is inserted between the joint upper member 5-558 of the following engaging portion and the engaging portion 5-540, the engaging portion 5-540 and the following engaging portion engage with each other. When the connecting pin 5-541 is removed, the engaging state is canceled, and the power supply device 3-100 (the housing HS) separates from the airframe 3-200.

The arrangement of a driving mechanism configured to remove the connecting pin 5-541 in the engaging state will be described next. As shown in 30A of FIG. 30, in the separation mechanism SP, a separation driving portion 5-510 is held in the airframe 3-200 and generates a driving force for canceling the engaging state.

As the components configured to transmit the driving force of the separation driving portion 5-510 to the connecting pin 5-541, the separation mechanism SP includes a fixed arm 5-530 fixed to the airframe 3-200, and a driving arm 5-520 on which pawl portions 5-521 and 5-522 capable of engaging with the connecting pin 5-541 are formed at an end portion. The pawl portions 5-521 and 5-522 are formed into a fork shape at the end portion of the driving arm 5-520. The convex portion of the connecting pin 5-541 formed into an L shape engages between the pawl portions 5-521 and 5-522 formed into a fork shape.

The driving arm 5-520 is rotatably connected, at a first pivoting portion 5-532, to a driving rod 5-515 of the separation driving portion 5-510 and rotatably connected, at a second pivoting portion 5-534, to the fixed arm 5-530, and transmits the driving force of the separation driving portion 5-510 to the connecting pin 5-541.

When the driving rod 5-515 is moved in the direction of an arrow 5-516 by the driving force of the separation driving portion 5-510, the driving arm 5-520 rotates in the direction of an arrow 5-523 with respect to the second pivoting portion 5-534 as a rotation center. When the driving arm 5-520 rotates in the direction of the arrow 5-523, the load (removing force) from the driving arm 5-520 acts, in the direction of an arrow 5-524, on the connecting pin 5-541 engaging between the pawl portions 5-521 and 5-522, and the connecting pin 5-541 is removed. The separation driving portion 5-510 drives the driving arm 5-520 by the driving force to remove the connecting pin 5-541, and cancels the engaging state between the engaging portion 5-540 and the following engaging portion (5-550, 5-555, and 5-559 (5-556, 5-557, and 5-558)), thereby separating the power supply device 3-100 (the housing HS) from the airframe 3-200.

An arrangement that cancels the engaging state between the engaging portion 5-540 and the following engaging portion on the front side has been described with reference to FIG. 30. When a similar driving mechanism (the separation driving portion 5-510, the fixed arm 5-530, and the driving arm 5-520) is arranged on the rear side, the engaging state between the engaging portion and the following engaging portion on the rear side can also be canceled.

According to the separation mechanism SP of this embodiment, the power supply device 3-100 can be separated from the flying body 3-10. This facilitates the maintenance operation of the power supply device 3-100. In addition, at the time of maintenance of the power supply device 3-100, the power supply device can be replaced with another power supply device to avoid troubles in commercial flights. It is therefore possible to increase the operation efficiency of the flying body in commercial flights.

In addition, an arrangement as described with reference to FIG. 29, in which instead of providing the driving mechanisms described with reference to FIG. 30 on both of the front side and the rear side, the driving mechanism is provided only on one side, and no driving mechanism is used on the other side may be used.

5Cth Embodiment

The arrangement of a flying body 3-10 (FIG. 12) according to the 5Cth embodiment will be described next. The arrangement of the flying body 3-10 is similar to the 5Ath embodiment. The flying body 3-10 includes a power supply device 3-100 and an airframe 3-200 (airframe main body), and the power supply device 3-100 is connected to the lower surface side of the airframe 3-200 via a separation mechanism SP in the vertical direction. As the arrangement of the separation mechanism SP, any arrangement of the 5Ath embodiment, the modification, and the 5Bth embodiment can be applied.

Figure 31:
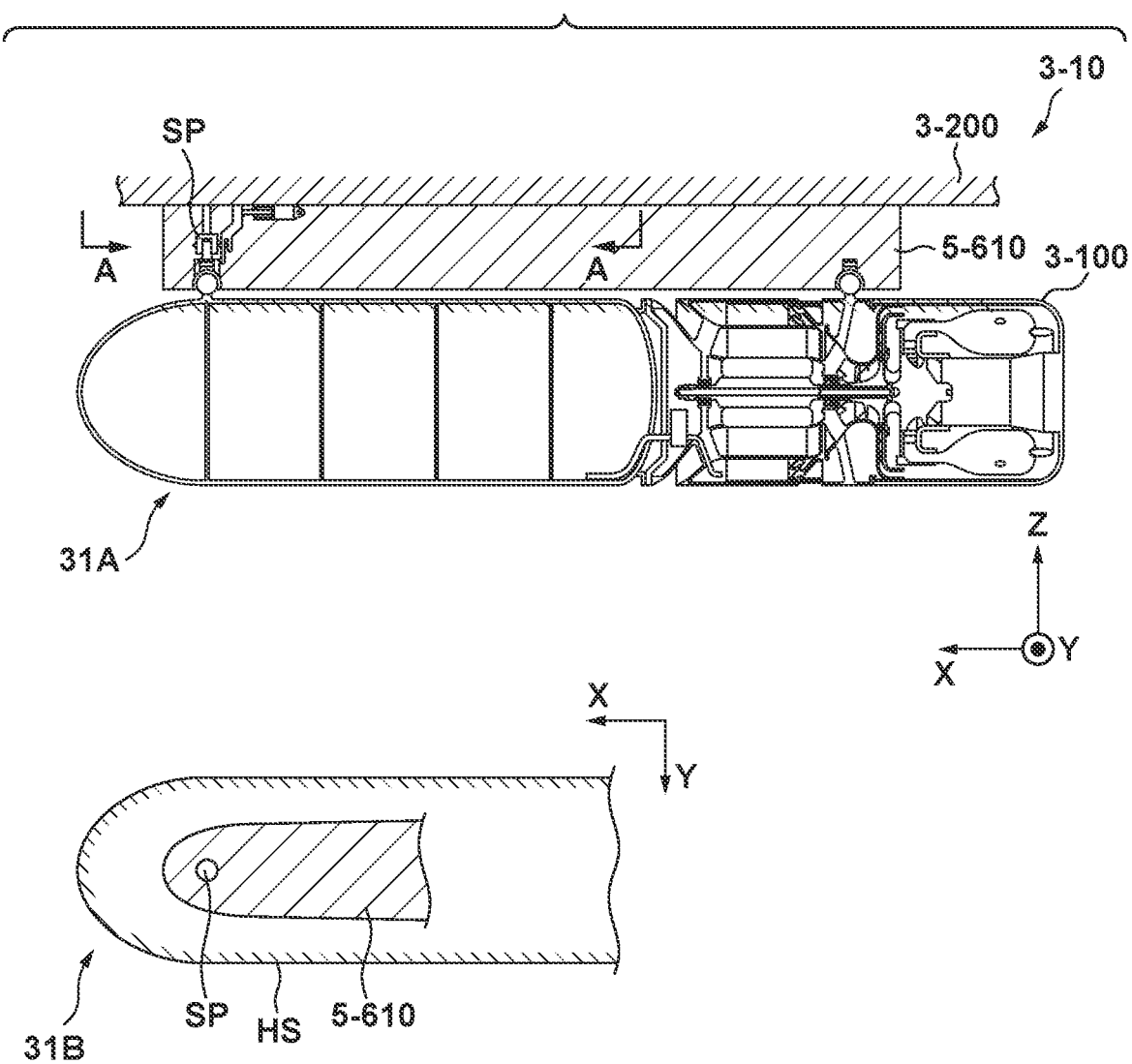
FIG. 31 depicts a view showing the arrangement of a flying body according to the 5Cth embodiment.

31A of FIG. 31 is a view showing the arrangement of the flying body 3-10 according to the 5Cth embodiment, which is a sectional view of the flying body 3-10 viewed from a side surface direction. 31B of FIG. 31 is a view showing a section of the flying body 3-10 according to the 5Cth embodiment taken along a line A-A in 31A of FIG. 31 viewed from a z direction.

In the flying body 3-10 according to this embodiment, a cowling 5-610 functioning as a windshield device is attached to the airframe 3-200 to cover the separation mechanisms SP in the front portion and the rear portion of the airframe 3-200. When the cowling 5-610 is attached to the airframe 3-200, the air drag caused by the exposure of the separation mechanisms SP decreases, and the propulsion efficiency can be improved.

Sixth Embodiment

The sixth embodiment of the present invention will be described below with reference to FIG. 32 to 36. The outline of a flying body including a power supply device 2-1 according to the sixth embodiment is similar to FIG. 5 described in the second embodiment.

[Internal Structure of Housing]

The internal structure of a housing 2-2 will be described next. The housing 2-2 according to the sixth embodiment includes a storage portion 6-21 that stores a power generation unit, and a fuel tank 6-22 serving as a reserving portion that stores the fuel of the power generation unit. For example, methanol, gasoline, or the like can be used as the fuel reserved in the fuel tank 6-22. The storage portion 6-21 and the fuel tank 6-22 are arrayed along the front-and-rear direction (X direction) of a flying body 2-100 (FIG. 5), and separably connected by a connecting portion 6-23. In the sixth embodiment, the fuel tank 6-22 is arranged on the front side of the flying body 2-100, and the storage portion 6-21 is arranged on the rear side of the flying body 2-100. In addition, the storage portion 6-21 is preferably set (configured) to have a thickness (sectional diameter) equal to or smaller than that of the fuel tank 6-22. When the storage portion 6-21 and the fuel tank 6-22 are constituted/arranged in this way, the air drag during forward flight of the flying body 2-100 can be reduced.

Figure 33:
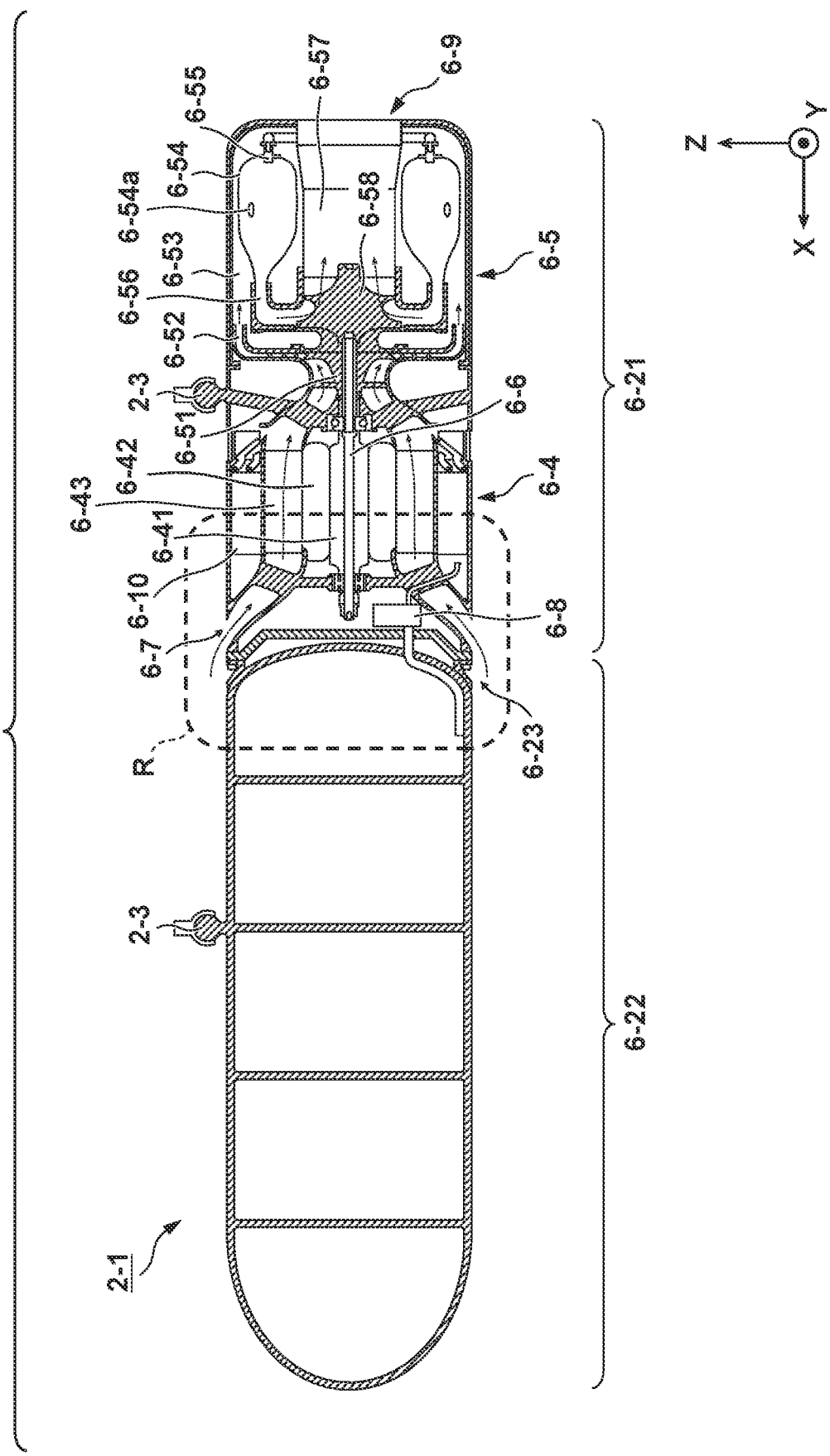
FIG. 33 is a sectional view of the power supply device according to the sixth embodiment.

The power generation unit stored in the storage portion 6-21 will be described with reference to FIG. 33. The power generation unit includes a power generator 6-4 and a gas turbine engine 6-5. The power generator 6-4 generates power by the output of the gas turbine engine 6-5. In the sixth embodiment, the power generator 6-4 and the gas turbine engine 6-5 are provided on a common rotating shaft 6-6. When the gas turbine engine 6-5 rotationally drives the rotating shaft 6-6, the power generator 6-4 can generate power. With this arrangement, the power generator 6-4 and the gas turbine engine 6-5 can be arranged without wasting the space, and the size can be reduced.

The gas turbine engine 6-5 includes a compressor including an impeller 6-51 and a diffuser 6-52. The impeller 6-51 is attached to the rotating shaft 6-6. Air taken from air intake ports 6-7 is sent to a compression chamber 6-53 while being compressed via the diffuser 6-52 as the impeller 6-51 rotates. The compressed air in the compression chamber 6-53 is taken from opening portions 6-54a provided in the circumferential wall of a combustion chamber 6-54 and other opening portions into the combustion chamber 6-54. In the combustion chamber 6-54, fuel injection nozzles 6-55 are provided, and the fuel taken from the fuel tank 6-22 via a pipe by a fuel pump 6-8 (supply portion) is injected (supplied) into the combustion chamber 6-54 by the fuel injection nozzles 6-55. At the time of start, an ignition device (not shown) ignites the air fuel mixture in the combustion chamber 6-54. After that, combustion of the air fuel mixture continuously occurs in the combustion chamber 6-54.

A combustion gas that has a high temperature and a high pressure in the combustion chamber 6-54 jets out from turbine nozzles 6-56 to the exhaust pipe 6-57, rotates a turbine 6-58 attached to the rotating shaft 6-6, and is discharged to the rear from an exhaust port 6-9 provided in the rear portion of the power supply device 2-1. The impeller 6-51, the turbine 6-58, and a rotor 6-41 (permanent magnet) of the power generator 6-4 to be described later are provided on the rotating shaft 6-6, and the impeller 6-51 and the rotor 6-41 can integrally be rotated by the rotation of the turbine 6-58. Note that in the sixth embodiment, the gas turbine engine 6-5 exclusively aims at driving the power generator 6-4, and actively using the exhaust gas flow as the thrust of the flying body 2-100 is not assumed. However, a form in which the exhaust gas flow is used as an auxiliary thrust is also possible.

The power generator 6-4 includes the rotor 6-41 such as a permanent magnet attached to the rotating shaft 6-6 and a stator 6-42 such as a coil disposed around the rotor 6-41. When the rotating shaft 6-6 is rotated by the gas turbine engine 6-5, and the rotor 6-41 attached to the rotating shaft 6-6 thus rotates, the stator 6-42 can generate power. In addition, a plurality of fins 6-43 configured to cool the stator 6-42 are provided around the stator 6-42 in the circumferential direction of the rotating shaft 6-6. The plurality of fins 6-43 are arranged in a space to which the air taken from the air intake ports 6-7 is guided. When the air passes between the plurality of fins 6-43, the plurality of fins 6-43 are cooled, and the stator 6-42 can thus be cooled.

A control unit 6-10 includes a circuit that controls power generation of the power generator 6-4, and a circuit that controls driving of the gas turbine engine 6-5. An auxiliary power supply such as a battery may be provided as the power supply in activating the control unit 6-10. The auxiliary power supply may be provided in the housing 2-2, or may be provided in an airframe 2-101. Power generated by the power generator 6-4 is supplied to a power load (a battery 2-107 or motors 2-105 and 2-106) in the airframe 2-101 via a cable (not shown). The cable may pass through connecting mechanisms 2-3. In addition, the control unit 6-10 of the power supply device 2-1 may be able to communicate with a control device 2-108 of the airframe 2-101, and the control unit 6-10 may be configured to perform power generation control in accordance with an instruction from the control device 2-108.

As described above, when the power supply device 2-1 is arranged outside the airframe 2-101, the degree of freedom in designing the airframe 2-101 of the flying body 2-100 can be improved. For example, it is possible to ensure a wider cabin space in the airframe 2-101 and improve the comfort of crew. In addition, noise and vibrations generated by the operation of the power supply device 2-1 are reduced as compared to a case in which the power supply device 2-1 is provided in the airframe 2-101, and silence can be improved. Furthermore, as compared to a case in which the power supply device 2-1 is provided in the airframe 2-101, access to the inside of the power supply device 2-1 is easy, the maintenance is facilitated, and the maintenance burden can be reduced. The power supply device 2-1 alone can be developed separately from the airframe 2-101, various kinds of qualification tests and type certifications before mass production become easy, and mass production can be implemented early. Furthermore, the power supply device 2-1 has a shape long in the front-and-rear direction of the flying body 2-100, that is, a low air drag shape with a small front projection area. For this reason, even in the arrangement in which the power supply device 2-1 is arranged outside the airframe 2-101, the fuel consumption performance of the flying body 2-100 is not greatly lowered. Since the gas turbine engine 6-5 of the power supply device 2-1 does not aim at generating the thrust of the flying body 2-100, the rigidity of the connecting mechanisms 2-3 can be low, and the structure can be relatively simple.

[Connecting Structure between Fuel Tank and Storage Portion]

In the flying body 2-100, the capacity of fuel consumed in flight is decided (defined) in accordance with the flight purpose (cruising distance). For this reason, if the fuel tank 2-22 (FIG. 6) having a capacity much larger than the capacity of fuel consumed in flight is used, the weight of the flying body 2-100 increases by the capacity, and the fuel consumption performance is greatly lowered. Hence, in the power supply device 2-1 according to the sixth embodiment shown in FIG. 32 to 33, the storage portion 6-21 that stores the power generation unit and the fuel tank 6-22 are separably connected by the connecting portion 6-23. With this arrangement, for example, as shown in FIG. 32, the fuel tank 6-22 of a size according to the flight purpose (cruising distance) of the flying body 2-100 can be connected to the storage portion 6-21.

Figure 32:
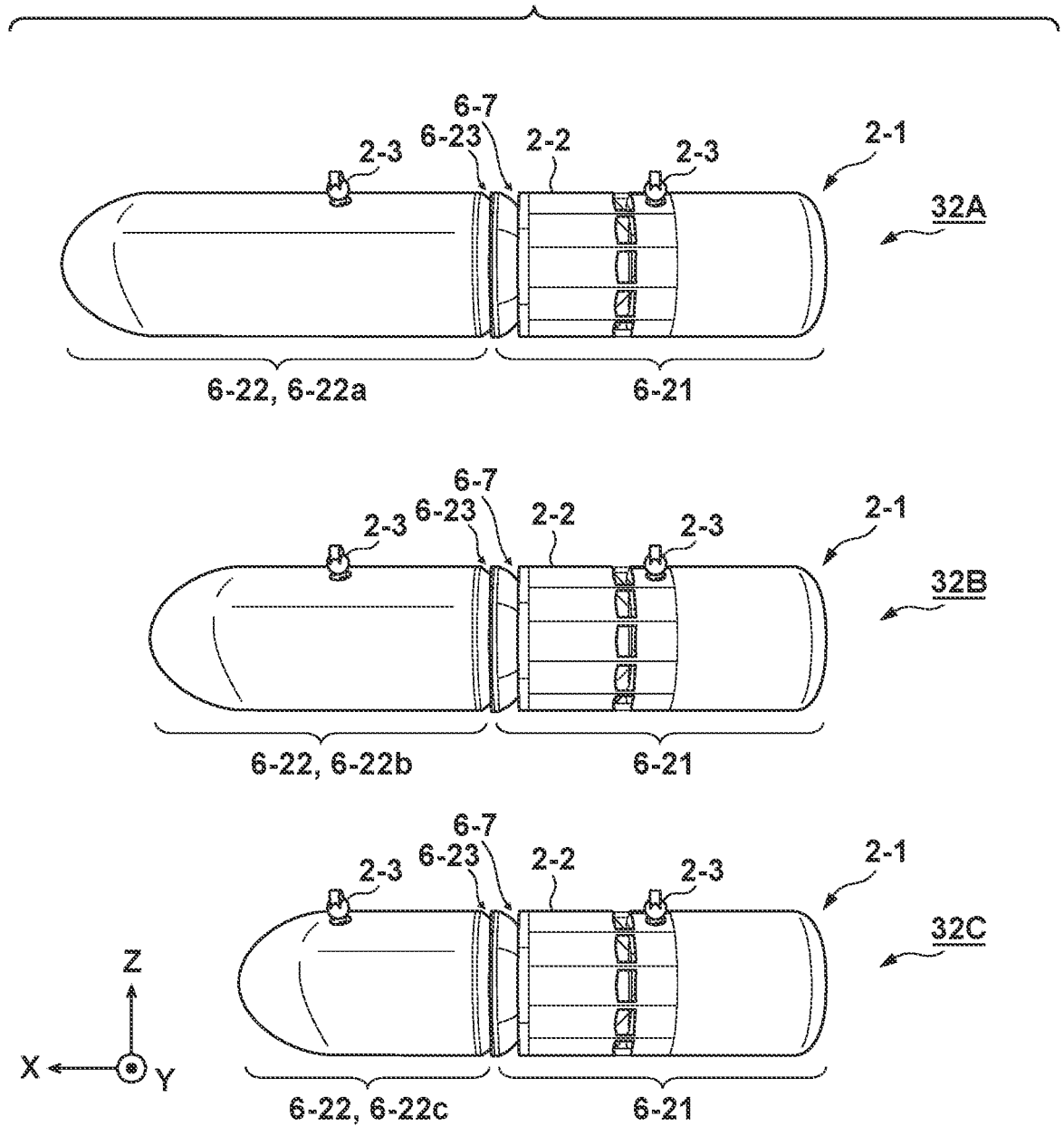
FIG. 32 depicts external views of a power supply device according to the sixth embodiment.

32A of FIG. 32 shows an example in which a fuel tank 6-22a for a long distance is used, 32B of FIG. 32 shows an example in which a fuel tank 6-22b for a middle distance is used, and 32C of FIG. 32 shows an example in which a fuel tank 6-22c for a short distance is used. The fuel tank 6-22a for a long distance, the fuel tank 6-22b for a middle distance, and the fuel tank 6-22c for a short distance have the same thickness (sectional diameter), and have lengths different from each other in the front-and-rear direction of the flying body 2-100, thereby changing the fuel storage capacity. In addition, the plurality of connecting mechanisms 2-3 are attached to positions where the positional relationship between the connecting mechanisms 2-3 does not change even if the fuel tank 6-22 of a different size is connected to the storage portion 6-21. In the sixth embodiment, the fuel tanks 6-22a to 6-22c of different sizes are configured to have lengths different from each other on the distal end side of the connecting mechanism 2-3.

Figure 34:
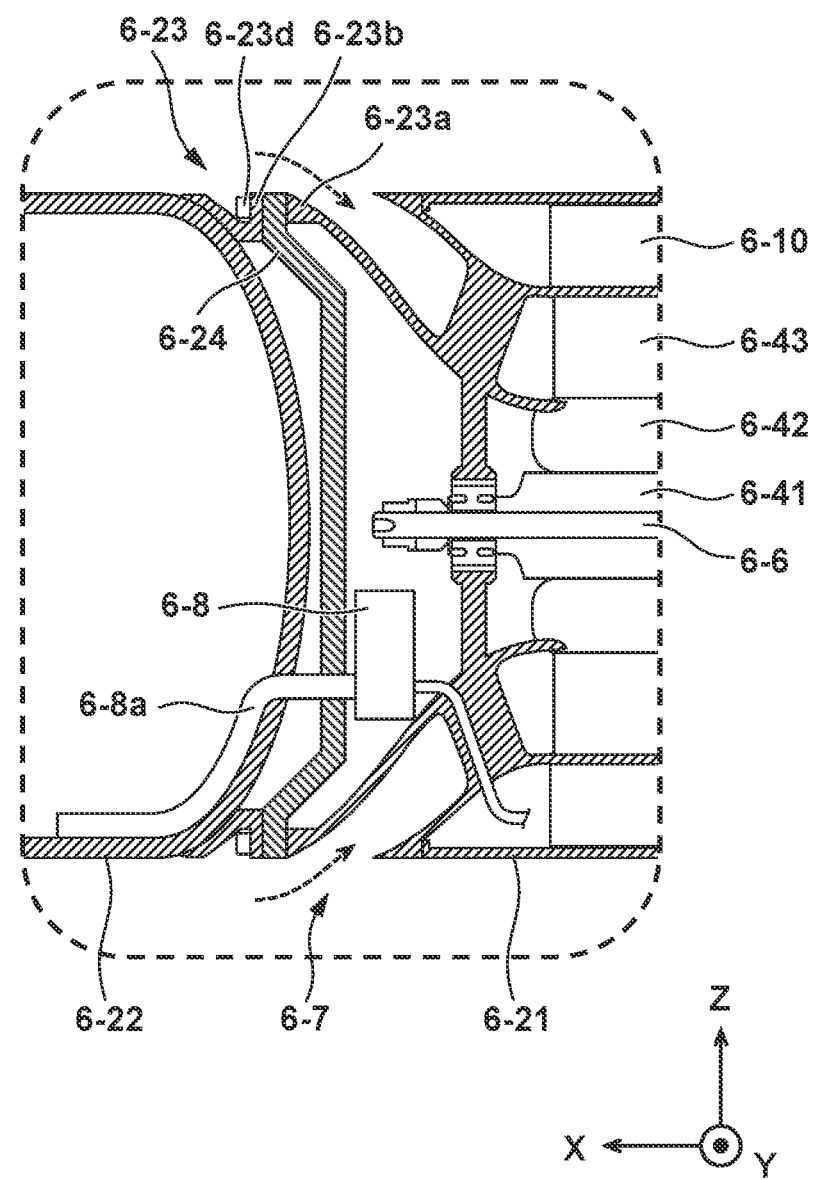
FIG. 34 is an enlarged view of a region R shown in FIG. 33.
Figure 35:
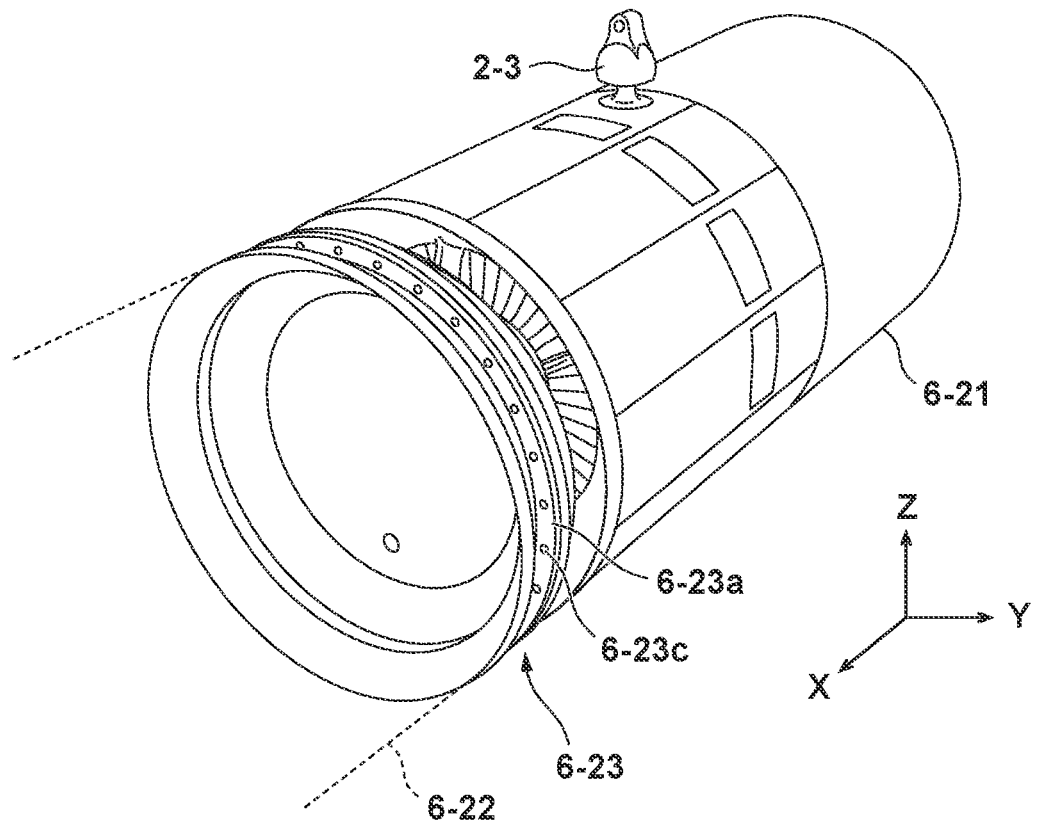
FIG. 35 is an external perspective view showing the rear end portion of a fuel tank and a storage portion.
Figure 36:
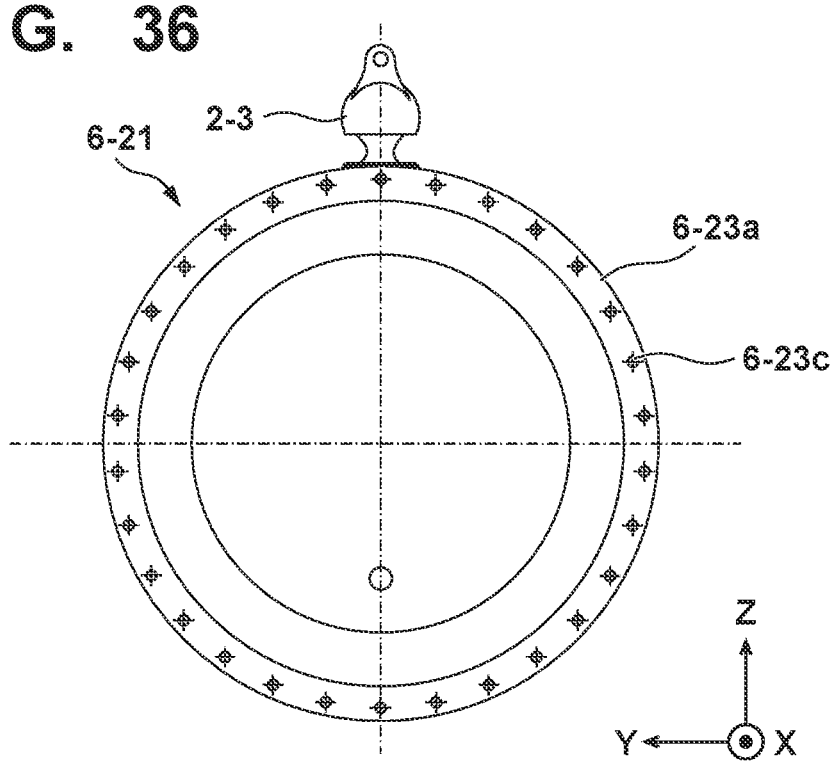
FIG. 36 is a schematic view showing the storage portion in a state in which the fuel tank is detached viewed from the front side.

The arrangement of the connecting portion 6-23 configured to connect the storage portion 6-21 and the fuel tank 6-22 will be described next with reference to FIGS. 34 to 36. FIG. 34 is an enlarged view of a region R shown in FIG. 33. FIG. 35 is an external perspective view showing the rear end portion of the fuel tank 6-22 and the storage portion 6-21 so as to explain the arrangement of the connecting portion 6-23. FIG. 36 is a schematic view showing the storage portion 6-21 in a state in which the fuel tank 6-22 is detached viewed from the front side.

As shown in FIG. 34, the connecting portion 6-23 fixes, by screws or the like, an annular abutting target portion 6-23a provided on the storage portion 6-21 and an annular abutting portion 6-23b provided on the fuel tank 6-22, thereby connecting the storage portion 6-21 and the fuel tank 6-22. In the sixth embodiment, as shown in FIGS. 35 and 36, a plurality of screw grooves 6-23c are formed in the abutting target portion 6-23a of the storage portion 6-21 along the circumferential direction, and a plurality of holes are formed in the abutting portion 6-23b of the fuel tank 6-22 at positions corresponding to the plurality of screw grooves 6-23c in the storage portion 6-21. To connect the fuel tank 6-22 to the storage portion 6-21 by the connecting portion 6-23, a pipe 6-8a extracted from the fuel tank 6-22 is inserted into the supply pump 6-8, and the abutting portion 6-23b of the fuel tank 6-22 is made to abut against the abutting target portion 6-23a of the storage portion 6-21. In this state, screw members 6-23d are threadably engaged with the plurality of screw grooves 6-23c in the abutting target portion 6-23a of the storage portion 6-21 via the holes in the abutting portion 6-23b of the fuel tank 6-22. This can fix the abutting portion 6-23b to the abutting target portion 6-23a and connect the fuel tank 6-22 to the storage portion 6-21. After the fuel tank 6-22 is connected to the storage portion 6-21 to form the integral housing 2-2, the housing 2-2 is connected to the airframe 2-101 by the plurality of connecting mechanisms 2-3.

In addition, a fireproof plate 6-24 is provided between the storage portion 6-21 and the fuel tank 6-22. The fireproof plate 6-24 has a circular shape having the same diameter as the thickness (sectional diameter) of the housing 2-2 when viewed from the front side, and includes, in the peripheral portion, a plurality of holes at positions corresponding to the plurality of screw grooves 6-23c in the abutting target portion 6-23a of the storage portion 6-21. When connecting the fuel tank 6-22 to the storage portion 6-21, the fireproof plate 6-24 is arranged between the abutting target portion 6-23a of the storage portion 6-21 and the abutting portion 6-23b of the fuel tank 6-22, fastened together by the screw members 6-23d, and thus fixed to the storage portion 6-21 and the fuel tank 6-22. When the fireproof plate 6-24 is provided, even in a case of outbreak of fire in the gas turbine engine 6-5, flame propagation to the side of the fuel tank 6-22 can be prevented. The fireproof plate 6-24 is preferably made of a fireproof material that does not burn and does not cause damages such as deformation, melting, cracking, and the like by heat.

As described above, in the power supply device 2-1 according to this embodiment, the storage portion 6-21 and the fuel tank 6-22 are separably connected. Since the fuel tank 6-22 of a size according to the flight purpose (cruising distance) of the flying body 2-100 can be selected, and the fuel tank 6-22 can be attached to the storage portion 6-21, an excess increase in the weight can be prevented, and lowering of fuel consumption performance can be reduced.

Other Embodiments

In the above sixth embodiment, a helicopter has been shown as the flying body 2-100. In addition to such a rotorcraft, the present invention can be applied not only to an aircraft such as a fixed-wing aircraft or airship but also to a flying type personal mobility, spacecraft, a space shuttle, and the like. The rotorcraft can include a glider aircraft represented by a glider and an aircraft represented by a propeller plane. The present invention is also applicable to a flying body that is not of electric propulsion type.

The connection portions of the power supply device 2-1 can include the upper surface of a wing portion of the airframe 2-101 and the bottom surface of a wing portion of the airframe 2-101 in addition to the bottom surface of the airframe 2-101. The power supplied by the power supply device 2-1 may be power supplied to a power load that constitutes a driving source such as a motor, may be power supplied to a power load other than the driving source, or may be power supplied to both.

A plurality of power supply devices 2-1 may be provided in one flying body. If a plurality of power supply devices are provided, they may be juxtaposed in the widthwise direction of the flying body, or may be arranged in one line in the front-and-rear direction of the flying body.

In the above embodiment, an example in which the housing 2-2 has a cylindrical shape has been described. However, the housing 2-2 may have another tubular shape such as a square tubular shape. In addition, the housing 2-2 may include a portion with a cylindrical shape and a portion with a square tubular shape. Furthermore, in the sixth embodiment, an arrangement example in which each of the storage portion 6-21 and the fuel tank 6-22 is provided with one connecting mechanism 2-3 has been described. However, an arrangement in which each of the storage portion 6-21 and the fuel tank 6-22 is provided with two or more connecting mechanisms 2-3 may be employed, or an arrangement in which the fuel tank 6-22 is not provided with the connecting mechanism 2-3, and only the storage portion 6-21 is provided with the connecting mechanism 2-3 may be employed.

Seventh Embodiment

The seventh embodiment of the present invention will be described below with reference to FIGS. 37 to 42. The outline of a flying body including a power supply device 2-1 according to the seventh embodiment is similar to FIGS. 5 and 6 described in the second embodiment.

[Internal Structure of Housing]

The internal structure of a housing 2-2 will be described next. The housing 2-2 according to the seventh embodiment includes a storage portion 7-21 that stores a power generation unit, and a fuel tank 7-22 serving as a reserving portion that stores the fuel of the power generation unit. For example, methanol, gasoline, or the like can be used as the fuel reserved in the fuel tank 7-22. The storage portion 7-21 and the fuel tank 7-22 are arrayed along the front-and-rear direction (X direction) of a flying body 2-100 (FIG. 5), and separably connected by a connecting portion 7-23. In the seventh embodiment, the fuel tank 7-22 is arranged on the front side of the flying body 2-100, and the storage portion 7-21 is arranged on the rear side of the flying body 2-100. In addition, the storage portion 7-21 and the fuel tank 7-22 are preferably formed into the same thickness (sectional diameter). When the storage portion 7-21 and the fuel tank 7-22 are constituted/arranged in this way, the air drag during forward flight of the flying body 2-100 can be reduced.

Figure 37:
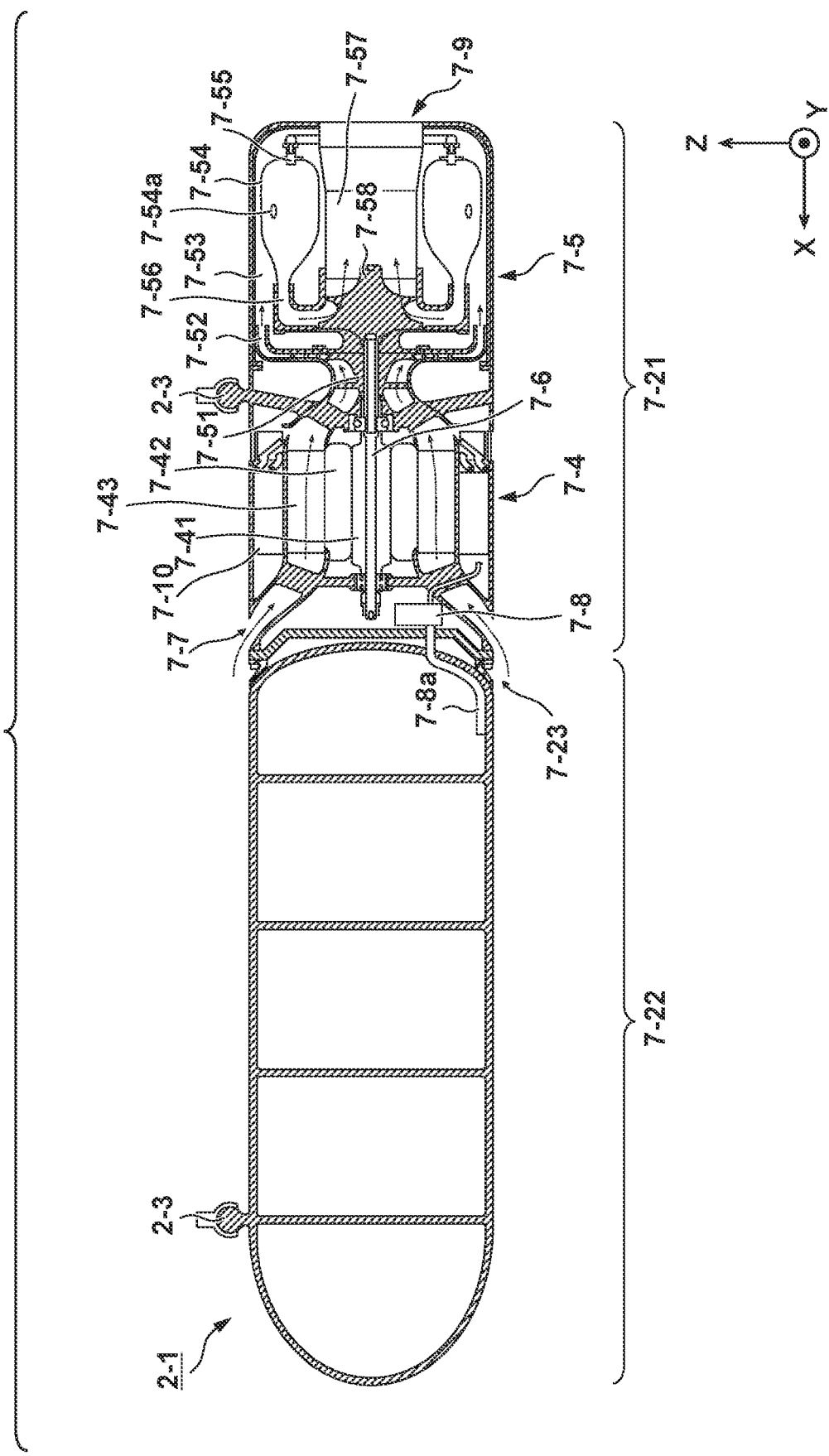
FIG. 37 is a sectional view of a power supply device according to the seventh embodiment.

The power generation unit stored in the storage portion 7-21 will be described with reference to FIG. 37. The power generation unit includes a power generator 7-4 and a gas turbine engine 7-5. The power generator 7-4 generates power by the output of the gas turbine engine 7-5. In the seventh embodiment, the power generator 7-4 and the gas turbine engine 7-5 are provided on a common rotating shaft 7-6. When the gas turbine engine 7-5 rotationally drives the rotating shaft 7-6, the power generator 7-4 can generate power. With this arrangement, the power generator 7-4 and the gas turbine engine 7-5 can be arranged without wasting the space, and the size can be reduced.

The gas turbine engine 7-5 includes a compressor including an impeller 7-51 and a diffuser 7-52. The impeller 7-51 is attached to the rotating shaft 7-6. Air taken from air intake ports 7-7 is sent to a compression chamber 7-53 while being compressed via the diffuser 7-52 as the impeller 7-51 rotates.

The compressed air held in the compression chamber 7-53 is taken from opening portions 7-54a provided in the circumferential wall of a combustion chamber 7-54 and other opening portions into the combustion chamber 7-54. In the combustion chamber 7-54, fuel injection nozzles 7-55 are provided, and the fuel taken from the fuel tank 7-22 via a pipe 7-8a by a fuel pump 7-8 (supply portion) is injected (supplied) into the combustion chamber 7-54 by the fuel injection nozzles 7-55. At the time of start, an ignition device (not shown) ignites the air fuel mixture in the combustion chamber 7-54. After that, combustion of the air fuel mixture continuously occurs in the combustion chamber 7-54.

A combustion gas that has a high temperature and a high pressure in the combustion chamber 7-54 jets out from turbine nozzles 7-56 to the exhaust pipe 7-57, rotates a turbine 7-58 attached to the rotating shaft 7-6, and is discharged to the rear from an exhaust port 7-9 provided in the rear portion of the power supply device 2-1. The impeller 7-51, the turbine 7-58, and a rotor 7-41 (permanent magnet) of the power generator 7-4 to be described later are provided on the rotating shaft 7-6, and the impeller 7-51 and the rotor 7-41 can integrally be rotated by the rotation of the turbine 7-58. Note that in the seventh embodiment, the gas turbine engine 7-5 exclusively aims at driving the power generator 7-4, and actively using the exhaust gas flow as the thrust of the flying body 2-100 is not assumed. However, a form in which the exhaust gas flow is used as an auxiliary thrust is also possible.

The power generator 7-4 includes the rotor 7-41 such as a permanent magnet attached to the rotating shaft 7-6 and a stator 7-42 such as a coil disposed around the rotor 7-41. When the rotating shaft 7-6 is rotated by the gas turbine engine 7-5, and the rotor 7-41 attached to the rotating shaft 7-6 thus rotates, the stator 7-42 can generate power. In addition, a plurality of fins 7-43 configured to cool the stator 7-42 are provided around the stator 7-42 in the circumferential direction of the rotating shaft 7-6. The plurality of fins 7-43 are arranged in a space to which the air taken from the air intake ports 7-7 is guided. When the air passes between the plurality of fins 7-43, the plurality of fins 7-43 are cooled, and the stator 7-42 can thus be cooled.

A control unit 7-10 includes a circuit that controls power generation of the power generator 7-4, and a circuit that controls driving of the gas turbine engine 7-5. An auxiliary power supply such as a battery may be provided as the power supply in activating the control unit 7-10. The auxiliary power supply may be provided in the housing 2-2, or may be provided in an airframe 2-101. Power generated by the power generator 7-4 is supplied to a power load (a battery 2-107 or motors 2-105 and 2-106) in the airframe 2-101 via a cable (not shown). The cable may pass through connecting mechanisms 2-3. In addition, the control unit 7-10 of the power supply device 2-1 may be able to communicate with a control device 2-108 of the airframe 2-101, and the control unit 7-10 may be configured to perform power generation control in accordance with an instruction from the control device 2-108.

As described above, when the power supply device 2-1 is arranged outside the airframe 2-101, the degree of freedom in designing the airframe 2-101 of the flying body 2-100 can be improved. For example, it is possible to ensure a wider cabin space in the airframe 2-101 and improve the comfort of crew. In addition, noise and vibrations generated by the operation of the power supply device 2-1 are reduced as compared to a case in which the power supply device 2-1 is provided in the airframe 2-101, and silence can be improved. Furthermore, as compared to a case in which the power supply device 2-1 is provided in the airframe 2-101, access to the inside of the power supply device 2-1 is easy, the maintenance is facilitated, and the maintenance burden can be reduced. The power supply device 2-1 alone can be developed separately from the airframe 2-101, various kinds of qualification tests and type certifications before mass production become easy, and mass production can be implemented early. Furthermore, the power supply device 2-1 has a shape long in the front-and-rear direction of the flying body 2-100, that is, a low air drag shape with a small front projection area. For this reason, even in the arrangement in which the power supply device 2-1 is arranged outside the airframe 2-101, the fuel consumption performance of the flying body 2-100 is not greatly lowered. Since the gas turbine engine 7-5 of the power supply device 2-1 does not aim at generating the thrust of the flying body 2-100, the rigidity of the connecting mechanisms 2-3 can be low, and the structure can be relatively simple.

[Arrangement of Fuel Tank]

In the power supply device 2-1 according to the seventh embodiment, a vibration sometimes occurs in the fuel tank 7-22 due to, for example, a vibration transmitted from the airframe 2-101, an airflow outside the airframe 2-101, and the like. In this case, a so-called sloshing phenomenon occurs in which the liquid fuel reserved in the fuel tank 7-22 causes resonance, and the liquid surface moves up and down (swings). If the sloshing phenomenon occurs, the power supply device 2-1 (housing 2-2) swings to exert an influence on posture control of the airframe 2-101, or the fuel tank 7-22 itself may break. Hence, the power supply device 2-1 according to this embodiment is configured to be able to suppress the occurrence of the sloshing phenomenon in the fuel tank 7-22.

Figure 38:
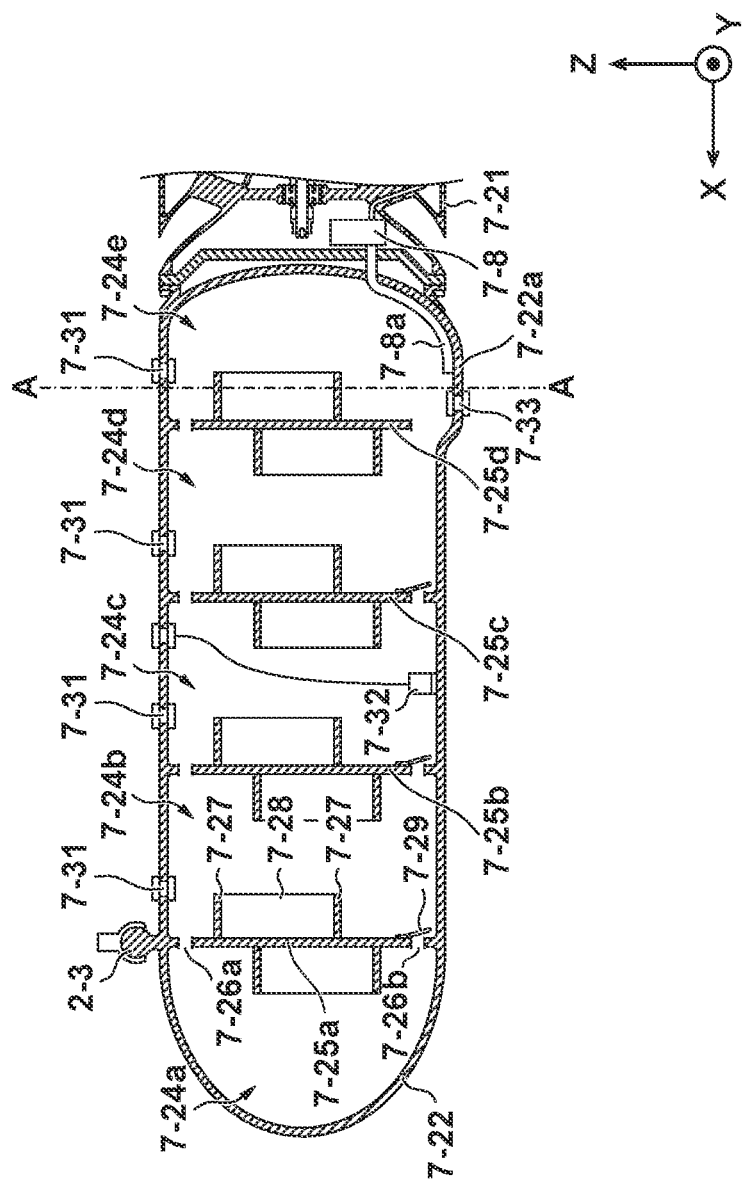
FIG. 38 is an X-Z sectional view of a fuel tank.

The arrangement of the fuel tank 7-22 according to the seventh embodiment will be described. FIG. 38 is an X-Z sectional view of the fuel tank 7-22 according to the seventh embodiment. The fuel tank 7-22 includes partitions 7-25 that divide the reservation space of fuel into a plurality of partial spaces 7-24 arrayed along the longitudinal direction of the housing 2-2. Since the partitions 7-25 function as wave dissipating plates configured to reduce the swing of the liquid surface of the fuel (liquid) reserved in the fuel tank 7-22, it is possible to suppress the occurrence of the sloshing phenomenon and reduce the influence on posture control of the airframe 2-101 and the breakage of the fuel tank 7-22. In the seventh embodiment, four partitions 7-25a to 7-25d are provided in the fuel tank 7-22, and the reservation space of the fuel is divided into five partial spaces 7-24a to 7-24e. Each of the partitions 7-25a to 7-25d is formed into a plate shape with a plate surface perpendicular to the longitudinal direction of the housing 2-2 and connected to the inner wall of the fuel tank 7-22.

Vent holes 7-31 that communicate the inside of the fuel tank 7-22 with the outside are provided in the fuel tank 7-22. The vent holes 7-31 are provided for several partial spaces divided by the partitions 7-25. In the seventh embodiment, each of the partial spaces 7-24b to 7-24e is provided with one vent hole 7-31. When the vent holes 7-31 are provided, it is possible to reduce the possibility that the fuel in the fuel tank 7-22 is volatilized, and the volume is expanded to break the fuel tank 7-22. In addition, a fuel level sensor 7-32 configured to detect the remaining amount of the fuel is provided in the fuel tank 7-22. Fuel remaining amount information detected by the fuel level sensor 7-32 is transmitted to the control device 2-108 or the control unit 7-10 via a cable.

Figure 39:
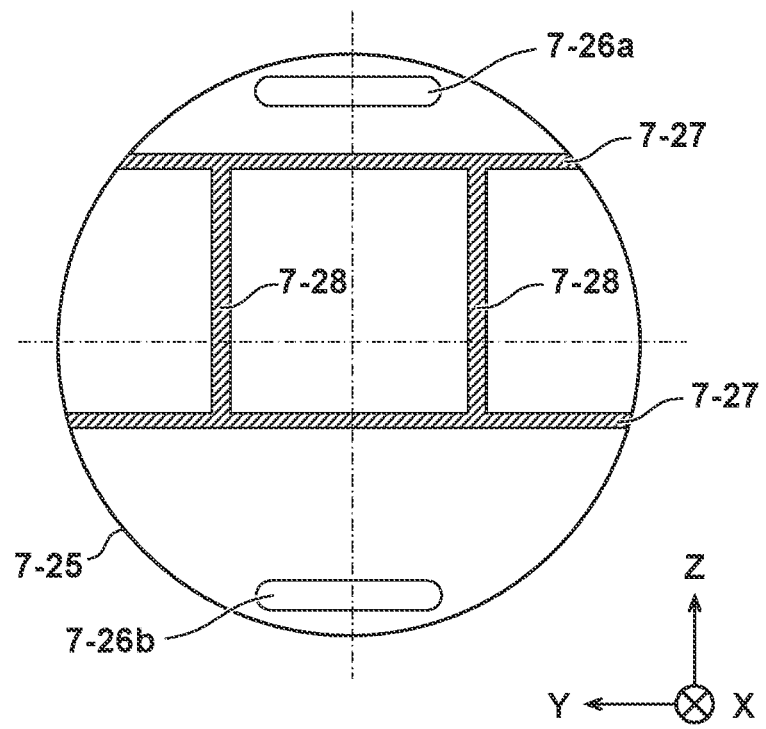
FIG. 39 is a view showing one partition viewed from an X direction side.

The arrangement of each of the partitions 7-25a to 7-25d will be described next with reference to FIGS. 38 and 39. FIG. 39 is a view showing one partition 7-25 viewed from the X direction side.

Opening portions 7-26 configured to make the plurality of partial spaces 7-24a to 7-24e communicate are formed in each of the partitions 7-25a to 7-25d. In the seventh embodiment, the opening portions 7-26 (an upper opening portion 7-26a and a lower opening portion 7-26b) are formed in each partition 7-25 at two points on the upper and lower sides. In addition, each of the opening portions 7-26 of the partitions 7-25a to 7-25d is provided with a check valve 7-29 that prevents the reverse flow of the fuel that has passed through the opening portions 7-26. In the seventh embodiment, as shown in FIG. 38, the check valve 7-29 is provided on the lower opening portion 7-26b of each of the partitions 7-25a to 7-25d. The check valve 7-29 has a function of preventing the fuel that has flowed from the partial space 7-24 on the front side to the partial space 7-24 on the rear side via the lower opening portion 7-26b from reversely flowing to the partial space 7-24 on the front side via the lower opening portion 7-26b. The check valve 7-29 can be formed by, for example, a thin plate having an area larger than the opening area of the opening portion 7-26 (lower opening portion 7-26b) and provided on the rear surface of each of the partitions 7-25a to 7-25d to cover the opening portion 7-26 (lower opening portion 7-26b). When the check valves 7-29 are provided, even in a case in which the airframe 2-101 tilts, uneven distribution of the fuel in the fuel tank 7-22 can be prevented. Additionally, even in a case in which the fuel in the fuel tank 7-22 decreases, the fuel can efficiently be used.

Plate members 7-27 extending in the longitudinal direction of the housing 2-2 are provided between the upper opening portion 7-26a and the lower opening portion 7-26b. The plate members 7-27 extend from the partitions 7-25 such that the plate surfaces become perpendicular to the up-and-down direction (Z direction) of the flying body 2-100. In the seventh embodiment, a plurality of (two) plate members 7-27 arranged apart in the up-and-down direction of the flying body 2-100 are provided on each partition. The thus configured plate members 7-27 can reduce the swing of the liquid surface of the fuel (liquid) reserved in the fuel tank 7-22 and therefore function as auxiliary wave dissipating plates of the partitions 7-25. Hence, when the plate members 7-27 are provided on the partitions 7-25, it is possible to further reduce the occurrence of the sloshing phenomenon and further reduce the influence on posture control of the airframe 2-101 and the breakage of the fuel tank 7-22.

Additionally, between the plurality of plate members 7-27, a plurality of (two) rib members 7-28 connected to them are provided apart in the widthwise direction (Y direction) of the flying body 2-100. The rib members 7-28 have a plate shape extending from the partition 7-25 such that the plate surfaces become perpendicular to the widthwise direction (Y direction) of the flying body 2-100. Since the rib members 7-28 have a function of reinforcing the plurality of plate members 7-27 extending from the partitions 7-25, the function/effect of reducing the swing of the liquid surface of the fuel by the plate members 7-27 can be enhanced. In this embodiment, as shown in FIG. 38, for one partition 7-25, a set of the plurality of plate members 7-27 and the plurality of rib members 7-28 is provided on each of the front side and the rear side of the partition 7-25 in the front-and-rear direction of the flying body 2-100. In this case, if the positions of the plate members 7-27 on the front side and the positions of the plate members 7-27 on the rear side are shifted (changed) in the up-and-down direction of the flying body 2-100, the occurrence of the sloshing phenomenon can be reduced more efficiently.

Figure 40:
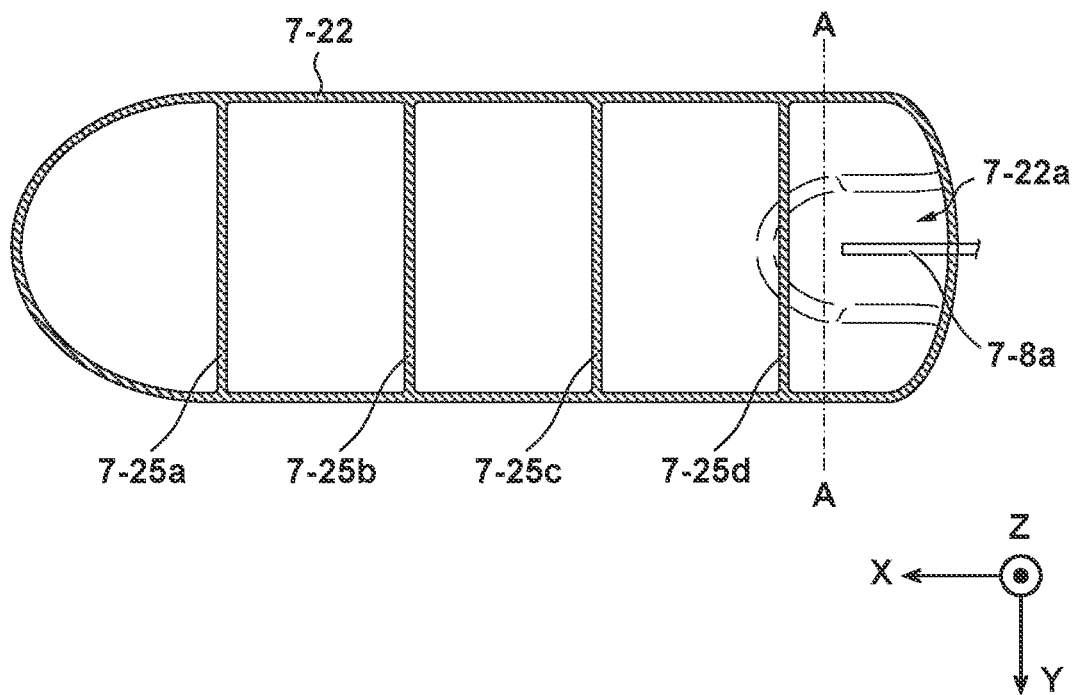
FIG. 40 is an X-Y sectional view of the fuel tank.
Figure 41:
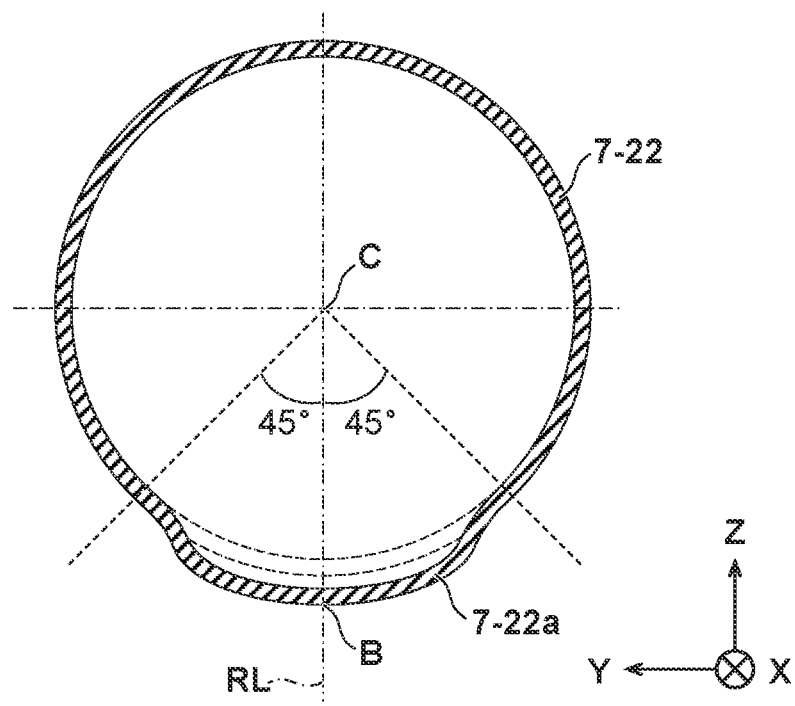
FIG. 41 is a view showing a section (Y-Z section) taken along a line A-A in FIGS. 38 and 40.

Furthermore, as shown in FIGS. 38 and 40, a concave portion 7-22*a* configured to collect remaining fuel is provided in the bottom portion of the fuel tank 7-22 according to the seventh embodiment. In the concave portion 7-22*a*, the inlet of a pipe 7-8*a* communicating with the fuel pump 7-8 is arranged, and a drain port 7-33 (drain plug) of the fuel is provided. Note that FIG. 40 is an X-Y sectional view of the fuel tank 7-22. The fuel tank 7-22 according to this embodiment has a cylindrical shape, and the concave portion 7-22*a* is formed into a shape projecting downward with respect to the cylindrical shape. More specifically, as shown in FIG. 41, on a section perpendicular to the longitudinal direction of the housing 2-2, the concave portion 7-22*a* is preferably provided within an angle range of ±45° with respect to a reference line RL that passes through a center C of the fuel tank 7-22 (the center of the cylindrical shape) and a lowermost portion B. FIG. 41 is a view showing a section (Y-Z section) taken along a line A-A in FIGS. 38 and 40. When the concave portion 7-22*a* is provided in the fuel tank 7-22, it is possible to efficiently collect and use the fuel in a case in which the remaining amount of the fuel in the fuel tank decreases.

Figure 42:
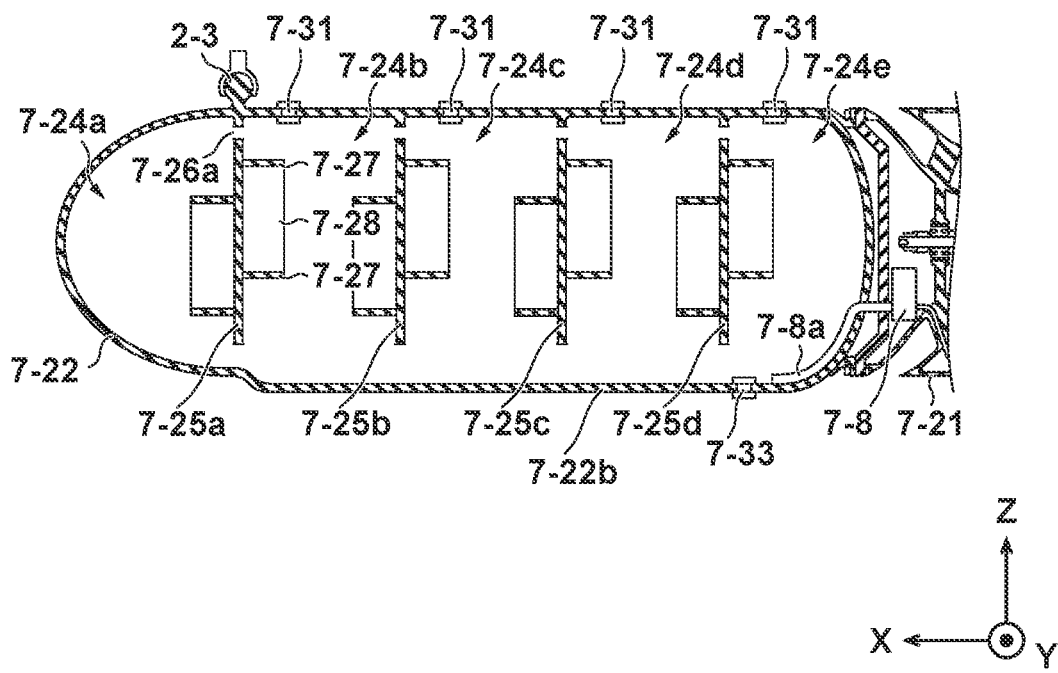
FIG. 42 is a view showing a modification of the fuel tank.

Here, in the seventh embodiment, as shown in FIG. 38, the concave portion 7-22*a* is provided in the bottom portion on the side of the storage portion 7-21 (power generation unit side) in the fuel tank 7-22. However, as shown in FIG. 42, a concave portion 7-22*b* may be provided in the bottom portion in the longitudinal direction of the housing 2-2. FIG. 42 is a view showing a modification of the fuel tank 7-22. In this case, in the concave portion 7-22*b* provided in the bottom portion in the longitudinal direction of the housing 2-2, a slope is preferably formed such that the rear side of the flying body 2-100 becomes lower than the front side. This can efficiently collect the fuel remaining in the fuel tank 7-22.

Other Embodiments

In the above seventh embodiment, a helicopter has been shown as the flying body 2-100. In addition to such a rotorcraft, the present invention can be applied not only to an aircraft such as a fixed-wing aircraft or airship but also to a flying type personal mobility, spacecraft, a space shuttle, and the like. The rotorcraft can include a glider aircraft represented by a glider and an aircraft represented by a propeller plane. The present invention is also applicable to a flying body that is not of electric propulsion type.

The connection portions of the power supply device 2-1 can include the upper surface of a wing portion of the airframe 2-101 and the bottom surface of a wing portion of the airframe 2-101 in addition to the bottom surface of the airframe 2-101. The power supplied by the power supply device 2-1 may be power supplied to a power load that constitutes a driving source such as a motor, may be power supplied to a power load other than the driving source, or may be power supplied to both.

A plurality of power supply devices 2-1 may be provided in one flying body. If a plurality of power supply devices are provided, they may be juxtaposed in the widthwise direction of the flying body, or may be arranged in one line in the front-and-rear direction of the flying body.

In the above seventh embodiment, an example in which the housing 2-2 has a cylindrical shape has been described. However, the housing 2-2 may have another tubular shape such as a square tubular shape. In addition, the housing 2-2 may include a portion with a cylindrical shape and a portion with a square tubular shape.

<Summary of First Embodiment>

The first embodiment discloses at least the following power supply device.

1. A power supply device (for example, 1) according to the first embodiment is a power supply device that supplies power to a power load (for example, 105, 106) of a flying body (for example, 100), comprising:

power generation means (for example, 4);

a hollow housing (for example, 2) including a reserving portion (for example, 2*d*) configured to reserve a fuel of the power generation means, and a storage portion (for example, 2*e*) configured to store the power generation means; and a connecting portion (for example, 3) configured to connect the housing to an airframe (for example, 101) of the flying body, wherein the housing has a shape long in a front-and-rear direction of the flying body, and is arranged outside the airframe, and the reserving portion and the storage portion are arranged in a longitudinal direction of the housing.

In the first embodiment, since the power supply device is arranged outside the airframe, the degree of freedom in designing the airframe of the flying body can be improved. The housing has a shape long in the front-and-rear direction of the flying body, and has a low air drag shape with a small front projection area. For this reason, even in the arrangement in which the power supply device is arranged outside the airframe, the fuel consumption performance (air drag reduction) of the flying body is not greatly lowered.

2. In the first embodiment, the housing has a cylindrical shape long in the front-and-rear direction of the flying body, and includes a distal end portion (for example, 2*a*) having a tapered shape whose diameter is reduced toward a front side in the front-and-rear direction of the flying body.

In this embodiment, it is possible to further lower the air drag of the housing. It is also possible to make the influence of a cross wind smaller.

3. In the first embodiment, the power generation means includes:

a gas turbine engine (for example, 6); and a power generator (for example, 5) configured to generate power by an output of the gas turbine engine, and rotating shafts (for example, 60, 50) of the gas turbine engine and the power generator are arranged on the same axis as a center axis (for example, C) of the housing.

In the first embodiment, when the gas turbine engine is employed, the power generation means can be stored in the housing with the cylindrical shape efficiently in terms of space. In addition, when the gas turbine engine of relatively small noise is used, silence can be improved.

4. In the first embodiment, the power generation means includes a fuel cell (for example, 42).

In the first embodiment, it is advantageous in terms of power generation efficiency and low pollution. In addition, it is possible to simplify the pipes as compared to a power generation mechanism using an internal combustion engine.

5. In the first embodiment, a hydrogen gas is reserved in the reserving portion.

In the first embodiment, a fuel reformer can be omitted when employing a fuel cell.

6. In the first embodiment, the power generation means includes:

an internal combustion engine (for example, 6, 44); and a power generator (for example, 5, 46) configured to output power by an output of the internal combustion engine.

In this embodiment, it is possible to construct a power generation mechanism capable of ensuring a relatively long cruising distance.

7. In the first embodiment, the internal combustion engine comprises a reciprocating engine (for example, 44).

In the first embodiment, it is possible to provide the power supply device at a relatively low cost.

8. In the first embodiment, the flying body comprises an electric propulsion type flying body, and the power load comprises a motor (for example, 105, 106).

In the first embodiment, it is possible to supply sufficient power to a motor serving as a driving source that needs relatively large power and prolong the cruising distance of the flying body.

9. In the first embodiment, the reserving portion, the power generator, and the gas turbine engine are arranged in this order from the front side in the front-and-rear direction of the flying body.

In the first embodiment, it is possible to efficiently use the internal space of the housing. In particular, the exhaust efficiency can be raised by locating the gas turbine engine at an end, and the exhaust gas flow can be used as an auxiliary thrust.

10. In the first embodiment, the housing includes, at a rear end portion (for example, 2b) in the front-and-rear direction of the flying body, an exhaust portion (for example, 2b') configured to exhaust a combustion gas of the gas turbine engine to a rear side in the front-and-rear direction of the flying body.

In the first embodiment, it is possible to raise the exhaust efficiency and use the exhaust gas flow as an auxiliary thrust.

11. In the first embodiment, the reserving portion has a large range in the longitudinal direction of the housing as compared to the storage portion.

In the first embodiment, it is possible to reserve more fuel and prolong the cruising distance of the flying body.

<Summary of Second Embodiment>

The second embodiment discloses at least the following power supply device.

1. A power supply device (for example, 2-1) according to the second embodiment is a power supply device that supplies power to a power load (for example, 2-105, 2-106) of a flying body (for example, 2-100), comprising:

power generation means (for example, 2-4, 2-5); and a housing (for example, 2-2) including a reserving portion (for example, 2-22) configured to reserve a fuel of the power generation means, and a storage portion (for example, 2-21) configured to store the power generation means, wherein the housing has a shape in which the reserving portion and the storage portion are arrayed along a front-and-rear direction of the flying body, and is arranged outside an airframe (for example, 2-101) of the flying body, the power generation means includes a power generator (for example, 2-4) including a rotating shaft (for example, 2-6), and an engine (for example, 2-5) configured to rotationally drive the rotating shaft, and a first portion (for example, 2-21a) of the storage portion surrounding the engine is covered with a heat insulating member (for example, 2-23).

According to this arrangement, it is possible to ensure safety to a high temperature of the engine and reduce lowering of the thermal efficiency (fuel consumption performance) of the gas turbine engine.

2. In the power supply device according to the second embodiment, the engine includes a compressor (for example, 2-51, 2-52) configured to generate compressed air, a compression chamber (for example, 2-53) configured to hold the compressed air supplied from the compressor, and a combustion chamber (for example, 2-54) arranged in the compression chamber and configured to take the compressed air from the compression chamber, the compression chamber is defined between a tubular outer circumferential case (for example, 2-21a) and a tubular inner circumferential case (for example, 2-21b), and the outer circumferential case forms the first portion of the storage portion covered with the heat insulating member.

According to this arrangement, the compression chamber that becomes hot in the gas turbine is covered with the heat insulating member, and it is therefore possible to ensure safety and reduce lowering of the fuel consumption performance.

3. In the power supply device according to the second embodiment, the heat insulating member has a tubular shape covering the outer circumferential case and is configured to be detachable from the outer circumferential case.

According to this arrangement, when performing maintenance of the gas turbine engine, it is possible to easily access the gas turbine engine by detaching the heat insulating member from the outer circumferential case. Hence, the maintenability can be improved.

4. In the power supply device according to the second embodiment, the heat insulating member is joined to the outer circumferential case.

According to this arrangement, it is possible to prevent the heat insulating member from dropping from the outer circumferential case particularly during flight.

5. In the power supply device according to the second embodiment, the engine is arranged on a rear side of the power generator in the front-and-rear direction of the flying body, and a combustion gas generated in the combustion chamber passes through the inside of the inner circumferential case and is discharged to the rear side.

According to this arrangement, it is possible to reduce lowering to the power generation efficiency caused when the combustion gas at a high temperature flows into the power generator, and the power generator becomes hot.

6. In the power supply device according to the second embodiment, a sectional diameter of the heat insulating member is not more than a sectional diameter of a second portion (for example, 2-21c) of the storage portion covering the power generator.

According to this arrangement, it is possible to reduce an increase in the air drag during forward flight of the flying body caused by a step formed at the boundary between the heat insulating member and the second portion of the storage portion covering the power generator.

7. In the power supply device according to the second embodiment, the outer surface of the heat insulating member forms a continuous surface that continues to an outer surface of the second portion of the storage portion covering the power generator.

According to this arrangement, it is possible to eliminate the step at the boundary between the heat insulating member and the second portion of the storage portion covering the power generator and reduce the air drag at the boundary during forward flight of the flying body.

8. In the power supply device according to the second embodiment, the heat insulating member includes an inside member (for example, 2-23*a*) surrounding the first portion of the storage portion, an outside member (for example, 2-23*b*) surrounding the inside member, and a core member (for example, 2-23*c*) interposed between the inside member and the outside member, and the core member is made of at least one of alumina fiber, glass fiber, and ceramic fiber.

According to this arrangement, since a higher heat insulating effect can be implemented as compared to a case in which the gas turbine engine is covered with only a metal such as stainless steel or steel, it is advantageous in ensuring safety and reducing lowering of fuel consumption performance.

9. In the power supply device according to the second embodiment, a second heat insulating member (for example, 2-24) is provided between the power generator and the engine.

According to this arrangement, it is possible to reduce heat transmitted from the gas turbine engine to the power generator and further reduce lowering of the thermal efficiency (fuel consumption performance) of the gas turbine engine. Additionally, in the power generator as well, it is possible to reduce lowering of the power generation efficiency caused by heat.

<Summary of Third Embodiment>

The third embodiment discloses at least the following power supply device.

1. A power supply device (for example, 3-100 in FIGS. 12 and 13) according to the above embodiment is a power supply device (for example, 3-100) in which a hollow cylindrical housing (for example, HS in FIGS. 12 and 13) that stores a power generation unit (for example, PG in FIG. 13) configured to supply power to a power load (for example, motors 3-305 and 3-306) of a flying body (for example, 3-10 in FIGS. 12 and 13), a reserving portion (for example, TN in FIG. 13: fuel tank) configured to supply a fuel to the power generation unit (PG), and an air intake portion (for example, INT in FIG. 13) configured to take outside air and supply the outside air to the power generation unit (PG) can be connected to an outside of an airframe of the flying body (3-10) via a connecting portion (for example, a separation mechanism SP in FIGS. 12 and 13), wherein the air intake portion (INT) comprises:

an inlet portion (for example, 3-110 in FIGS. 13 to 16) formed in an outer peripheral surface of the housing (HS) and configured to take air outside the housing (HS);

a hollow introduction passage (for example, 3-120 in FIGS. 15 and 16) communicating with the inlet portion (3-110) and formed in the housing (HS); and an outlet portion (for example, 3-130 in FIG. 15) configured to supply the air taken from the inlet portion (3-110) to the power generation unit (PG) via the introduction passage (3-120).

According to the power supply device of the third embodiment, it is possible to provide a power supply device including an air intake structure that reduces the air drag.

2. In the power supply device (3-100) according to the third embodiment, the inlet portion (3-110) is formed into an annular shape along the outer peripheral surface of the housing (HS).

3. In the power supply device (3-100) according to the third embodiment, the introduction passage (3-120) is divided, in the housing (HS), by an inner cylinder wall (for example, 3-140 in FIG. 15) connected to one end (for example, 3-112 in FIG. 15) of the inlet portion (3-110) and formed in the housing (HS) and an outer cylinder wall (for example, 3-150 in FIG. 15) connected to the other end (for example, 3-114 in FIG. 15) of the inlet portion (3-110) and covering the inner cylinder wall (3-140).

According to the power supply device of the third embodiment, since the inlet portion of the air intake portion does not project to the outside of the housing, the air drag decreases, and the propulsion efficiency can be improved. Additionally, the air that flows near the outer peripheral surface of the housing is taken from the inlet portion before the development of a peeling region. This can suppress generation of a turbulent flow and keep the flow of the boundary layer of the air longer. It is therefore possible to further reduce the air drag.

4. In the power supply device (3-100) according to the third embodiment, the introduction passage (3-120) is formed while tilting from the inlet portion (3-110) to the rear side of the housing (HS), and the introduction passage (3-120) tilts by a predetermined angle (θ) made by a surface of the housing (HS) and a center line passing through a center of the inlet portion (3-110) and a center of the introduction passage (3-120).

According to the power supply device of the third embodiment, when the introduction passage communicating with the inlet portion is formed to tilt with respect to the surface (outer peripheral surface) of the housing, the pressure loss in the inlet portion in a case in which an advanced speed of the flying body exists can be reduced. It is therefore possible to easily take air from the inlet portion as compared to a case in which the introduction passage is formed at a right angle with respect to the outer peripheral surface, and easily take air flowing near the outer peripheral surface of the housing into the introduction passage.

5. In the power supply device (3-100) according to the third embodiment, the introduction passage (3-120) tilts by the predetermined angle (θ) within a range of 20° to 60°.

6. In the power supply device (3-100) according to the third embodiment, an end of the inner cylinder wall (3-140) of the introduction passage (3-120) connected to the surface of the housing (HS) is formed by a curved surface.

According to the power supply device of the third embodiment, when the end (corner portion) of the inner cylinder wall is formed by a curved surface to eliminate a portion projecting from the surface of the housing, the air drag can be reduced, and air flowing near the outer peripheral surface of the housing can easily be taken from the inlet portion. It is therefore possible to reduce the air drag.

7. In the power supply device (3-100) according to the third embodiment, a support member that connects the inner cylinder wall (3-140) and the outer cylinder wall (3-150) is provided in a radial direction of the introduction passage, the support member is formed by a plurality of struts (for example, 3-160 in FIG. 15) arrayed in a circumferential direction of the introduction passage (3-120), and a sectional shape of the strut is formed into a wing shape.

According to the power supply device of the third embodiment, when the plurality of struts are used to support, the portion between the inner cylinder wall and the outer cylinder wall can be reinforced. In addition, when the sectional shape of the strut is formed into a wing shape, the pressure loss in the introduction passage can be reduced, and the propulsion efficiency can be improved.

8. A flying body according to the third embodiment is a flying body (for example, 3-10 in FIGS. 12 and 13) including a propulsion device (for example, 3-300 in FIG. 13) configured to generate a thrust based on power, comprising the power supply device (3-100) according to the third embodiment outside the airframe (for example, 3-200 in FIGS. 12 and 13) of the flying body (3-10), and the power supply device (3-100) supplies the generated power to the propulsion device (for example, 3-300 in FIG. 13).

According to the flying body of the third embodiment, it is possible to provide a flying body including the power supply device including an air intake structure that reduces the air drag.

<Summary of Fourth Embodiment>

The fourth embodiment discloses at least the following power supply device.

1. A power supply device (for example, 3-100 in FIG. 18) according to the fourth embodiment is a power supply device (3-100) in which a hollow cylindrical housing (for example, HS in FIG. 18) that stores a power generator (for example, GE in FIG. 18) configured to supply power to a power load (for example, motors 3-305 and 3-306) of a flying body (for example, 3-10 in FIG. 18), a driving portion (for example, DR (gas turbine engine) in FIG. 18) configured to drive the power generator (GE), a reserving portion (for example, TN in FIG. 18: fuel tank) configured to supply a fuel to the driving portion (DR), and an air intake portion (for example, INT, INT2 in FIG. 18) configured to take outside air and supply the outside air to the driving portion (DR) can be connected to an outside of an airframe of the flying body via a connecting portion (for example, a separation mechanism SP in FIG. 18), wherein the air intake portion (INT) comprises:

an inlet portion (for example, 4-110 in FIG. 20) formed in an outer peripheral surface of the housing (HS) and configured to take air outside the housing (HS);

an introduction passage (for example, 4-120 in FIG. 20) communicating with the inlet portion (4-110) and formed in the housing (HS); and an outlet portion (for example, 4-130 in FIG. 20) configured to supply the air taken from the inlet portion (4-110) to the driving portion (DR) via the introduction passage (4-120), and a heat sink (for example, 4-170 in FIG. 20) configured to dissipate heat of the power generator (GE) is arranged on the outer peripheral portion of the power generator (GE), and the heat sink (4-170) is arranged in a passage in which the air flows from the inlet portion (4-110) to the driving portion (DR).

According to the power supply device of the fourth embodiment, when the power generator is cooled by heat dissipation from the heat sink, reduction of power output from the power generator can be suppressed, and the propulsion efficiency of the flying body can thus be improved.

2. The power supply device (3-100) according to the fourth embodiment further comprises an auxiliary air intake portion (INT2) arranged at a position on a rear side of the heat sink and configured to take the outside air and supply the outside air to the driving portion, and the auxiliary air intake portion (INT2) comprises:

a movable member (for example, 4-505 in FIG. 21) capable of being opened/closed in accordance with a temperature of the power generator detected by a temperature detection portion (for example, 4-510, 4-520, 4-530 in FIGS. 23 and 24); and an auxiliary inlet portion (for example, 4-111 in FIG. 21) formed in the outer peripheral surface of the housing and configured to take the air outside the housing.

3. In the power supply device (3-100) according to the fourth embodiment, the movable member (4-505) is arranged in an opening plane of the auxiliary inlet portion (4-111), in a state in which the movable member (4-505) is open, and the air outside the housing (HS) is taken from the auxiliary inlet portion (4-111), and in a state in which the movable member (4-505) is closed, intake of the air is blocked.

4. In the power supply device (3-100) according to the fourth embodiment, the auxiliary air intake portion (INT2) comprises:

an auxiliary introduction passage (for example, 4-121 in FIG. 21) formed in the housing (HS) and communicating with the auxiliary inlet portion (4-111) in a state in which the movable member (4-505) is open; and an outlet portion (for example, 4-131 in FIG. 21) configured to supply air taken from the auxiliary inlet portion (4-111) to the driving portion (for example, a compressor COM that constitutes DR in FIG. 18) arranged on a rear side of the auxiliary introduction passage (4-121).

According to the power supply device of the fourth embodiment, if the movable member is opened, air intake from the inlet portion on the front side is reduced by the pressure loss caused by the heat sink. If the temperature of the power generator is low, the movable member of the auxiliary air intake portion is opened to supply air to the driving portion DR via the auxiliary introduction passage (bypass passage) from the auxiliary inlet portions, thereby reducing a wasteful pressure loss.

5. In the power supply device (3-100) according to the fourth embodiment, the air intake portion (INT) arranged on the front side of the auxiliary air intake portion (INT2) comprises a movable member (for example, 4-504 in FIG. 21) that can be opened/closed in accordance with the temperature of the power generator detected by the temperature detection portion (4-510, 4-520, 4-530), and the movable member (4-504) is arranged in an opening plane of the inlet portion (4-110), in a state in which the movable member (4-505) is open, the air outside the housing is taken from the inlet portion (4-110), and in a state in which the movable member (4-505) is closed, intake of the air is blocked.

According to the power supply device of the fourth embodiment, when the power generator is cooled by heat dissipation from the heat sink, reduction of power output from the power generator can be suppressed, and the propulsion efficiency can thus be improved.

6. The power supply device (3-100) according to the fourth embodiment further comprises a driving mechanism (for example, 4-401, 4-402, 4-420, 4-430 in FIG. 22 and actuators 4-502 and 4-503 in FIG. 5) configured to open/close the movable member, and a control unit (for example, 4-501 in FIG. 5) configured to control the driving mechanism based on a detection result of the temperature detection portion.

7. In the power supply device (3-100) according to the fourth embodiment, if the temperature of the power generator (GE) detected by the temperature detection portion (4-510, 4-520, 4-530) is lower than a threshold temperature, the control unit (4-501) controls the driving mechanism to open the movable member (4-505) provided in the auxiliary air intake portion (INT2), and if the temperature of the power generator (GE) is not less than the threshold temperature, the control unit (4-501) controls the driving mechanism to close the movable member (4-505) provided in the auxiliary air intake portion (INT2).

8. In the power supply device (3-100) according to the fourth embodiment, if the temperature of the power generator (GE) detected by the temperature detection portion (4-510, 4-520, 4-530) is lower than a threshold temperature, the control unit (4-501) controls the driving mechanism to close the movable member (4-504) provided in the air intake portion (INT), and if the temperature of the power generator (GE) is not less than a threshold temperature, the control unit (4-501) controls the driving mechanism to open the movable member (4-504) provided in the air intake portion (INT).

According to the power supply device of the fourth embodiment, if the temperature of the power generator is lower than the threshold temperature serving as a reference, the movable member in the auxiliary air intake portion is opened, and the air is supplied to the compressor of the driving portion DR via the auxiliary introduction passage from the auxiliary air intake portion, thereby reducing a wasteful pressure loss. If the temperature of the power generator is equal to or higher than the threshold temperature, the movable member in the auxiliary air intake portion is closed, and the air is supplied to the compressor of the driving portion DR via the introduction passage 4-120 passing through the heat sink 4-170, thereby cooling the power generator by heat dissipation from the heat sink. Hence, reduction of power output from the power generator can be suppressed, and the propulsion efficiency can be improved.

9. A flying body according to the fourth embodiment is a flying body (for example, 3-10 in FIG. 18) including a propulsion device (for example, 4-300 in FIG. 18) configured to generate a thrust based on power, comprising the power supply device (for example, 3-100 in FIG. 18) according to the fourth embodiment outside the airframe (for example, 4-200 in FIG. 18) of the flying body (3-10), and the power supply device (3-100) supplies the generated power to the propulsion device (for example, 4-300 in FIG. 18).

According to the flying body of the fourth embodiment, it is possible to provide a flying body that can suppress reduction of power output from a power generator by cooling the power generator by heat dissipate from a heat sink and improve the propulsion efficiency.

<Summary of 5Ath to 5Cth Embodiments>

The 5Ath to 5Cth embodiments disclose at least the following flying body.

1. A flying body according to the above embodiment is a flying body (for example, 3-10 in FIGS. 12 and 13) including a power supply device (for example, 3-100 in FIGS. 12 and 13) in which a hollow cylindrical housing (for example, HS in FIGS. 12 and 13) that stores a power generation unit (for example, PG in FIG. 13) configured to supply power to a power load (for example, motors 5-305 and 5-306) of the flying body (for example, 3-10 in FIG. 12), a reserving portion (for example, TN in FIG. 13: fuel tank) configured to supply a fuel to the power generation unit (PG), and an air intake portion (for example, INT in FIG. 13) configured to take outside air and supply the outside air to the power generation unit (PG) is attached to an outside of an airframe (for example, 3-200 in FIGS. 12 and 13) via a separation mechanism (for example, SP in FIGS. 12 and 13), wherein the separation mechanism (SP) includes:

engaging portions (for example, 5-40, 5-45 in FIG. 27) attached to a front portion and a rear portion of the airframe (3-200); and following engaging portions (for example, 5-50, 5-55 in FIG. 27) attached to a front portion and a rear portion of the housing and engaging with the engaging portions to attach the housing to the airframe, and when the engaging portion (5-40, 5-45) cancels an engaging state with the following engaging portion (5-50, 5-55), the power supply device (3-100) is separated from the airframe (3-200).

According to the flying body of the embodiment, the power supply device (housing) can be separated from the flying body, and the maintenance operation of the power supply device is thus facilitated. In addition, at the time of the maintenance operation of the power supply device, the power supply device can be replaced (rented) with another power supply device to avoid troubles in commercial flights. It is therefore possible to increase the operation efficiency of the flying body in commercial flights.

2. In the flying body according to the embodiment, the separation mechanism (SP) includes:

a separation driving portion (for example, 5-10 in FIG. 27) configured to generate a driving force for canceling the engaging state;

a fixed arm (for example, 30 in FIG. 27) fixed to the airframe;

a separation arm (for example, 48 in FIG. 27) in which the engaging portion is formed; and a driving arm (for example, 20 in FIG. 27) rotatably connected, at a first pivoting portion (for example, 32 in FIG. 27), to a driving rod (for example, 15 in FIG. 27) of the separation driving portion (10), rotatably connected to the fixed arm (30) at a second pivoting portion (for example, 34 in FIG. 27), and configured to transmit the driving force of the separation driving portion (10) to the separation arm (48), and the separation driving portion (10) drives the driving arm (20) and the engaging portion (40, 45) in the separation arm (48) by the driving force to cancel the engaging state with the following engaging portion (50, 55), thereby separating the power supply device (3-100) from the airframe (3-200).

According to the flying body of the embodiment, the flying body includes a driving mechanism (the separation driving portion, the fixed arm, the separation arm, and the driving arm) configured to cancel the engaging state. When performing the maintenance operation, the driving mechanism is operated, thereby separating the power supply device (housing) from the flying body. This facilitates the maintenance operation of the power supply device. In addition, at the time of the maintenance operation of the power supply device, the power supply device can be replaced (rented) with another power supply device to avoid troubles in commercial flights. It is therefore possible to increase the operation efficiency of the flying body in commercial flights.

3. In the flying body according to the embodiment, of a front portion and a rear portion of the airframe, the separation mechanism (SP) on one side is formed based on the separation driving portion (5-10), the fixed arm (5-30), the separation arm (5-48), and the driving arms (5-20), of the front portion and the rear portion of the airframe, in the separation mechanism on the other side, the engaging portion attached to the flying body includes:

a slider engaging hole (for example, 5-430 in 29B of FIG. 29) configured to hold the following engaging portion in the engaging state, and if the engaging state is canceled by the separation mechanism on the one side, slidably move the following engaging portion from a position of the holding by a weight of the power supply device; and a slider opening portion (for example, 5-435 in 29B of FIG. 29) configured to separate the slidably moved following engaging portion, and the following engaging portion attached to the housing (HS) includes a projecting portion (for example, a spherical projection 5-420 in FIG. 29) configured to engage with the slider engaging hole in the engaging state.

According to the flying body of the embodiment, the separation mechanism on one side is formed by the driving mechanism including the separation driving portion, the fixed arm, the separation arm, and the driving arm. The separation mechanism on the other side is configured to cancel the engaging state between the engaging portion and the following engaging portion without using the driving mechanism. This can reduce cost and weight.

4. In the flying body according to the embodiment, the separation mechanism (SP) includes:

a separation driving portion (for example, 5-510 in 30A of FIG. 30) configured to generate a driving force for canceling the engaging state;

a fixed arm (for example, 5-530 in 30A of FIG. 30) fixed to the airframe;

a connecting pin (for example, 5-541 in 30A of FIG. 30) configured to connect the engaging portion and the following engaging portion in the engaging state; and a driving arm (for example, 5-520 in 30A of FIG. 30) rotatably connected, at a first pivoting portion (for example, 5-532 in 30A of FIG. 30), to a driving rod (for example, 5-515 in FIG. 30A) of the separation driving portion (5-510), rotatably connected to the fixed arm (5-530) at a second pivoting portion (for example, 5-534 in 30A of FIG. 30), and configured to transmit the driving force of the separation driving portion (5-510) to the connecting pin (5-541), and the separation driving portion (5-510) drives the driving arm (5-520) by the driving force to remove the connecting pin (5-541) and cancel the engaging state between the engaging portion (for example, 5-540 in 30A of FIG. 30) and the following engaging portion (for example, (5-550, 5-555, 5-559 (5-556, 5-557, 5-558)) in 30A of FIG. 30), thereby separating the power supply device (3-100) from the airframe (3-200).

According to the flying body of the embodiment, the flying body includes a driving mechanism (the separation driving portion, the fixed arm, and the driving arm) configured to cancel the engaging state, and the driving mechanism configured to cancel the engaging state is provided. When performing the maintenance operation, the driving mechanism is operated, thereby separating the power supply device (housing) from the flying body. This facilitates the maintenance operation of the power supply device. In addition, at the time of the maintenance operation of the power supply device, the power supply device can be replaced (rented) with another power supply device to avoid troubles in commercial flights. It is therefore possible to increase the operation efficiency of the flying body in commercial flights.

5. In the flying body according to the embodiment, the following engaging portion includes a spherical projecting portion (for example, a spherical projection 5-555 in FIG. 30) provided on the housing, and a spherical joint portion (for example, 5-559 (556, 557, 558) in FIG. 30) configured to rotatably hold the projecting portion.

According to the flying body of the embodiment, when attaching the power supply device (housing) to the airframe 3-200 of the flying body, adjustment can easily be done in relative alignment of the airframe 3-200 of the flying body 3-10 and the power supply device 3-100 (housing HS), and the operation efficiency can be improved.

6. In the flying body according to the embodiment, a cowling (for example, 5-610 in FIG. 31) is attached to the airframe (3-200) to cover the separation mechanisms (SP) in the front portion and the rear portion of the airframe.

According to the flying body of the embodiment, when the cowling is attached to the airframe, the air drag caused by the exposure of the separation mechanisms decreases, and the propulsion efficiency can be improved.

<Summary of Sixth Embodiment>

The sixth embodiment discloses at least the following power supply device.

1. A power supply device (for example, 2-1) according to the sixth embodiment is a power supply device that supplies power to a power load (for example, 2-105, 2-106) of a flying body (for example, 2-100), comprising:

power generation means (for example, 6-4, 6-5); and a housing (for example, 2-2) including a reserving portion (for example, 6-22) configured to reserve a fuel of the power generation means, and a storage portion (for example, 6-21) configured to store the power generation means, wherein the housing is arranged outside an airframe (for example, 2-101) of the flying body, and the reserving portion and the storage portion are arranged along a front-and-rear direction of the flying body and separably connected by a connecting portion (for example, 6-23).

According to this arrangement, since a fuel tank of a size according to the flight purpose (cruising distance) of the flying body can be selected and attached to the storage portion, lowering of fuel consumption performance caused by an excess increase in the weight can be reduced.

2. In the power supply device according to the sixth embodiment, the reserving portion includes an abutting portion (for example, 6-23*b*) formed into an annular shape along an outer periphery of the housing, the storage portion includes an abutting target portion (for example, 6-23*a*) formed into an annular shape along the outer periphery of the housing such that the abutting portion abuts, and the connecting portion connects the abutting portion and the abutting target portion.

According to this arrangement, it is possible to easily and firmly connect the reserving portion and the storage portion.

3. In the power supply device according to the sixth embodiment, the connecting portion includes a screw member (for example, 6-23*d*) threadably engaging with a screw groove (for example, 6-23*c*) in the abutting target portion via a hole in the abutting portion to connect the abutting portion and the abutting target portion.

According to this arrangement, it is possible to simplify the arrangement of the connecting portion and advantageously reduce the cost and also easily and firmly connect the reserving portion and the storage portion.

4. In the power supply device according to the sixth embodiment, a fireproof plate (for example, 6-24) is arranged between the reserving portion and the storage portion.

According to this arrangement, even in a case of outbreak of fire in the power generation means, flame propagation to the storage portion side can be prevented.

5. In the power supply device according to the sixth embodiment, the connecting portion connects the abutting portion and the abutting target portion via the fireproof plate.

According to this arrangement, it is possible to easily fix the fireproof plate to the storage portion and the reserving portion.

6. In the power supply device according to the sixth embodiment, the housing has a shape long in the front-and-rear direction of the flying body, and the storage portion is set to have a thickness equal to or less than that of the reserving portion.

According to this arrangement, it is possible to reduce the air drag during forward flight of the flying body and reduce lowering of the fuel consumption performance.

7. In the power supply device according to the sixth embodiment, each of the reserving portion and the storage portion is provided with at least one connecting mechanism (for example, 2-3) configured to connect the housing and the airframe.

According to this arrangement, it is possible to increase the stability when hanging, from the airframe, the storage portion and the reserving portion connected to each other.

<Summary of Seventh Embodiment>

The seventh embodiment discloses at least the following power supply device.

1. A power supply device (for example, 2-1) according to the above embodiment is a power supply device that supplies power to a power load (for example, 2-105, 2-106) of a flying body (for example, 2-100), comprising:

power generation means (for example, 7-4, 7-5); and a housing (for example, 2-2) including a reserving portion (for example, 7-22) configured to reserve a fuel of the power generation means, and a storage portion (for example, 7-21) configured to store the power generation means, wherein the housing has a long shape in which the reserving portion and the storage portion are arrayed along a front-and-rear direction of the flying body, and is arranged outside an airframe (for example, 2-101) of the flying body, and the reserving portion includes a partition (for example, 7-25) configured to divide a reserving space of the fuel into a plurality of partial spaces (for example, 7-24) arrayed along a longitudinal direction of the housing.

According to this arrangement, since the partitions function as wave dissipating plates configured to reduce the swing of the liquid surface of the fuel (liquid) reserved in the fuel tank, it is possible to suppress the occurrence of a sloshing phenomenon and reduce the influence on posture control of the airframe and the breakage of the fuel tank.

2. In the power supply device according to the seventh embodiment, the partition includes an opening portion (for example, 7-26) configured to make the plurality of partial spaces communicate.

According to this arrangement, it is possible to flow the fuel in/out the plurality of partial spaces and reduce remaining of the fuel on the reserving portion.

3. In the power supply device according to the seventh embodiment, the opening portion is provided with a check valve (for example, 7-29) configured to prevent a reverse flow of the fuel that has passed through the opening portion.

According to this arrangement, even in a case in which the airframe tilts, uneven distribution of the fuel in the reserving portion can be prevented. Additionally, even in a case in which the fuel in the reserving portion decreases, the fuel can efficiently be used.

4. In the power supply device according to the seventh embodiment, the reserving portion includes a plate member (for example, 7-27) extending from the partition in the longitudinal direction of the housing.

According to this arrangement, since the plate member functions as an auxiliary wave dissipating plate, it is possible to further suppress the occurrence of the sloshing phenomenon and further reduce the influence on posture control of the airframe and the breakage of the fuel tank.

5. In the power supply device according to the seventh embodiment, the plate member extends from the partition such that a plate surface becomes perpendicular to an up-and-down direction of the flying body.

According to this arrangement, since the plate member can be arranged in parallel to the liquid surface, it is possible to efficiently suppress the occurrence of the sloshing phenomenon.

6. In the power supply device according to the seventh embodiment, the plate member is provided on each of a front side and a rear side of the partition in the front-and-rear direction of the flying body.

According to this arrangement, it is possible to efficiently reduce the swing of the liquid surface of the fuel on both the front side and the rear side of the partition and further suppress the occurrence of the sloshing phenomenon.

7. In the power supply device according to the seventh embodiment, the plate member comprises a plurality of plate members provided for the partition apart in an up-and-down direction of the flying body, and the reserving portion includes a rib portion (for example, 7-28) connected to the plurality of plate members.

According to this arrangement, since the rub member has a function of reinforcing the plurality of plate members extending from the partition, it is possible to enhance the function/effect of reducing the swing of the liquid surface of the fuel by the plate members.

8. In the power supply device according to the seventh embodiment, the reserving portion includes a concave portion (for example, 7-22a) provided in a bottom portion on a side of the storage portion.

According to this arrangement, it is possible to efficiently collect and use the fuel in a case in which the remaining amount of the fuel in the reserving portion decreases.

9. In the power supply device according to the seventh embodiment, the reserving portion includes a concave portion (for example, 7-22b) provided in a bottom portion of the storage portion in a longitudinal direction of the housing.

According to this arrangement, it is possible to efficiently collect and use the fuel in a case in which the remaining amount of the fuel in the reserving portion decreases.

10. In the power supply device according to the seventh embodiment, on a section perpendicular to the longitudinal direction of the housing, the concave portion is provided within an angle range of ±45° with respect to a reference line (for example, RL) that passes through a center (for example, C) of the reserving portion and a lowermost portion (for example, B).

According to this arrangement, it is possible to more efficiently collect and use the fuel in the reserving portion.

11. The power supply device according to the seventh embodiment further comprises a supply portion (for example, 7-8) configured to take the fuel from the reserving portion via a pipe (for example, 7-8a) and supply the fuel to the power generation means, and an inlet of the fuel in the pipe is arranged in the concave portion of the reserving portion.

According to this arrangement, it is possible to efficiently collect the fuel in the reserving portion and supply it to the power generation means even in a case in which the remaining amount of the fuel in the reserving portion decreases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power supply device that supplies power to a power load of a flying body, comprising:
a power generation unit;
a hollow housing including a reserving portion configured to reserve a fuel of the power generation unit, and a storage portion configured to store the power generation unit; and
a connecting portion configured to connect the housing to an airframe of the flying body,
wherein the housing has a shape long in a front-and-rear direction of the flying body, and is arranged outside the airframe, and
the reserving portion and the storage portion are arranged in a longitudinal direction of the housing.

2. The device according to claim 1, wherein the housing has a cylindrical shape long in the front-and-rear direction of the flying body, and includes a distal end portion having a tapered shape whose diameter is reduced toward a front side in the front-and-rear direction of the flying body.

3. The device according to claim 2, wherein the power generation unit includes:
a gas turbine engine; and
a power generator configured to generate power by an output of the gas turbine engine, and
rotating shafts of the gas turbine engine and the power generator are arranged on the same axis as a center axis of the housing.

4. The device according to claim 1, wherein the power generation unit includes a fuel cell.

5. The device according to claim 4, wherein a hydrogen gas is reserved in the reserving portion.

6. The device according to claim 1, wherein the power generation unit includes:
an internal combustion engine; and
a power generator configured to output power by an output of the internal combustion engine.

7. The device according to claim 6, wherein the internal combustion engine comprises a reciprocating engine.

8. The device according to claim 1, wherein the flying body comprises an electric propulsion type flying body, and the power load comprises a motor.

9. The device according to claim 3, wherein the reserving portion, the power generator, and the gas turbine engine are arranged in this order from the front side in the front-and-rear direction of the flying body.

10. The device according to claim 3, wherein the housing includes, at a rear end portion in the front-and-rear direction of the flying body, an exhaust portion configured to exhaust a combustion gas of the gas turbine engine to a rear side in the front-and-rear direction of the flying body.

11. The device according to claim 1, wherein the reserving portion has a large range in the longitudinal direction of the housing as compared to the storage portion.

12. A power supply device that supplies power to a power load of a flying body, comprising:
a power generation unit; and
a housing including a reserving portion configured to reserve a fuel of the power generation unit, and a storage portion configured to store the power generation unit,
wherein the housing has a shape in which the reserving portion and the storage portion are arrayed along a front-and-rear direction of the flying body, and is arranged outside an airframe of the flying body,
the power generation unit includes a power generator including a rotating shaft, and an engine configured to rotationally drive the rotating shaft, and
a first portion of the storage portion surrounding the engine is covered with a heat insulating member.

13. The device according to claim 12, wherein the engine includes a compressor configured to generate compressed air, a compression chamber configured to hold the compressed air supplied from the compressor, and a combustion chamber arranged in the compression chamber and configured to take the compressed air from the compression chamber,
the compression chamber is defined between a tubular outer circumferential case and a tubular inner circumferential case, and
the outer circumferential case forms the first portion of the storage portion covered with the heat insulating member.

14. A power supply device in which a hollow cylindrical housing that stores a power generation unit configured to supply power to a power load of a flying body, a reserving portion configured to supply a fuel to the power generation unit, and an air intake portion configured to take outside air and supply the outside air to the power generation unit can be connected to an outside of an airframe of the flying body via a connecting portion,
wherein the air intake portion comprises:
an inlet portion formed in an outer peripheral surface of the housing and configured to take air outside the housing;
a hollow introduction passage communicating with the inlet portion and formed in the housing; and
an outlet portion configured to supply the air taken from the inlet portion to the power generation unit via the introduction passage.

15. The device according to claim 14, wherein the inlet portion is formed into an annular shape along the outer peripheral surface of the housing.

16. The device according to claim 14, wherein the introduction passage is divided, in the housing, by an inner cylinder wall connected to one end of the inlet portion and formed in the housing and an outer cylinder wall connected to the other end of the inlet portion and covering the inner cylinder wall.

\* \* \* \* \*